United States Patent [19]

Weisner et al.

[11] Patent Number: 5,201,042

[45] Date of Patent: Apr. 6, 1993

[54] SOFTWARE PROCESS AND TOOLS FOR DEVELOPMENT OF LOCAL LANGUAGE TRANSLATIONS OF TEXT PORTIONS OF COMPUTER SOURCE CODE

[75] Inventors: Steven J. Weisner; Howard Sumner, both of Bedford; William G. DiMario, Marlborough; Robert L. Cohn, Marblehead, all of Mass.

[73] Assignee: Hewlett-Packard Company, Palo Alto, Calif.

[21] Appl. No.: 565,854

[22] Filed: Aug. 9, 1990

Related U.S. Application Data

[63] Continuation of Ser. No. 292,666, Dec. 30, 1988, abandoned, which is a continuation of Ser. No. 858,139, Apr. 30, 1986, abandoned.

[51] Int. Cl.$^5$ ............................................. G06F 5/00
[52] U.S. Cl. ........................... 395/500; 364/237.2; 364/260.4; 364/286.1; 364/280.4; 364/DIG. 1; 364/419
[58] Field of Search ................. 395/500, 100; 364/419

[56] References Cited

U.S. PATENT DOCUMENTS

| | | | |
|---|---|---|---|
| 4,193,119 | 3/1980 | Arase et al. | 364/900 |
| 4,204,208 | 5/1980 | McCarthy | 364/900 |
| 4,365,315 | 12/1982 | Jamnik | 364/147 |
| 4,373,192 | 2/1983 | Yanagiuchi | 364/419 |
| 4,456,969 | 6/1984 | Herzik | 364/900 |
| 4,460,973 | 7/1984 | Tanimoto | 364/419 |
| 4,468,754 | 8/1984 | Asada et al. | 364/419 |
| 4,481,607 | 11/1984 | Kobayashi et al. | 364/900 |
| 4,502,128 | 2/1985 | Okajima et al. | 364/900 |
| 4,507,734 | 3/1985 | Kaldas | 364/419 |
| 4,507,750 | 3/1985 | Frantz et al. | 364/900 |
| 4,509,137 | 4/1985 | Yoshida | 364/900 |
| 4,551,818 | 11/1985 | Sado et al. | 364/900 |
| 4,559,614 | 12/1985 | Peek | 395/500 |
| 4,566,078 | 1/1986 | Crabtree | 364/900 |
| 4,595,980 | 6/1986 | Innes | 364/200 |
| 4,615,002 | 9/1986 | Innes | 364/419 |
| 4,636,977 | 1/1987 | Ikemoto | 364/419 |
| 4,654,798 | 3/1987 | Taki et al. | 364/419 |
| 4,661,924 | 4/1987 | Okamoto | 364/900 |
| 4,685,060 | 8/1987 | Yamano et al. | 364/900 |
| 4,706,212 | 11/1987 | Toma | 364/900 |
| 4,706,215 | 11/1987 | Toma | 364/900 |
| 4,731,735 | 3/1988 | Borgendale | 364/419 |
| 4,733,368 | 4/1981 | Morimoto | 364/900 |
| 4,774,666 | 9/1988 | Miyao | 364/419 |
| 4,777,600 | 10/1988 | Saito | 364/900 |
| 4,783,752 | 11/1988 | Kaplan et al. | 364/900 |
| 4,787,038 | 11/1988 | Doi | 364/900 |
| 4,805,132 | 1/1989 | Okamoto et al. | 364/419 |
| 4,831,529 | 5/1989 | Miike | 364/900 |
| 4,849,898 | 7/1989 | Adi | 364/900 |
| 4,860,204 | 8/1989 | Gendron | 364/513 |
| 4,864,503 | 9/1989 | Tolin | 364/900 |
| 4,870,610 | 9/1989 | Belfer | 364/900 |

*Primary Examiner*—Thomas C. Lee
*Assistant Examiner*—Eric Coleman

[57] ABSTRACT

Apparatus is provided for forming a foreign language file from a native language file so that the display for a given equipment can be rendered in the foreign language rather than the native language. The apparatus is comprised of a native language file containing instructions for the format of the display, words to be translated, and contextual information related to the latter words, a translation tool for reading the native language file and forming an image of the native words to be translated, the size and shape of the space allotted to them and a blank space into which equivalent foreign words can be inserted, means for inserting the foreign words, and means for storing in a file the foreign words and the instructions for the format to be used.

10 Claims, 4 Drawing Sheets

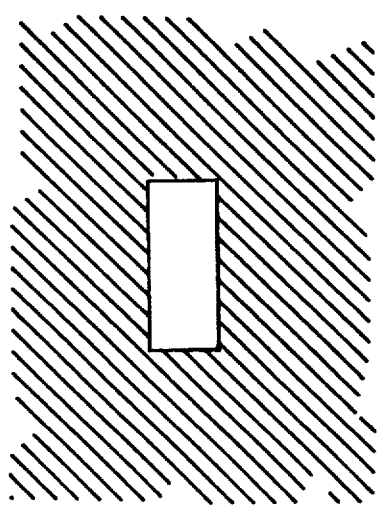
FIG 1A
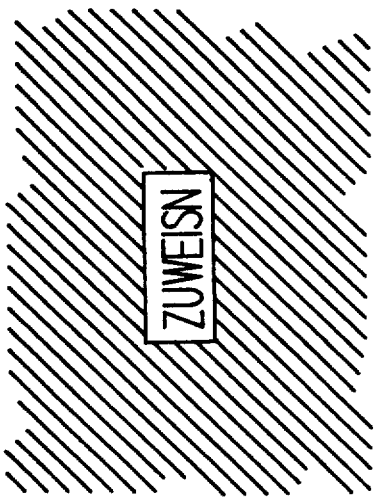
FIG 1B
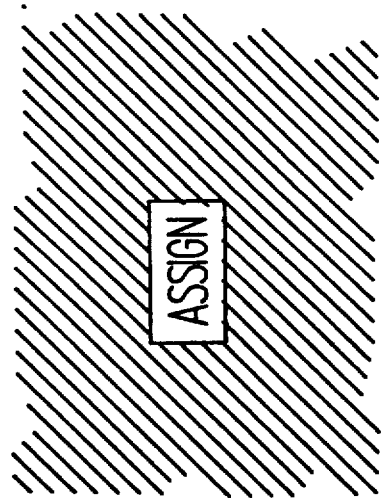
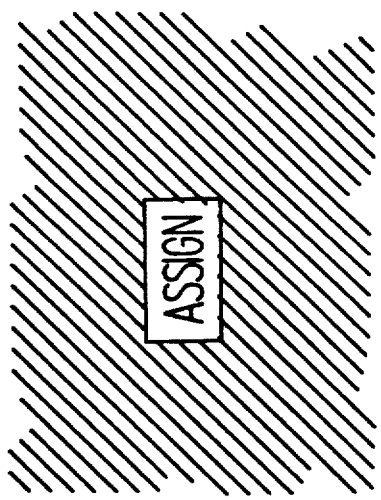

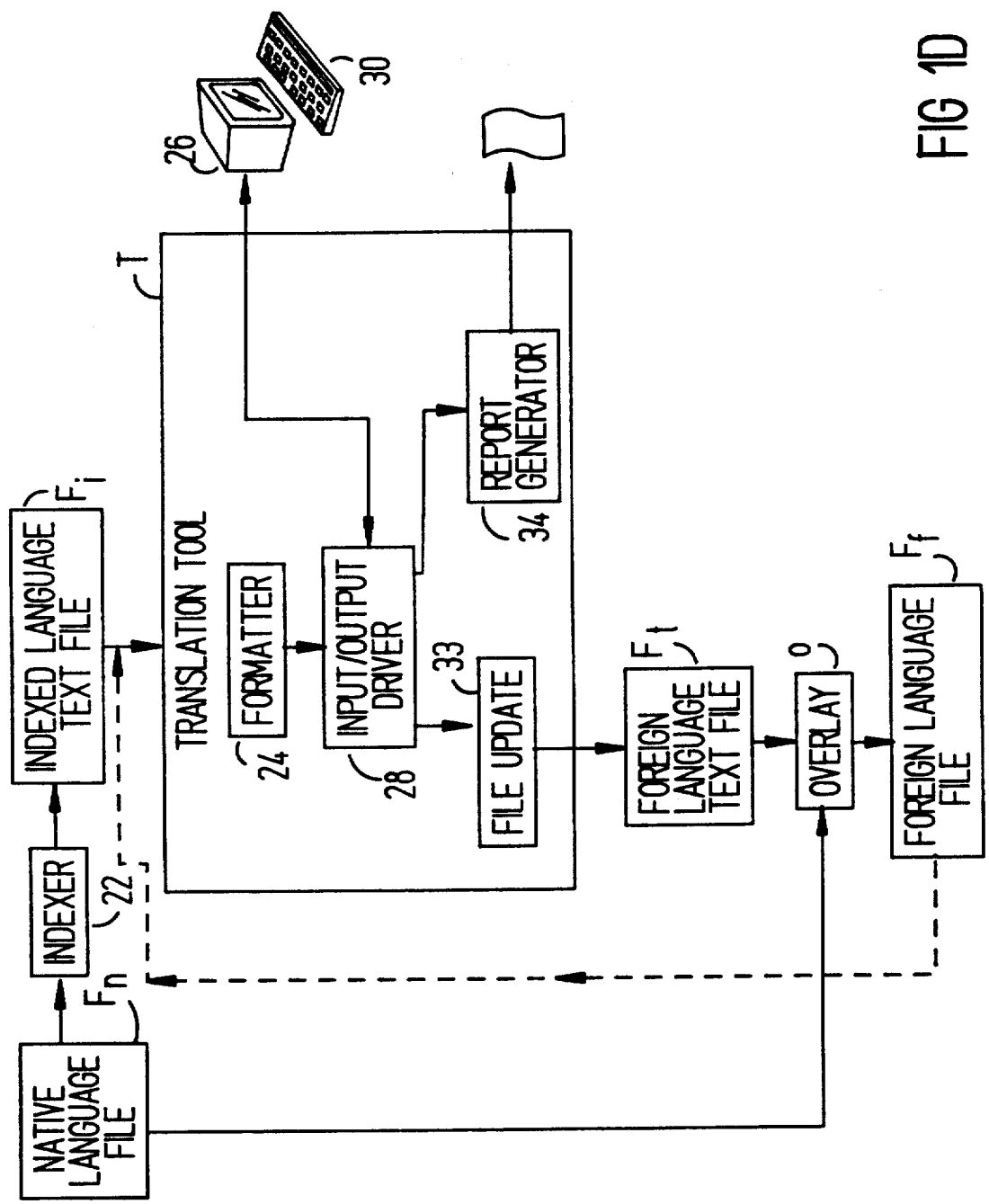

SOFTWARE PROCESS AND TOOLS FOR DEVELOPMENT OF LOCAL LANGUAGE TRANSLATIONS OF TEXT PORTIONS OF COMPUTER SOURCE CODE

CROSS REFERENCE TO RELATED APPLICATION

This application is a continuation of application Ser. No. 07/292,666, filed Dec. 30, 1988, now abandoned, which is a continuation of application Ser. No. 06/858,139 filed Apr. 30, 1986, now abandoned.

BACKGROUND OF THE INVENTION

In many types of programmed apparatus, interaction with a user is obtained by displays on a cathode ray a native language of menus, actions to be taken, and messages for helping the user when he requests aid. All of this information, along with instructions as to the format of the display, are stored in a native language file that is scanned by a screen generator that controls the cathode ray tube.

For the apparatus to be used by someone who is not familiar with the native language, a translation of the displayed words into suitable foreign equivalents is required. This has been obtained by recording the various displays and format descriptions on paper and sending it to a translator after the words to be translated have been designated in some way, as for example with a magic marker. After the designated words have been translated into foreign equivalents and recorded on the paper, it is used to create a foreign language file that is sent with apparatus sold to people familiar with that language. Whereas this may seem to be a simple and straightforward procedure, experience has shown that much confusion and delay results from the use of paper recording in this manner, e.g., the translator may provide words that are not apt because he is not familiar with the application or he may fail to observe the format instructions and use a foreign word that is too long.

BRIEF SUMMARY OF THE INVENTION

In accordance with this invention, the words in a native language file that are to be translated, comment language related to these words, and format instructions are individually identified by the grammatical construction employed. The file is then read by a special translation tool that displays the words to be translated on the screen of a cathode ray tube in a format of its own. This is done in such manner that the allotted space for a word or phrase is readily discernable, e.g., by video inversion, and a similarly designated space for a foreign word is identified at some adjacent location. Also included in the displays are any comments required for the purpose of helping the translator select appropriate foreign words. The translation tool is also provided with a means for inserting a foreign word into the space designated for it. Thus, if the selected foreign word is too long, the translation tool will not allow the user to enter the extra letters. If desired, a report generator may be provided for printing only the native language and foreign language words so that they can be verified. The translated words are then placed in a foreign language text file and means are provided for forming a foreign language file in which the translated words are substituted for the native words so that it can be used with apparatus for sale to a foreign country using that foreign language.

BRIEF DESCRIPTION OF THE DRAWINGS

FIG. 1A illustrates a display of the translation tool before a foreign word has been selected;

FIG. 1B illustrates a display of the translation tool when the selected foreign word has the proper length;

FIG. 1D is a block diagram of the translation tool of FIG. 1.

DETAILED DESCRIPTION OF THE INVENTION

Figure 1:
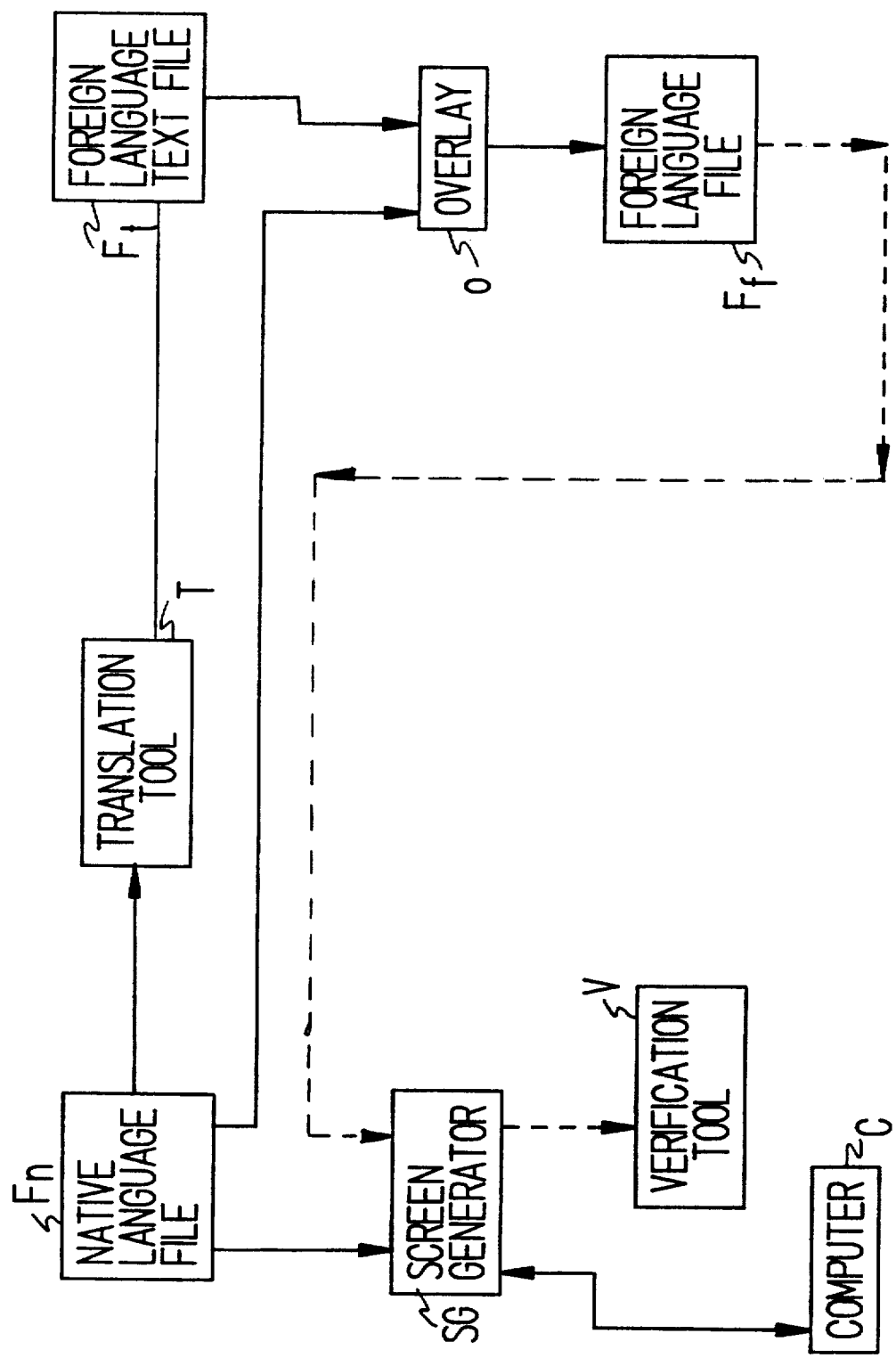
FIG. 1 is a block diagram of an overall translation system of the invention.

In the block diagram of FIG. 1 native language, file Fn contains format instructions, native words to be translated and comment information for the purpose of aiding the translator in making a more apt selection of foreign words to be substituted for the native words. As noted in the example set forth immediately below, the format instructions are in clear language, the native words to be translated are in quotes and the comment information is preceded by a dollar sign ($). Thus, each type of information can be separately identified from its grammatical construction.

EXAMPLE OF NATIVE LANGUAGE FILE

```
Native Language:
   assign :   screen  * Assign patient frame
       bsec :           sector at (0,239) absolute pixels * Bottom sector
                     * Assign touch-key
              asgkey :  touch prog transl 7 × 1 centered at (18,10) relative
                       pixels in color central with action 2 assgn:
                       'assign'
                       $ This key when touched will display the Sector
                       $ Assignment Frame
                     * Unassign touch-key
              unakey :  touch repeat asgkey: at (100,10) with action 2
                       unassn: 'unassgn'
                       $ This key when touched will display the Unassign
                       $ Verification Frame.
                       end
                     * User instructions
              text1  :  text prog transl 48 leftj at (0,40) in color
                       central
                       $ First line of user instructions telling the user
                       $ what action to take
                       'Touch key to assign or change a sector'
```

EXAMPLE OF NATIVE LANGUAGE FILE -continued

```
                end
    text 2    : text repeat text1: at (0,55)
                $ Instruction informing the user that if the
                $ (unassgn) touch-key is activated, all central
                $ monitoring will stop for that bed.
                'Touch (unassgn) to stop all central monitoring.'
                end
        end * sector bsec
end * screen assign
```

If the file is to be used for forming displays in the native language in a computer, the information in the native language file Fn is directly used by a screen generator SG to form the desired displays on the cathode ray tube, not shown, contained in the computer C.

But if the file Fn is to be used with apparatus employing a foreign language, suitable foreign words must be substituted in the file Fn, yielding a foreign language file Ff. A translation tool T scans the native language file Fn and resents the native words in quotes at certain places on the screen of its cathode ray tube, not shown, as well as the comment messages indicated by the dollar sign ($). From the instructions for the format to be used in the display in the computer, the translation tool derives information as to the size and shape of the space allotted to the native words to be translated and presents them on a screen in such manner that this space can be readily identified. A blank space of identical dimensions but having no letters in it is also presented at a convenient location on the screen. Various means for providing the identification of the space may be used, e.g., outlining or inverse video. FIG. 1A illustrates the use of the latter technique in presenting the word "assign" from the native language file Fn set forth above. When the native language to be translated is one or two words as in the case of "assign", it is expedient for the blank space for the foreign word to be placed at one side, as in FIG. 1A; but if the native words form a line or several lines as may be the case in help prompts, the blank space may be below the space occupied by the native text.

In addition to the native words in quotes that are to be translated, the translation tool presents the comment language grammatically denoted by a dollar sign ($).

Means are provided for the translator to insert suitable foreign language words in the indicated blank spaces. If the word selected is too long, any characters beyond the maximum word length cannot be entered in the blank space so that the translator will know that another foreign word or words must be found. FIG. 1B shows that, although the English word "assign" has six letters, the identified space is for seven letters so that the German word "zuweisn" fits in the allotted space.

The translated words may be verified by printing them on paper for review purposes. In any event, they are stored in a foreign language text file Ft, and an overlay means O is provided for merging the information in the files Fn and Ft so as to provide a foreign language file Ff that is the same as Fn except that a foreign word such as "zuweisn" is substituted for the native quoted word such as "assign". The foreign language file Ff set forth below can be used with the same equipment to form displays in the foreign language. The translation needs to be done only once, because once a foreign language file Ff has been created, it can be copied.

In some situations, the design of the various means in an equipment for forming displays is available before the design of the rest of the equipment so that testing of the display process can be performed by providing a verification tool V that forms displays in the same way as the completed equipment will do and controlling it with the screen generator SG when the latter is coupled to the foreign language file Ff as indicated by the dashed lines in FIG. 1.

Figure 1C:
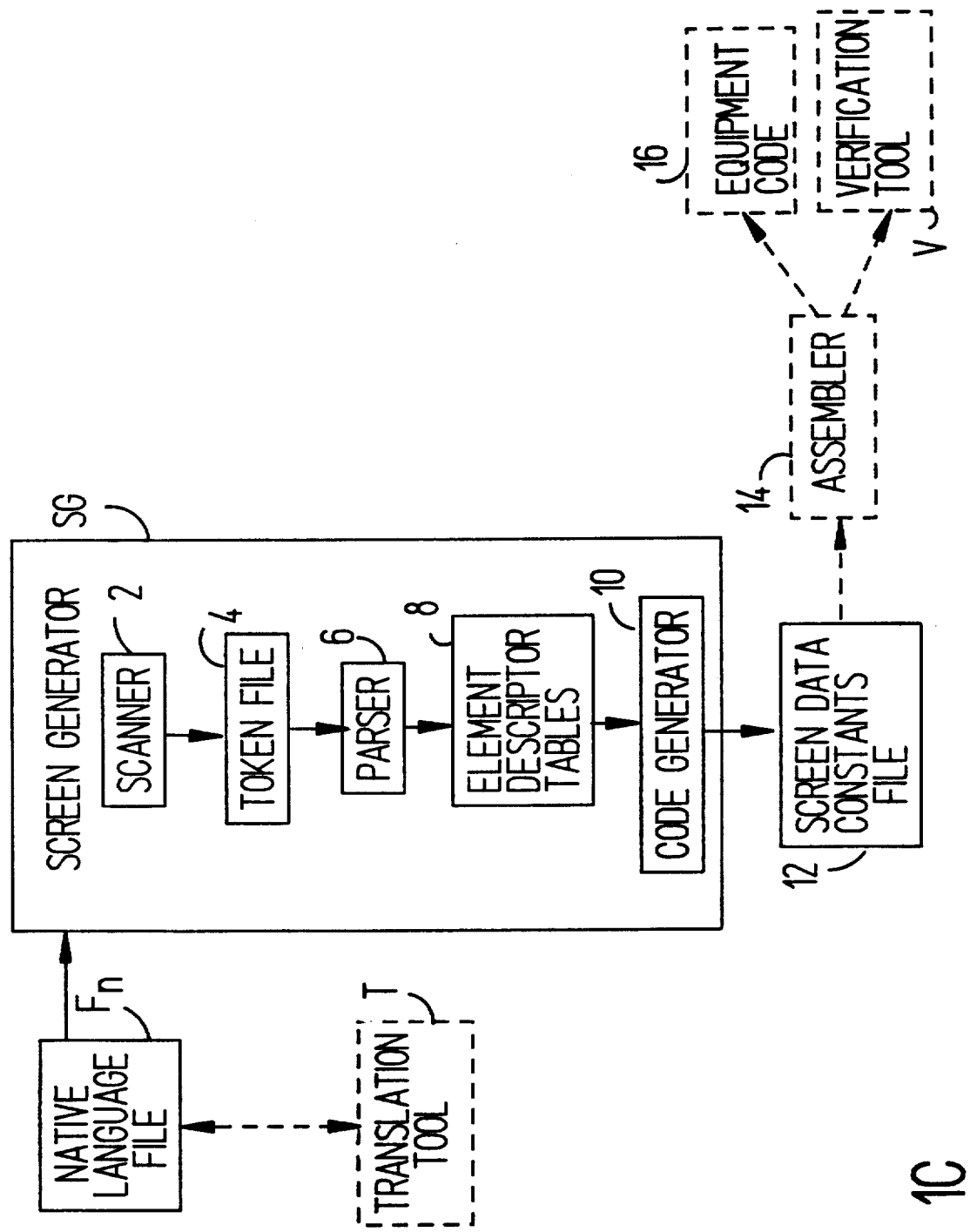
FIG. 1C is a block diagram including elements of and illustrating the use of the screen generator of FIG. 1.

Although screen generators are well known to those skilled in the art, reference is now made to FIG. 1C for a more detailed description of same. In this particular case, the generator is operated by a Hewlett-Packard 9000-S500 computer in accordance with a program set forth at the end of the specification.

The native language file Fn is coupled to a screen generator SG that acts as a compiler for deriving the assembly language required to drive a cathode ray tube. The screen generator SG is comprised of a scanner 2 that pulls out each word in the file Fn in sequence and stores a numerical representation thereof in a token file 4 that checks to see if each word is in its vocabulary, a parser 6 that checks the grammar, element descriptor tables 8 that provide abbreviations for certain phrases, and a code generator 10 that provides the required assembly language. The output of the code generator 10 is read into a screen data constants file 12. An assembler 14 translates the constants into language stored in a file 16 that can be used to control the computer C.

If desired, the translation can be checked by applying it from the assembler 14 to a verification tool V which operates in the same manner as the video portion of the equipment.

Reference is now made to FIG. 1D for a description of a translation tool of this invention. It is controlled by a Hewlett-Packard 150 Personal Computer in accordance with a program set forth at the end of the specification.

An indexer 22 scans the file Fn and calculates from the format information therein the locations of all text to be translated, stores indeces of the text and its allotted length, and reserves space in an indexed language text file Fi.

A formatter 24 reads the indexed language text file Fi and reformats the text to be displayed on a screen of a cathode ray tube 26 showing the native language to be translated as well as the comment information indicated by dollar signs ($). The actual operation of the cathode ray tube 26 is via an input/output driver 28. When the translator types the foreign word to be substituted for the native word on a keyboard 30 of the computer, the foreign word appears in the blank space reserved for it as indicated in FIG. 1B. If requested by the user, the translated text is stored in a foreign language text file Ft by an updating means 33.

After part or all of the translation is completed in this manner, a report can be printed by a report generator 34 so that the native and foreign language words can be compared, but this is not essential.

When the translation is complete and all foreign words have been loaded into the foreign language text file Ft, the foreign language file Ff is generated by storing the foreign language words in the places reserved for them. An overlay means 0 that is coupled to the foreign language text file Ft and to the native language file Fn merges the native language text in Fn and the translated language of the intermediate file 32 so as to produce the foreign language file Ff that can be used with a computer to be used by those familiar with the particular foreign language. The file Ff is simply substituted for the file Fn. When this is done, the portion of the file Fn previously set forth will appear as set forth below when the foreign language is German. If, after verification of the foreign language, it is found that corrections are necessary, the foreign language file Ff may be used as input to the translation tool T to permit corrections to be made.

EXAMPLE OF FOREIGN LANGUAGE FILE

```
Foreign Language:

assign : screen    * Assign patient frame
    bsec   : sector at (0,239) absolute pixels * Bottom sector
           * Assign touch-key
      asgkey : touch prog transl 7x1 centered at (18,10) relative
               pixels in color central with action 2 assgn:
               'Zuweisn'
               $ This key when touched will display the Sector
               $ Assignment Frame
             * Unassign touch-key
      unakey : touch repeat asgkey: at (100,10) with action 2
               unassn: 'Abwahl'
               $ This key when touched will display the Unassign
               $ Verification Frame.
               end
             * User instructions
      text1  : text prog transl 48 leftj at (0,40) in color
               central
               $ First line of user instructions telling the user
               $ what action to take
               'Sektor zuweisen/andern: entspr. Taste antippen.'
               end
      text2  : text repeat text1: at (0,55)
               $ Instruction informing the user that if the
               $ (unassgn) touch-key is activated, all central
               $ monitoring will stop for that bed.
               'Zentr. Uberwachg ausschalten: (Abwahl.> antippen'
               end
    end * sector bsec
end * screen assign
```

SCREEN GENERATOR PROGRAM

```
/****************************************************/
/*                                                  */
/* PARSER - parses tokens from scanner              */
/*          for Orion Screen Generator.             */
/*                                                  */
/*    Syntax: scanner < input | parser output       */
/*            where input - is screen input         */
/*                  description (see scanner)       */
/*                  output - is screen data         */
/*                  constants output file (see      */
/*                  code_gen) and include files     */
/*                  (see gen_inclu)                 */
/*                                                  */
/*          There are NO user prompts.              */
/*                                                  */
/*    SJH Version 1.0 11/26/84                      */
/*                                                  */
/****************************************************/
```

```c
/***** Global defines *****************************/
/* include files */
# include "stdio.h"
# include "ctype.h"
# include "token.class"
# include "screeng.i"

/* Preprocessor options - comment out if not desired */
/*   * ALL options may be invoked simultaneously *   */
/* DEBUG - invokes a lot of print statements for tracing */
/* STATS - prints statistics of memory usage */
/* SAVEM - changes memory allocation scheme to reduce Memory */
/*         but increase CPU time */
/* # define DEBUG */
define STATS
/* # define SAVEM */

/* Data constants */
# define MAXLINE 80     /* Maximum number of chars in an input line */
# define BLOCK_SIZE 1024 /* size of each memory allocation in bytes */
# define SZENTRIES 30   /* number of entries/table */
# define SIZE_T sizeof(struct table)
# define SIZE_E sizeof(struct element)
# define SIZE_TABLE sizeof(struct t_entry)
# define TABLE_STRUCT 1   /* Structure type for table */
# define ELEMENT_STRUCT 2 /* Structure type for element */
# define T_ENTRY_STRUCT 3 /* Structure type for t_entry */

/***** Global variables *****************************/
    int   nxstate, /* for loop count */
    int   nxtoken; /* for loop count */
    char  token_name[100][20]; /* Token names */
    int   cstate = 0,  /* Current state number */
    int   cclass = 0;  /* Current class number */
    int   error = 0;  /* Error message number */
    int   err_mod = 0; /* Error modifier */
    int   line_ct = 1; /* Input line counter */
    char  tlabel[6]; /* temporary label */
    int   total_errors = 0; /* Total error count */
    short lastx = -1; /* Last x coordinate */
    short lasty = -1; /* Last y coordinate */
    short absx; /* last sector absolute X coordinate */
    short absy; /* last sector absolute Y coordinate */
    int   curr_tabct = 0; /* Current entry number for "table" */
    char  buf[BUFSIZ]; /* stderr output buffer */
    int area_help = 0; /* flag 0 if area, 1 if help */
    int help_linect = 0; /* counter for help text lines */
    int help_chars = 0; /* number of chars per help line */
    int help_lines = 0; /* user-entered help line count */
    int field_decr = 0; /* correction for hex chars in touch-keys */ char *curr;  /* pointer to current lowest level entry */ typedef char *c_ptr;
        typedef struct table *t_ptr;
        typedef struct element *e_ptr;
        typedef struct t_entry *tab_ptr;
        typedef e_ptr *te_ptr;
```

```
struct table { /* Ptrs to all subsequent elements */
    char struct_type; /* structure type */
    char ct; /* total number of entries */
    struct table *prev; /* Pointer to previous table */
    struct table *next; /* Pointer to next table */
    struct element *e[SZENTRIES]; /* Pointers to each element */
};
struct tab_entry { /* Entry for "table" element */
    char str[MAXSTRING+1]; /* Must be character string */
};
struct t_entry { /* Entry for "table" */
    char struct_type; /* structure type */
    struct table *prev; /* Pointer back to start of table */
    char element_type; /* Element type - always 7 */
    char label[MAXLABEL+1]; /* table label */
    short length. /* Number of elements */
    char trans_untrans; /* Translatable/untranslatable flag */
    struct t_entry *next; /* Pointer to next t_entry */
    struct tab_entry e[SZENTRIES]; /* entries */
};
struct location { /* generic location structure */
    short x; /* X coordinate */
    short y; /* X coordinate */
    char units; /* pixel or char */
    char rel_abs; /* relative or absolute */
};
struct element { /* Entry for any element */
    char struct_type, /* structure type */
    struct table *prev; /* Pointer back to start of table */
    char element_type; /* Element type */
    char label[MAXLABEL+1]; /* Element label */
    short length, /* Length of descriptor */
    char prog_auto; /* Programmatic/automatic flag */
    char trans_untrans; /* Translatable/untranslatable flag */
    struct location loc[2]; /* Location coordinates */
    short field_length; /* Length of field in bytes */
    char size[3]; /* Field dimensions */
    char color; /* Color code */
    char mode; /* Display mode */
    char char_size; /* Large/small flag */
    char orient; /* Vertical/horizontal flag */
    char justif; /* Centered/left-justified flag */
    char action; /* Action number */
    char act_utp; /* Action UTP key number */
    char act_label[6]; /* Action label */
    char str[MAXSTRING+1]; /* Actual string */
    struct table *t; /* Pointer to area table */
};

c_ptr cptr;    /* Pointer to a character string */
t_ptr base;    /* Pointer to the start of the first table */
t_ptr tptr;    /* Pointer to the current table */
e_ptr eptr;    /* Pointer to the current element */
te_ptr teptr;  /* Pointer to the current entry */
tab_ptr tabptr; /* Pointer to the current "table" entry */
```

```
# ifdef STATS
    int mem_alloc; /* amount of memory allocated */
    int mem_needed; /* amount of memory actually needed */
endif main(argc,argv)
int argc; /* ct of arguments passed */
char **argv; /* ptr to ptr to file name */
{
    FILE *fopen(), *sfp; /* state table file pointer */ int   inline[MAXLINE]; /* input line */
    int   maxstate; /* maximum number of states */
    int   maxtoken; /* maximum number of tokens */
    char  *sname; /* State table file */
    int   nstate; /* New state number */
    int   action = 0; /* Action number to take */
    int   state[100][100][4]; /* THE STATE TABLE */
    int   match; /* number of items matched in scanf call */
    int   not_done = 1; /* end flag */
    int   defalt[4]; /* scratch */
    int   i; /* scratch */
    int   j; /* scratch */
    int   k; /* scratch */
    char  ichar; /* scratch */
    char  *gen_inclu; /* run string to execute include file generator */

/********** Function declarations **************/
int process_error();
int init_ptrs();
extern int code_gen();
int make_entry();
int modify_element();
int enter_location();
int modify_location();
int enter_field();
int modify_field();
int enter_fsize();
int enter_action();
int repeat_entry();
int enter_table();
int process_end();
char *allocate();
int calculate_loc();

/********** CODE ****************************/
setbuf(stderr,buf); /* make standard error buffered */
fprintf(stderr,"Starting Parser...\n");
/* Read state table into arrays */
sname = "state_table";
if ((sfp = fopen(sname,"r"))==NULL) {/* state table not exist */
  fprintf(stderr,"State table does not exist.\n");
  fprintf(stderr,"Run state state_table\n");
  return;
}
fprintf(stderr,"Reading state table...");
fflush(stderr);
```

```
/* Get maximum number of states and tokens */
fgets(inline,MAXLINE,sfp);
sscanf(inline,"%d %d",&maxstate,&maxtoken);
mxstate=maxstate-1;
mxtoken=maxtoken-1;
/* Get name for each token */
for (i=0;i<=mxtoken;++i) {
  fgets(inline,20,sfp);
  sscanf(inline,"%s",token_name[i]);
}
for (i=0;i<=mxstate;++i) {
  for (j=0;j<=mxtoken;++j) {
    fgets(inline,MAXLINE,sfp);
    sscanf(inline,"%d %d %d %d",&defalt[0],&defalt[1],&defalt[2],
          &defalt[3]);
    for (k=0;k<=3;++k) {
       state[i][j][k]=defalt[k];
    }
  }
}
fprintf(stderr,"\n"); /* Done echo */
fflush(stderr);
fclose(sfp);
/******************************************************/
/*                                                    */
/* Finite state automata starts here. The basic idea  */
/* is to receive tokens from the scanner. Each token  */
/* is of a certain token class. That class and the    */
/* current state are looked up in the state table.    */
/* From the we can derive the new state, the          */
/* appropriate action to take in that state (if any)  */
/* and any error conditions to be flagged.            */
/*                                                    */
/* The states and token classes in the state table    */
/* are best explained by a state diagram which exists */
/* external to this program. The error messages are   */
/* described in the function: process_error below     */
/*                                                    */
/* Summary of states:                                 */
/* States 0-3   "Screen" processing                   */
/* States 4-11, "Sector" processing                   */
/*       37-38                                        */
/* States 12-14 "Area" and "Help" processing          */
/* States 15-19 "Line" processing                     */
/* States 20-23 "Text" processing                     */
/* States 24-27 "Wave" processing                     */
/* States 28-33 "Touch" processing                    */
/* States 34-36 "Table" processing                    */
/* States 37-39 --- not used --- (available)          */
/* States 40    "End-of-file" processing              */
/*                                                    */
/* The actions to be taken are described as follows:  */
/* Action 0 - none (for ignoring words like "at")     */
/* Action 1 - temporarily save label                  */
/* Action 2 - make new entry in element table         */
/* Action 3 - element modifier (auto prog transl untranl*/
```

```
/* Action 4  - location entry (starting if two)      */
/* Action 5  - location modifier (abs rel pixel char) */
/* Action 6  - ending location entry                 */
/* Action 7  - field entry                           */
/* Action 8  - field modifier (small large inverse etc) */
/* Action 9  - field size (length or d_length)       */
/* Action 10 - action length and label and VTP key number*/
/* Action 11 - repeat entry (for label following repeat) */
/* Action 12 - table entry (strings or lengths)      */
/* Action 13 - handle END                            */
/* Action 14 - new line                              */
/* Action 15 - handle end of file                    */
/*                                                   */
/*****************************************************/
init_ptrs(); /* initialize pointer tables */
while (not_done) {
  match=scanf("%d",&cclass);
  if (match==EOF) cclass=END_OF_FILE;
  nstate=state[cstate][cclass][0]; /* new state */
  action=state[cstate][cclass][1]; /* action to take */
  error=state[cstate][cclass][2]; /* error, if any */
  err_mod=state[cstate][cclass][3]; /* error modifier */ ifdef DEBUG
        printf("   State: %d Action: %d Error: %d Error_mod: %d\n",
                nstate,action,error,err_mod);
        fflush(stdout);
endif
        cstate=nstate;
        if (error!=0) process_error(); /* do error handling */
        /*******************/
        /*  DO THE WORK   */
        /*******************/
        switch (action) {
          case 0: /* do nutin' */
          break;
          case 1: /* save label temporarily */
            scanf("%s %d",tlabel,&i);
            tlabel[i] = '\0';
# ifdef DEBUG
            printf("Label \"%s\"\n",tlabel);
            fflush(stdout);
endif
          break;
          case 2: /* make element entry into table */
            make_entry(); /* enter into table & allocate entry */
            set_defaults(); /* setup default for appropriate entry */
            tlabel[0] = '\0';
          break;
          case 3: /* element modifier */
            modify_element();
          break;
          case 4: /* location (starting) entry */
            enter_location(0);
          break;
          case 5: /* location modifier */
            modify_location();
          break;
```

```
     case 6: /* ending location entry */
       enter_location(1);
       break;
     case 7: /* string entry */
       enter_field();
       break;
     case 8: /* field modifier */
       modify_field();
       break;
     case 9: /* field size */
       enter_fsize();
       break;
     case 10: /* action number & label */
       enter_action();
       break;
     case 11: /* repeat entry */
       repeat_entry();
       break;
     case 12: /* table entry (string or number) */
       enter_table();
       break;
     case 13: /* end handling */
       process_end();
       break;
     case 14: /* new line */
       ++line_ct;
       break;
     case 15: /* end of file */
       /* Check if not here prematurely, did we traverse the */
       /* pointer tables correctly ? */
       if (error == 0 && eptr != NULL) {
         error = 8;
         process_error();

}
         not_done = 0; /* break the loop */
         break;
       default: /* illegal action */
         error=21;
         process_error();
         break;
     } /* end action case */
     if (action != 15) gets(inline); /* read rest of input line */
   } /* end while */
   fprintf(stderr,"Scanner complete. Any errors are listed above.\n");
   fprintf(stderr,"Parser complete. %d errors\n",total_errors);
   /* Do code generation */
   if (total_errors==0) {
      fprintf(stderr,"Starting Code Generator...\n");
      total_errors=0;
      code_gen(argc,argv);
      fprintf(stderr,"Code Generator complete. %d errors\n",total_errors);
   }
   else {
      fprintf(stderr,"Code Generator NOT executed.\n");
```

```c
        }
        /* Do include file generation */
        if (total_errors==0) {
            gen_inclu = "gen_inclu"; /* shell file to execute */
            fprintf(stderr,"Starting Include File Generator...\n");
            total_errors = system(gen_inclu);
            fprintf(stderr,"Include File Generator completed with return code %d\n",
                    total_errors);
        }
        else {
            fprintf(stderr,"Include File Generator NOT executed.\n");
        }
# ifdef STATS
        fprintf(stderr,"Total memory requested %d bytes\n",mem_needed);
        fprintf(stderr,"Total memory allocated %d bytes\n",mem_alloc);
# endif
        if (total_errors == 0) {
            exit(0);
        }
        else {
            exit(99);
        }
    } /* blow this popsicle stand */

/**************************************************************/
/********** Function definitions *****************************/
/**************************************************************/

/**************************************************************/
/*                                                            */
/*  Process_error:                                            */
/*    Output error messages to stderr for                     */
/*    Parser.                                                 */
/*                                                            */
/**************************************************************/
process_error() /* error handler */
{
    ++total_errors;
    if (line_ct > 0) { /* error message for parser */
        fprintf(stderr,"ERROR, line %d: ",line_ct);
    }
    else { /* error message for code generator */
        fprintf(stderr,"ERROR, Code Generator: ");
    }
    switch (error) {
        case 0: break; /* no error should not be here */
        case 1:
            if (err_nod==0) {
                fprintf(stderr,"Unexpected token \"%s\"\n",token_name[cclass]);
            }
            else {
                fprintf(stderr,"Expected \"%s\" found \"%s\"\n",token_name[err_nod],
                        token_name[cclass]);
            }
            break;
        case 2: break; /* not defined */
```

```
case 3:
  fprintf(stderr,"Unexpected end of file\n");
  break;
case 4:
  fprintf(stderr,"Premature end statement\n");
  break;
case 5:
  fprintf(stderr,"Can not nest \"%s\"\n",token_name[cclass]);
  break;
case 6:
  fprintf(stderr,"Possible missing end statement\n");
  break;
case 7:
  fprintf(stderr,"Can not find repeat label \"%s\"\n",tlabel);
  break;
case 8:
  fprintf(stderr,"Parser hopelessly lost in a wrath of pointers.\n");
  break;
case 9:
  fprintf(stderr,"Null \"%s\" entry\n",token_name[err_nod]);
  break;
case 10:
  fprintf(stderr,"Starting/Ending location not entered\n");
  break;
case 11:
  fprintf(stderr,"Location specified is off the screen\n");
  break;
case 12:
  fprintf(stderr,"Element specified ends off the screen\n");
  break;
case 13:
  fprintf(stderr,"String not entered\n");
  break;
case 14:
  fprintf(stderr,"Text size not entered\n");
  break;
case 15:
  fprintf(stderr,"Touch label string not entered\n");
  break;
case 16:
  fprintf(stderr,"Touch key size not entered\n");
  break;
case 17:
  fprintf(stderr,"Touch action number not entered\n");
  break;
case 18:
  fprintf(stderr,"Wave length not entered\n");
  break;
case 19:
  fprintf(stderr,"Invalid touch key size\n");
  break;
case 20:
  fprintf(stderr,"Illegal state, check state table\n");
  break;
case 21:
  fprintf(stderr,"Illegal action, check state table\n");
  break;
```

```
    case 22:
      fprintf(stderr,"Illegal token, check state table or parser\n");
      break;
    case 23:
      fprintf(stderr,"Invalid action number\n");
      break;
    case 24:
      fprintf(stderr,"Code generator output file not specified.\n");
      break;
    case 25:
      fprintf(stderr,"Can not open output file.\n");
      break;
    case 26:
      fprintf(stderr,"Line must be vertical or horizontal\n");
      break;
    case 27:
      fprintf(stderr,"Illegal help text size and/or number of lines\n");
      break;
    case 28:
      fprintf(stderr,"Illegal node combination for text or touch\n");
      break;
    case 29:
      fprintf(stderr,"label file not specified.\n");
      break;
    case 30:
      fprintf(stderr,"Can not open label file.\n");
      break;
    case 31:
      fprintf(stderr,"Double vertical lines NOT supported\n");
      break;
    default:
      fprintf(stderr,"Illegal error, check state table\n");
      break;
  } /* end case */
} /* END process_error */

/*********************************************************/
/*                                                       */
/*   Allocate                                            */
/*   Allocate dynamic memory for Parser                  */
/*   tables. Will allocate memory in blocks              */
/*   unless SAVEM is defined.                            */
/*                                                       */
/*   Calling sequence.                                   */
/*       ptr=allocate(size)                              */
/*            ptr - pointer to free area in              */
/*                  memory                               */
/*            size - amount of memory desired            */
/*                   in bytes                            */
/*                                                       */
/*   *NOTE*                                              */
/*   allocate will halt processing with an               */
/*   exit code of 99 if it can not satisfy               */
/*   the memory request.                                 */
/*                                                       */
/*********************************************************/
char *allocate(size)
int size; /* size is in bytes */
```

```
{
    extern char *calloc();
    static int whats_left = 0;
    static char *cp;
    char *ret_ptr;
# ifdef SAVER
    /* If want to save memory, just allocate what was */
    /* requested each time (costs in CPU time) */
    cp = calloc(1,size);
    if (cp == NULL) {
       fprintf(stderr,"Insufficient memory. Break up file and rerun.\n");
       exit(99);
    }
# ifdef STATS
    mem_needed += size;
    mem_alloc += size;
# endif
    return(cp);
# else
    /* Allocate blocks of memory at a time */
    /* wastes memory but save on CPU time */
    if (size>whats_left) {
      if (size <= BLOCK_SIZE) {
         cp = calloc(1,BLOCK_SIZE);
         if (cp == NULL) {
            fprintf(stderr,"Insufficient memory. Break up file and rerun.\n");
            exit(99);
         }
         whats_left = BLOCK_SIZE;
# ifdef STATS
         mem_alloc += BLOCK_SIZE;
# endif
      }
      else { /* Asking for a really big block */
             /* Just allocate the exact size */
         cp = calloc(1,size);
         if (cp == NULL) {
            fprintf(stderr,"Insufficient memory. Break up file and rerun.\n");
            exit(99);
         }
         whats_left = size;
# ifdef STATS
         mem_alloc += size;
# endif
      }
    }
# ifdef STATS
    mem_needed += size;
# endif
    ret_ptr = cp;
    cp += size;
    whats_left = whats_left - size;
    return (ret_ptr);
# endif
}
```

```
/************************************************/
/*                                              */
/*  Init_ptrs :                                 */
/*    initialize main table                     */
/*                                              */
/************************************************/
init_ptrs()
{
   char *allocate();
   base = tptr = (t_ptr)allocate(SIZE_T);
# ifdef DEBUG
   printf("Base->%x\n",base);
   fflush(stdout);
endif
   curr = (c_ptr)tptr;
   tptr->struct_type = TABLE_STRUCT;
   tptr->ct = 0;
   tptr->prev = NULL;
   tptr->next = NULL;
}
/************************************************/
/*                                              */
/*  Make_entry :                                */
/*    Add entry to appropriate table            */
/*                                              */
/************************************************/
make_entry()
{
   char *allocate();
# ifdef DEBUG
   printf("Making entry for class %d\n",cclass);
   fflush(stdout);
endif
   if (tptr->ct == SZENTRIES) { /* Allocate new table */
# ifdef DEBUG
   printf("Allocating new table\n");
   fflush(stdout);
endif
      tptr->next = (t_ptr)allocate(SIZE_T);
      tptr->next->prev = tptr;
      tptr = tptr->next;
      tptr->struct_type = TABLE_STRUCT;
      tptr->ct = 0;
      tptr->next = NULL;
   }
   ++(tptr->ct);
   if (cclass == TABLE) { /* allocate t_entry */
      tabptr = (tab_ptr)allocate(SIZE_TABLE);
      tptr->e[(tptr->ct)-1] = (e_ptr)tabptr;
      curr = (c_ptr)tabptr;
      tabptr->struct_type = T_ENTRY_STRUCT;
      tabptr->prev = tptr;
      tabptr->next = NULL;
      /* also save pointer in eptr */
      eptr = (e_ptr) tabptr;
# ifdef DEBUG
      printf("Entry for \"TABLE\" ->%x\n",curr);
      fflush(stdout);
```

```
# endif
   }
   else { /* all other entries */
      tptr->e[(tptr->ct)-1] = eptr = (e_ptr)allocate(SIZE_E);
      eptr->prev = tptr;
      curr = (c_ptr)eptr;
      eptr->struct_type = ELEMENT_STRUCT;
      eptr->t = NULL;
# ifdef DEBUG
   printf("Entry for element ->%x\n",curr);
   fflush(stdout);
endif
   }
   if ((cclass == SCREEN) || (cclass == SECTOR) || (cclass == AREA)) {
      /* allocate new table */
      eptr->t = (t_ptr)allocate(SIZE_T);
      eptr->t->prev = (t_ptr)eptr;
      tptr = eptr->t;
      tptr->struct_type = TABLE_STRUCT;
      tptr->ct = 0;
      tptr->next = NULL;
# ifdef DEBUG
   printf("Entry for element table ->%x\n",tptr);
   fflush(stdout);
endif
   }
} /* end make_entry */

/****************************************************/
/*                                                  */
/*   Set_defaults :                                 */
/*      Enter defaults for approriate entry.        */
/*                                                  */
/****************************************************/
set_defaults()
{
   switch (cclass) {
      case AREA:
         eptr->element_type = AREA_TYPE;
         strcpy(eptr->label,tlabel);
         eptr->length = -1;
         area_help = 0; /* assume not help */
         help_linect = 0; /* number of text lines for help */
         break;
      case LINE:
         eptr->element_type = LINE_TYPE;
         strcpy(eptr->label,tlabel);
         eptr->prog_auto = AUTO_FLAG;
         eptr->length = -1;
         eptr->color = WHITE_COLOR;
         eptr->mode = DOTTED_MODE;
         eptr->loc[0].units = PIXEL_UNITS;
         eptr->loc[0].rel_abs = REL_FLAG;
         eptr->loc[0].x = -1;
         eptr->loc[0].y = -1;
         eptr->loc[1].x = -1;
```

```
    eptr->loc[1].y = -1;
    eptr->char_size = DOUBLE_LINE;
    break;
case SCREEN:
    eptr->element_type = SCREEN_TYPE;
    strcpy(eptr->label,tlabel);
    eptr->length = -1;
    break;
case SECTOR:
    eptr->element_type = SECTOR_TYPE;
    strcpy(eptr->label,tlabel);
    eptr->length = -1;
    eptr->loc[0].units = PIXEL_UNITS;
    eptr->loc[0].rel_abs = ABS_FLAG;
    eptr->loc[0].x = -1;
    eptr->loc[0].y = -1;
    eptr->loc[1].x = -1;
    eptr->loc[1].y = -1;
    absx = -1;
    absy = -1;
    break;
case TABLE:
    tabptr->element_type = TABLE_TYPE;
    strcpy(tabptr->label,tlabel);
    tabptr->trans_untrans = TRANS_FLAG;
    tabptr->length = -1;
    curr_tabct = 0;
    break;
case TEXT:
    eptr->element_type = TEXT_TYPE;
    strcpy(eptr->label,tlabel);
    eptr->prog_auto = PROG_FLAG;
    eptr->trans_untrans = TRANS_FLAG;
    eptr->length = -1;
    eptr->color = WHITE_COLOR;
    eptr->mode = NORMAL_MODE;
    eptr->loc[0].units = PIXEL_UNITS;
    eptr->loc[0].rel_abs = REL_FLAG;
    eptr->loc[0].x = -1;
    eptr->loc[0].y = -1;
    eptr->orient = HORIZ_FLAG;
    eptr->justif = LEFTJ_FLAG;
    eptr->field_length = -1;
    eptr->str[0] = '\0';
    eptr->char_size = SMALL_FLAG;
    eptr->size[0] = -1;
    break;
case TOUCH:
    eptr->element_type = TOUCH_TYPE;
    strcpy(eptr->label,tlabel);
    eptr->prog_auto = PROG_FLAG;
    eptr->trans_untrans = TRANS_FLAG;
    eptr->length = -1;
    eptr->color = WHITE_COLOR;
    eptr->mode = NORMAL_MODE;
    eptr->loc[0].units = PIXEL_UNITS;
```

```
            eptr->loc[0].rel_abs = REL_FLAG;
            eptr->loc[0].x = -1;
            eptr->loc[0].y = -1;
            eptr->orient = HORIZ_FLAG;
            eptr->justif = CENTERED_FLAG;
            eptr->field_length = -1;
            eptr->str[0] = '\0';
            eptr->char_size = SMALL_FLAG;
            eptr->size[0] = -1;
            eptr->action = -1;
            eptr->act_label[0] = '\0';
            eptr->act_vtp = -1;
            field_decr = 0;
            break;
        case WAVE:
            eptr->element_type = WAVE_TYPE;
            strcpy(eptr->label,tlabel);
            eptr->prog_auto = PROG_FLAG;
            eptr->length = -1;
            eptr->color = WHITE_COLOR;
            eptr->loc[0].units = PIXEL_UNITS;
            eptr->loc[0].rel_abs = REL_FLAG;
            eptr->loc[0].x = -1;
            eptr->loc[0].y = -1;
            eptr->size[0] = -1;
            eptr->field_length = WAVE_Y;
            break;
        default:
            fprintf(stderr,"ERROR set_defaults: illegal case %d\n",cclass);
            exit(99);
    } /* end case */
# ifdef DEBUG
    printf("Defaults set for class %d\n",cclass);
    fflush(stdout);
endif
} /* end set_defaults */

/****************************************************/
/*                                                  */
/*  Modify_element                                  */
/*    Modify element descriptor, handles :          */
/*    auto, prog, transl, untransl                  */
/*                                                  */
/****************************************************/
modify_element()
{
    e_ptr temp; /* scratch */ switch (cclass) {
        case AUTO:
            eptr->prog_auto = AUTO_FLAG;
            break;
        case PROG:
            eptr->prog_auto = PROG_FLAG;
            break;
```

```
      case TRANSL:
        temp = (e_ptr)curr;
        if (temp->struct_type == ELEMENT_STRUCT) {
          eptr->trans_untrans = TRANS_FLAG;
        }
        else { /* must be a table */
          tabptr->trans_untrans = TRANS_FLAG;
        }
        break;
      case UNTRANSL:
        temp = (e_ptr)curr;
        if (temp->struct_type == ELEMENT_STRUCT) {
          eptr->trans_untrans = UNTRANS_FLAG;
        }
      else { /* must be a table */
        tabptr->trans_untrans = UNTRANS_FLAG;
      }
      break;
    default:
      fprintf(stderr,"ERROR modify_element: illegal case %d\n",cclass);
      exit(99);
  } /* end case */
} /* end modify_element */

/***************************************************/
/*                                                 */
/*   Enter_location :                              */
/*   Enter location coordinates for element.       */
/*   Location is in the form: (x,y) or (x) or      */
/*   (,y) or () or (,).  The last two are          */
/*   flagged as warnings by the Scanner.           */
/*   The Scanner returns these in the form:        */
/*        x...x length_of_x y...y length_of_y      */
/*        where the entry is -1 0 if not entered   */
/*                                                 */
/* Calling sequence:  enter_location(numb)         */
/*      where numb is either 0 or 1 for            */
/*      starting or ending location, respectiv     */
/*                                                 */
/***************************************************/
enter_location (numb)
int numb; /* starting (0) or ending (1) */
{
  int x;   /* x coordinate */
  int y;   /* y coordinate */
  int xlen; /* length of x */
  int ylen; /* length of y */ scanf("%d %d %d %d",&x,&xlen,&y,&ylen); /* get location */
  if (xlen==0) x = lastx; /* default x */
  if (ylen==0) y = lasty; /* default y */
  if (x < 0 || x > MAXX_COORD || y < 0 || y > MAXY_COORD) {
    error = 11;
    process_error();
  }
  lastx = eptr->loc[numb].x = x;
  lasty = eptr->loc[numb].y = y;
```

```
/* For sectors only: save starting x and y as absolute coordinates */
/* so that subsequent elements can use relative coordinates */
if (eptr->element_type == SECTOR_TYPE && numb==0) {
   absx = x;
   absy = y;
}
} /* end enter_location */

/***********************************************************/
/*                                                         */
/* Modify_location:                                        */
/* Modify location descriptor, handles :                   */
/*    absolute, relative, char and pixel                   */
/*                                                         */
/***********************************************************/
modify_location()
{
  switch (cclass) {
    case ABSOLUTE:
      eptr->loc[0].rel_abs = ABS_FLAG;
      break;
    case RELATIVE:
      eptr->loc[0].rel_abs = REL_FLAG;
      break;
    case CHAR:
      eptr->loc[0].units = CHAR_UNITS;
      break;
    case PIXEL:
      eptr->loc[0].units = PIXEL_UNITS;
      break;
    default:
      fprintf(stderr,"ERROR modify_location illegal case %d\n",cclass);
      exit(99);
  } /* end case */
} /* end modify_location */

/***********************************************************/
/*                                                         */
/* Enter_field:                                            */
/* Enter field for element.                                */
/*    currently only handles strings.                      */
/*                                                         */
/***********************************************************/
enter_field()
{
  int i; /* scratch */
  char duny; /* scratch */
  int check_for_hex();
  int original_length;

switch (cclass) {
    case STRING:
      /* read length of string and actual string */
      scanf("%d",&i);
      eptr->field_length = i;
      original_length = i;
```

```
            if (eptr->field_length > 0) {
               /* use getchar here because leading blanks are significant */
               dumy = getchar(); /* throw away blanks between ct and string */
               for (i=1;i<=eptr->field_length;++i) {
                  eptr->str[i-1] = getchar();
               }
               eptr->str[eptr->field_length] = '\0';
           /* convert any hex characters */
           check_for_hex(eptr->str,&(eptr->field_length));
           /* If any hex characters compensate for extended length */
           field_decr = original_length - eptr->field_length;
         }
         break;
      default:
         fprintf(stderr,"ERROR enter_field: illegal case %d\n",cclass);
         exit(99);
   } /* end case */
} /* end enter_field */

/*******************************************************/
/*                                                     */
/*   Modify_field:                                     */
/*   Update entry for field within element.            */
/*      handles centered or leftj; vertical;           */
/*      large or small; inverse, blinking,             */
/*      blinking2, bright, normal or off;              */
/*      (colors:) central, slave, red, yellow,         */
/*      green or white.                                */
/*                                                     */
/*******************************************************/ modify_field()
{
   switch (cclass) {
      /* do the colors: colors are logically additive */
      case CENTRAL:
         eptr->color |= CENTRAL_COLOR;
         break;
      case SLAVE:
         eptr->color |= SLAVE_COLOR;
         break;
      case RED:
         eptr->color |= RED_COLOR;
         break;
      case YELLOW:
         eptr->color |= YELLOW_COLOR;
         break;
      case GREEN:
         eptr->color |= GREEN_COLOR;
         break;
      case WHITE:
         eptr->color |= WHITE_COLOR;
         break;
      /* do the display modes */
      case INVERSE:
         eptr->mode |= INVERSE_MODE;
         break;
```

```
    case BLINKING:
      eptr->mode |= BLINKING_MODE;
      break;
    case BLINKING2:
      eptr->mode |= BLINKING2_MODE;
      break;
    case BRIGHT:
      eptr->mode |= BRIGHT_MODE;
      break;
    case NORMAL:
      eptr->mode |= NORMAL_MODE;
      break;
    case OFF:
      eptr->mode |= OFF_MODE;
      break;
    /* do the line type flags */
    case DOTTED:
      eptr->mode = DOTTED_MODE;
      break;
    case SOLID:
      eptr->mode = SOLID_MODE;
      break;
    case SINGLE:
      eptr->char_size = SINGLE_LINE;
      break;
    case DOUBLE:
      eptr->char_size = DOUBLE_LINE;
      break;
    /* do the other flags */
    case LEFTJ:
      eptr->justif = LEFTJ_FLAG;
      break;
    case CENTERED:
      eptr->justif = CENTERED_FLAG;
      break;
    case VERTICAL:
      eptr->orient = VERTICAL_FLAG;
      break;
    case LARGE:
      eptr->char_size = LARGE_FLAG;
      break.
    case SMALL:
      eptr->char_size = SMALL_FLAG;
      break;
    default:
      fprintf(stderr,"ERROR modify_field: illegal case %d\n",cclass);
      exit(99);
  } /* end case */
} /* end modify_field */
```

```
/****************************************************/
/*                                                  */
/*  Enter_fsize:                                    */
/*    Enter size of a field.                        */
/*      handles length and d_length of the form:    */
/*.      n  or  n x p  or n-n x p                   */
/*    Scanner returns in form:                      */
/*      n...n length_of_n n...n length_of_n         */
/*      p...p length_of_p                           */
/*      where 0 0 is used for non-entered fields    */
/*                                                  */
/****************************************************/ enter_fsize()
{
  int duny;  /* scratch */
  int i,j,k; /* scratch */
  switch (cclass) {
    case LENGTH:
      scanf("%d %d",&i,&duny);
      eptr->size[0] = i;
      eptr->size[1] = DEFAULT_KEYX;
      eptr->size[2] = DEFAULT_KEYY;
      break;
    case D_LENGTH:
      scanf("%d %d %d %d %d %d",&i,&duny,&j,&duny,&k,&duny);
      if (j != 0) { /* all three entered */
        eptr->size[0] = i;
        eptr->size[1] = j;
        eptr->size[2] = k;
      }
      else { /* only 2 and 3 entered */
        eptr->size[0] = i * k;
        eptr->size[1] = i;
        eptr->size[2] = k;
      }
      break;
    default:
      fprintf(stderr,"ERROR enter_fsize: illegal case %d\n",cclass);
      exit(99);
  } /* end case */
  /* check for validity */
  if (eptr->element_type != AREA_TYPE) {
    if (eptr->size[0] < 0 || eptr->size[1] < 0 || eptr->size[2] < 0 ) {
      error = 19;
      process_error();
    }
  }
  else { /* must be help then */
    area_help = 1; /* set flag */
    /* check for valid help specification in the form: */
    /*   n chars x 1 lines */
    if (eptr->size[1]<=0 || eptr->size[2]<=0 || eptr->size[1]> MAXSTRING)
      error = 27;
      process_error();
    }
    help_chars = eptr->size[1];
    help_lines = eptr->size[2];
```

} /* end if help */
} /* end enter_fsize */

/*******************************************/
/*                                         */
/* Enter_action:                           */
/* Enter action number, label and vtp key# */
/*                                         */
/*******************************************/

```c
enter_action()
{
   int x;    /* scratch */
   int duny; /* scratch */
   switch (cclass) {
     case LENGTH:
        scanf("%d %d",&x,&duny);  /* get the number */
        if (x < 0) { /* check for validity */
          error = 23;
          process_error();
        }
        if (eptr->action == -1) { /* this is action number */
           eptr->action = x;
        }
        else {
           eptr->act_vtp = x;  /* this is a vtp key number */
        }
        break;
     case LABEL:
        scanf("%s %d",tlabel,&duny);
        strcpy(eptr->act_label,tlabel);
        tlabel[0] = '\0';
        break;
     default:
        fprintf(stderr,"ERROR enter_fsize: illegal case %d\n",cclass);
        exit(99);
   } /* end case */
} /* end enter_fsize */
```

/*******************************************/
/*                                         */
/* Enter_table:                            */
/* Make entry for a string in a "table".   */
/*                                         */
/*******************************************/

```c
enter_table()
{
  int check_for_hex();

char duny; /* scratch */
  int i;  /* scratch */
  int len; /* scratch */
  tab_ptr temp; /* scratch pointer */ switch (cclass) {
    case LENGTH:
       scanf("%d %f",&i,&duny); /* get value */
       tabptr->length = i;
       break;
```

```
   case STRING:
     ++curr_tabct;
     if (curr_tabct > SZENTRIES) { /* overflow-get a new table */
       temp = (tab_ptr)allocate(SIZE_TABLE);
       tabptr->next = temp;
       temp->prev = tptr;
       tabptr = temp;
       tabptr->struct_type = TABLE_STRUCT;
       tabptr->next = NULL;
       tabptr->element_type = TABLE_TYPE;
       curr = (c_ptr) tabptr;
       /* also save pointer in eptr */
       eptr = (e_ptr) tabptr;
       curr_tabct = 1;
     }
     /* get and store the string */
     scanf("%d",&len);
     if (len > 0) {
        /* use getchar here because blanks are significant */
        dumy = getchar(); /* throw away blank between ct and string */
        for (i=1;i<=len;++i) {
          tabptr->e[curr_tabct-1].str[i-1] = getchar();
        }
        tabptr->e[curr_tabct-1].str[len] = '\0';
        /* convert any hex characters */
        check_for_hex(tabptr->e[curr_tabct-1].str,&len);
     }
     else { /* Null string entry */
        tabptr->e[curr_tabct-1].str[0] = '\0';
     }
     break;
   default:
     fprintf(stderr,"ERROR enter_table: illegal case %d\n",cclass);
     exit(99);
 } /* end case */
} /* end enter_table */

/**************************************************/
/*                                                */
/*  Repeat_entry:                                 */
/*  Search for match of repeat label.             */
/*  If found copy entry into current entry.       */
/*                                                */
/**************************************************/
repeat_entry()
{
  int lablen; /* scratch */
  char match; /* match label flag */
  int ict; /* search index */
  t_ptr ttemp; /* temporary table pointer */
  e_ptr etemp; /* temporary element pointer */
  int i; /* scratch */

/* get the label to match */
  scanf("%s %d",tlabel,&lablen);
  tlabel[lablen] = '\0';
```

```
# ifdef DEBUG
    printf("Repeat looking for a match to \"%s\"\n",tlabel);
    fflush(stdout);
endif
    ict = 0;
    match = 0;
    /* if sector point back to screen table */
    if (eptr->element_type == SECTOR_TYPE) {
      tptr = eptr->prev;
    }
    ttemp = tptr; /* start at top of current table */
    while (ttemp->struct_type == TABLE_STRUCT) {
      /* check for match: can not repeat yourself, must be same */
      /* structure type and label must match */
# ifdef DEBUG
    printf("searching...found \"%s\" -> %x\n",ttemp->e[ict]->label,
            ttemp->e[ict]);
    fflush(stdout);
endif
      if ((ttemp->e[ict] != eptr) &&
          (ttemp->e[ict]->element_type == eptr->element_type) &&
          (strcmp(tlabel,ttemp->e[ict]->label)==0)) {
        match = 1; /* we go it !! */
        break;
      }
      /* no match bump the pointer */
      ++ict;
      if (ict==ttemp->ct) { /* run out, back up pointers */
        ttemp = ttemp->prev;
        if (ttemp == NULL) break;
        ict = 0;
      }
    } /* end while */
    /* If match, copy elements from one structure to the other */
    if (match == 1) {
      etemp = ttemp->e[ict]; /* etemp pts to element to copy */
# ifdef DEBUG
    printf("Match found -> %x\n",etemp);
    fflush(stdout);
endif
      /* do it */
      eptr->length = etemp->length;
      eptr->prog_auto = etemp->prog_auto;
      eptr->trans_untrans = etemp->trans_untrans;
      for (i=0;i<=1;++i) {
        eptr->loc[i].x = etemp->loc[i].x;
        eptr->loc[i].y = etemp->loc[i].y;
        eptr->loc[i].units = etemp->loc[i].units;
        eptr->loc[i].rel_abs = etemp->loc[i].rel_abs;
      }
      eptr->field_length = etemp->field_length;
      for (i=0;i<=2;++i) {
        eptr->size[i] = etemp->size[i];
      }
      field_decr = 0;
      eptr->color = etemp->color;
      eptr->mode = etemp->mode;
      eptr->char_size = etemp->char_size;
```

```
      eptr->orient = etemp->orient;
      eptr->justif = etemp->justif;
      eptr->action = etemp->action;
      eptr->act_vtp = etemp->act_vtp;
      strcpy(eptr->act_label,etemp->act_label);
      strcpy(eptr->str,etemp->str);
      eptr->t = etemp->t;
# ifdef DEBUG
      printf("Element copied.\n");
      fflush(stdout);
endif
    }
    else { /* no match, tell the user */
      error = 7;
      process_error();
    }
    tlabel[0] = '\0';
  } /* end repeat_entry */

/*****************************************/
  /*                                       */
  /*   Process_end:                        */
  /*   Do all error checking for currently active*/
  /*   element.  Fix up pointers.          */
  /*                                       */
  /*****************************************/
  process_end()
  {
# ifdef DEBUG
      printf("Processing end for element type %d\n",eptr->element_type);
      fflush(stdout);
endif
      /* Depends on which element we are ending */
      switch (eptr->element_type) {
        case AREA_TYPE:
          /* check if no entries made */
          if (eptr->t->ct == 0) {
            error = 9;
            err_nod = AREA;
            process_error();
          }
          if (area_help == 1) {
            if (help_linect != help_lines) {
              error = 27;
              process_error();
            }
            help_linect = 0;
            area_help = 0;
          }
          break;
        case LINE_TYPE:
          /* check for valid starting and ending locations */
          if (eptr->loc[0].x == -1 || eptr->loc[0].y == -1 ||
              eptr->loc[1].x == -1 || eptr->loc[1].y == -1 ) {
            error = 10;
            process_error();
```

```
      }
      else { /* Check to see if horiz or vertical */
        if (eptr->loc[0].x != eptr->loc[1].x &&
            eptr->loc[0].y != eptr->loc[1].y ) {
          error = 26;
          process_error();
        }
        else { /* entered, but is it good ? */
          calculate_loc(0,0,0);
          calculate_loc(5,1,0);
          if (eptr->loc[0].x == eptr->loc[1].x &&
              eptr->char_size == DOUBLE_LINE) {
            /* we have a double vertical line */
            error = 31;
            process_error();
          }
        };
      };
    break;
  case SCREEN_TYPE:
    /* check if no entries made */
    if (eptr->t->ct == 0) {
      error = 9;
      err_mod = SCREEN;
      process_error();
    }
    break;
  case SECTOR_TYPE:
    /* check if no entries made */
    if (eptr->t->ct == 0) {
      error = 9;
      err_mod = SECTOR;
      process_error();
    }
    /* check for valid starting */
    if (eptr->loc[0].x == -1 || eptr->loc[0].y == -1 ) {
      error = 10;
      process_error();
    }
    else { /* entered, but is it good ? */
      calculate_loc(0,0,0);
    };
    break;
  case TABLE_TYPE:
    /* check if no entries made */
    if (curr_tabct == 0) {
      error = 9;
      err_mod = TABLE;
      process_error();
    }
    break;
  case TEXT_TYPE:
    /* check for text within help */
    if (area_help == 1) {
      ++help_linect;
      /* if text size not entered then use help text size */
```

```c
    if (eptr->size[0] == -1) {
      eptr->size[0] = help_chars;
    }
    else {
      if (eptr->size[0] != help_chars) {
        error = 27;
        process_error();
      }
    }
  }
  /* check for valid starting */
  if (eptr->loc[0].x == -1 || eptr->loc[0].y == -1 ) {
    error = 10;
    process_error();
  }
  else { /* entered, but is it good ? */
    calculate_loc(0,0,0);
  };
  if (eptr->field_length == -1) { /* check for text string */
    error = 13;
    process_error();
  }
  if (eptr->size[0] == -1) { /* check for text field length */
    error = 14;
    process_error();
  }
  calculate_loc(2,0,0);
  break;
case TOUCH_TYPE:
  /* check for valid starting */
  if (eptr->loc[0].x == -1 || eptr->loc[0].y == -1 ) {
    error = 10;
    process_error();
  }
  else { /* entered, but is it good ? */
    calculate_loc(0,0,0);
  };
  if (eptr->field_length == -1) { /* check for touch key label */
    error = 15;
    process_error();
  }
  if (eptr->size[0] == -1) { /* check for touch key size */
    error = 16;
    process_error();
  }
  /* Adjust translatable length field */
  /* to compensate for hex characters (4 chars = 1 char) */
  eptr->size[0] -= field_decr;
  /* Compare entered default text length to touch key size */
  if (eptr->field_length != -1 && eptr->size[0] != -1 &&
      eptr->field_length > (eptr->size[1] * eptr->size[2])) {
    error = 19;
    process_error();
  }
```

```c
        if (eptr->action == -1) { /* check for touch key action */
           error = 17;
           process_error();
        }
        /* Check that text field will not overrun screen */
        calculate_loc(3,0,0);
        break;
      case WAVE_TYPE:
        /* check for valid starting */
        if (eptr->loc[0].x == -1 || eptr->loc[0].y == -1 ) {
           error = 10;
           process_error();
        }
        else { /* entered, but is it good ? */
           calculate_loc(0,0,0);
        };
        if (eptr->size[0] == -1) { /* check for wave length */
           error = 18;
           process_error();
        }
        /* Check that wave field will not overrun screen */
        calculate_loc(4,0,0);
        break;
      default:
        fprintf(stderr,"ERROR process_end: illegal case %d\n",cclass);
        exit(99);
    } /* end case */
    /* Fix up pointers: */
    /* for screens and tables point back to last base table */
    /* for sector, area, wave, line, text or touch */
    /* point eptr to the previous pending element and tptr to its */
    /* associated table */
    if ((eptr->element_type == SCREEN_TYPE) ||
        (eptr->element_type == TABLE_TYPE)) {
      tptr = eptr->prev; /* point to current base table */
      eptr = NULL; /* null pointer as precaution to check at the end */
    }
    else {/* fix the pointers */
      if ((eptr->element_type == SECTOR_TYPE) ||
          (eptr->element_type == AREA_TYPE)) {
        tptr = eptr->prev; /* point to screen or sector table, resp. */
      }
# ifdef DEBUG
      printf("Tptr-> %x prev-> %x struct_type-> %x\n",tptr,tptr->prev,
             tptr->prev->struct_type);
      fflush(stdout);
endif
      while (tptr->prev->struct_type != ELEMENT_STRUCT) {
        tptr = tptr->prev;
        if (tptr == NULL) { /* we're lost ! */
           error = 8;
           process_error();
           exit(99);
```

```
# ifdef DEBUG
      printf("Tptr-> %x prev-> %x struct_type-> %x\n",tptr,tptr->prev,
              tptr->prev->struct_type);
      fflush(stdout);
endif
      }
    } /* end while */
    eptr = (e_ptr)tptr->prev;
    while (tptr->next != NULL) {
      tptr = tptr->next;
    }
# ifdef DEBUG
      printf("Tptr-> %x eptr-> %x\n",tptr,eptr);
      fflush(stdout);
endif
    /* Last fix : special if ending a text, wave, touch or line */
    /* if not inbedded in an "area" then force the state machine */
    /* to an appropriate "sector" state */
    if (cstate==13 && eptr->element_type == SCREEN_TYPE) {
        cstate=7;
# ifdef DEBUG
      printf("State reduced to 7\n");
      fflush(stdout);
endif
    }
  } /* end fixing the pointers */
# ifdef DEBUG
    printf("End processing complete.\n");
    fflush(stdout);
endif
  } /* end process_end */

/***********************************************************/
/*                                                         */
/*   Calculate_loc:                                        */
/*   Calculates and checks validity of element             */
/*   location.                                             */
/*   Calling sequence:                                     */
/*      calculate_loc(flag,parm1,save,retx,rety)           */
/*          where flag - 0 or 1 check validity             */
/*                of coordinates                           */
/*                - 2 check validity of text               */
/*                field                                    */
/*                - 3 check validity of touch              */
/*                field                                    */
/*                - 4 check validity of wave               */
/*                length                                   */
/*                - 5 check validity of line               */
/*                field                                    */
/*            parm1 - which location 0 or 1                */
/*                to check.                                */
/*            save - 0 check validity and                  */
/*                report error.                            */
/*                - 1 do NOT check validity                */
/*                but save converted values into           */
```

```
/*              return x and y variables.        */
/*              retx - address of converted X    */
/*              rety - address of converted Y    */
/*                                                */
/*      *** This routine sets the error var      */
/*      *** and calls process_error              */
/*                                                */
/***********************************************/
calculate_loc(flag,parn1,save,retx,rety)
char flag;
short parn1;
char save;
short *retx;
short *rety;
{
  int x; /* scratch */
  int y; /* scratch */ x = eptr->loc[parn1].x;
  y = eptr->loc[parn1].y;
  if (eptr->loc[0].units == CHAR_UNITS) { /* Convert char to pixels */
    x *= X_PIXELS;
    y *= Y_PIXELS;
  }
  if (eptr->loc[0].rel_abs == REL_FLAG) { /* Convert relative to absolute */
    x += absx;
    y += absy;
  }
  switch (flag) {
    case 0: break;
    case 1: break;
    case 2: /* add offset for text */
      if (eptr->orient == HORIZ_FLAG) { /* check string orientation */
        x += (eptr->size[0] * X_PIXELS * (eptr->char_size + 1)) - 1;
        y += Y_PIXELS * (eptr->char_size + 1) - 1;
      }
      else { /* must be vertical, swap x and y */
        x += X_PIXELS * (eptr->char_size + 1) - 1;
        /* note the -1 for y pixels is because vertical chars are */
        /* compressed by 1 pixel in the y direction */
        y += (eptr->size[0] * (Y_PIXELS - 1) * (eptr->char_size + 1)) - 1;
      }
      break;
    case 3: /* add offset for touch */
      if (eptr->orient == HORIZ_FLAG) { /* check string orientation */
        x += (eptr->size[1] * X_PIXELS * (eptr->char_size + 1)) - 1
            + XTOUCH_OFFSET;
        y += (eptr->size[2] * Y_PIXELS * (eptr->char_size + 1)) - 1
            + YTOUCH_OFFSET;
      }
      else { /* must be vertical, swap x and y */
        x += (eptr->size[2] * X_PIXELS * (eptr->char_size + 1)) - 1
            + XTOUCH_OFFSET;
        y += (eptr->size[1] * (Y_PIXELS - 1) * (eptr->char_size + 1)) - 1
            + YTOUCH_OFFSET;
      }
      break;
```

```
    case 4: /* add offset for wave */
       x += (eptr->size[0] * WAVE_X) - 1;
       y += eptr->field_length;
       break;
    case 5: /* Check that line does not run off screen */
       if ((eptr->loc[parm1].x - eptr->loc[parm1-1].x) != 0 &&
           eptr->char_size == DOUBLE_LINE) {
         /* Must be double horizontal line */
         y += LINE_WIDTH - 1;
       }
       break;
    default:
       fprintf(stderr,"ERROR calculate_loc: illegal case %d\n",cclass);
       exit(99);
  } /* end case */
  /* Check validity */
  if (save != 1) {
     if ((x > MAXX_COORD) || (x < 0) || (y >MAXY_COORD) || (y < 0)) {
        if (flag = 0) {
           error = 11;  /* starts off screen */
        }
        else {
           error = 12;  /* ends off screen */
        }
        process_error();
     }
  }
  else { /* update return fields */
       *retx = x;
       *rety = y;
  }
} /* end calculate_loc */

/****************************************/
/*                                      */
/* Check_for_hex:                       */
/*   Looks for hexadecimal characters in a */
/*   string.                            */
/*   Hex values are in the form 0xHH    */
/*     where HH is 01-FF inclusive      */
/*   Hex values are converted to character & */
/*   inserted back into the string. The */
/*   stored length of the string is adjusted */
/*   appropriately.                     */
/*                                      */
/****************************************/
check_for_hex(sptr,slen)
char *sptr; /* pointer to string to be checked */
short *slen; /* pointer to stored length of string */
{
  int i; /* scratch */
  short len; /* scratch */
  char *optr; /* Output string pointer */
  char *saveptr; /* Output string pointer start */
  char *ptr; /* Our pointer to input string */
```

```
char cchar; /* each character in the string */
char unchar; /* converted hex character */
char string[MAXLINE+1]; /* Temp string */
int power; /* power of 16 */ saveptr = optr = string; /* save pointer to start of string */
ptr = sptr;  /* Use our own pointer */
cchar = *ptr;
while (cchar != NULL) { /* Until we run out */
  /* First look for "0x" */
  if (cchar == '0' ) { /* Got the first char */
    ++ptr;
    cchar = *ptr;
    if (cchar != NULL) {
      if (cchar == 'x') {/* We got a "0x" */
        /* Convert the number */
        power = 16;
        unchar = 0;
        for (i=0;i<=1;++i) {
          ++ptr;
          cchar = *ptr;
          if (isdigit(cchar)) { /* must be 0 through 9 */
            unchar += (cchar - '0') * power;
          }
          else { /* must be A through F */
            unchar += (cchar - 'A' + 10) * power;
          }
          power = 1;
        } /* End for both digits */
        /* Now push converted char back into string */
        *optr = unchar;
        ++optr;
      } /* End if got an "x" */
      else { /* output char */
        *optr = '0';
        ++optr;
        *optr = cchar;
        ++optr;
      }
    } /* End if 2nd char not null */
    else {
      *optr = '0';
      ++optr;
    }
  } /* End if 1st char is a '0' */
  else {
    *optr = cchar;
    ++optr;
  }
  if (cchar != NULL) {
    /* get next character */
    ++ptr;
    cchar = *ptr;
  }
```

```
        ) /* End while */
        *optr = '\0'; /* add null at the end */
        len = strlen(saveptr); /* recalculate length */
        strcpy(sptr,saveptr); /* Copy string back */
        *slen = len; /* add new length */
    ) /* End check_for_hex */
/**********************************************/
/*                                            */
/* CODE_GENERATOR -                           */
/*   Generates assembler code from parser tables. */
/*                                            */
/*    Syntax: Called as a subroutine by PARSER */
/*            code_gen(argc,argv)             */
/*                argc - # of arguments passed to */
/*                       Parser.              */
/*                argv - pointer to file name of */
/*                       output file for assembler code */
/*                                            */
/*            There are NO user prompts.      */
/*                                            */
/*    SJW Version 1.0 12/6/84                 */
/*    SJW Version 1.1  2/8/85                 */
/*                                            */
/**********************************************/
/***** Global defines *************************/
/* include files */
# include "stdio.h"
# include "ctype.h"
# include "token.class"
# include "screeng.i"

/* Preprocessor options - comment out if not desired */
/*  * ALL options may be invoked simultaneously *  */
/* DEBUG - invokes a lot of print statements for tracing */
/* STATS - prints statistics of code generated */
/* # define DEBUG */
define STATS /* Data constants */
define MAXLINE 80    /* Maximum number of chars in an output line */
# define SZENTRIES 30  /* number of entries/table */
# define TABLE_STRUCT 1   /* Structure type for table */
# define ELEMENT_STRUCT 2 /* Structure type for element */
# define T_ENTRY_STRUCT 3 /* Structure type for t_entry */

/*********Assembler output line templates**********/
         /*        "012345678901234567890123456789012345678901234567890123456789012345678901234567890
# define GLOBAL_TEMPLATE  "         GLOBAL         \0";
# define PROG_TEMPLATE    "         PROG\n\0"
# define SKIP_TEMPLATE    "         SKIP\n\0";
# define ASCII_TEMPLATE   "         ASC            \0";
# define BYTE_TEMPLATE    "         DC.B          \0",
# define WORD_TEMPLATE    "         DC.W          \0";
# define END_TEMPLATE     "         END\n\0";
```

```
# define UNLABEL_TEMPLATE "* Unlabeled element follows \n\0";
# define CLOSE_TEMPLATE   "\n\0";
# define INCLUDE_TEMPLATE "           INCLUDE       SG_INCLA:ORION\n\0";
# define PREFIX_TEMPLATE  "SG_\0";

/******Structure sizes *************************/
/**** all sizes in bytes *******************/ define SIZE_SCREEN 4  /* plus all substructures */
define SIZE_SECTOR 12 /* plus all substructures */
# define SIZE_TABLE  8  /* plus elements */
# define SIZE_LINE   16
# define SIZE_AREA   4  /* plus all substructures */
# define SIZE_TEXT   14 /* plus the string */
# define SIZE_WAVE   14
# define SIZE_TOUCH  24 /* plus label string length */
# define SIZE_G      sizeof(struct global)
# define SIZE_X      sizeof(struct xternal)

/******Structures******************************/
    typedef char *c_ptr;
    typedef struct table *t_ptr;
    typedef struct element *e_ptr;
    typedef struct t_entry *tab_ptr;
    typedef e_ptr *te_ptr;
    typedef struct global *g_ptr;

struct table { /* Ptrs to all subsequent elements */
        char struct_type; /* structure type */
        char ct; /* total number of entries */
        struct table *prev; /* Pointer to previous table */
        struct table *next; /* Pointer to next table */
        struct element *e[SZENTRIES]; /* Pointers to each element */
    };
    struct tab_entry { /* Entry for "table" element */
        char str[MAXSTRING+1];  /* Must be character string */
    };
    struct t_entry { /* Entry for "table" */
        char struct_type; /* structure type */
        struct table *prev; /* Pointer back to start of table */
        char element_type; /* Element type - always 7 */
        char label[MAXLABEL+1]; /* table label */
        short length; /* Number of elements */
        char trans_untrans; /* Translatable/untranslatable flag */
        struct t_entry *next; /* Pointer to next t_entry */
        struct tab_entry e[SZENTRIES]; /* entries */
    };
    struct location { /* generic location structure */
        short x; /* X coordinate */
        short y; /* X coordinate */
        char units; /* pixel or char */
        char rel_abs; /* relative or absolute */
    };
```

```c
struct element { /* Entry for any element */
    char struct_type; /* structure type */
    struct table *prev; /* Pointer back to start of table */
    char element_type; /* Element type */
    char label[MAXLABEL+1]; /* Element label */
    short length; /* Length of descriptor */
    char prog_auto; /* Programmatic/automatic flag */
    char trans_untrans; /* Translatable/untranslatable flag */
    struct location loc[2]; /* Location coordinates */
    short field_length; /* Length of field in bytes */
    char size[3]; /* Field dimensions */
    char color; /* Color code */
    char mode; /* Display mode */
    char char_size; /* Large/small flag */
    char orient; /* Vertical/horizontal flag */
    char justif; /* Centered/left-justified flag */
    char action; /* Action number */
    char act_vtp; /* Action VTP key number */
    char act_label[6]; /* Action label */
    char str[MAXSTRING+1]; /* Actual string */
    struct table *t;  /* Pointer to area table */
};

struct global { /* global entries */
    char *prefix; /* screen/sector/table label pointer */
    char *suffix; /* line/area/text/wave/touch label pointer */
    struct global *next; /* points to the next entry */
};

/***** External functions ******************************/
    extern int process_error();
    extern char *allocate();
    extern int calculate_loc();

/***** External variables ******************************/
    extern int    error; /* Error message number */
    extern int    line_ct; /* Input line counter */
    extern short  absx; /* Current sector absolute X coordinate */
    extern short  absy; /* Current sector absolute X coordinate */ extern c_ptr cptr;    /* Pointer to a character string */
    extern t_ptr base;    /* Pointer to the start of the first table */
    extern t_ptr tptr;    /* Pointer to the current table */
    extern e_ptr eptr;    /* Pointer to the current element */
    extern tab_ptr tabptr; /* Pointer to the current "table" entry */ ifdef STATS
    int element_ct[8]; /* Number of each element */
    int code_size = 0; /* Number of bytes of total code generated */
    int code_lines = 0; /* Number of lines of code generated */
# endif
    FILE *cfp; /* code output file pointer */
    FILE *lfp; /* label output file pointer */
    char outline[MAXLINE+1]; /* output line */
    char labline[MAXLINE+1]; /* label output line */
```

```
    char *global_str; /* for global entry */
    char *prog_str;   /* for prog entry */
    char *ascii_str;  /* for ascii entry */
    char *byte_str;   /* for byte entry */
    char *word_str;   /* for word entry */
    char *skip_str;   /* for skip entry */
    char *end_str;    /* for end entry */
    char *close_str;  /* for ending a non-string entry */
    char *unlabel_str; /* comment for elements without labels */
    char *include_str; /* for include line */
    char *prefix_str; /* for labels */
    g_ptr str_global = NULL; /* start of global entries */
    g_ptr glast = NULL; /* latest global entry */
    t_ptr taptr[4]; /* pointer to each level of tables */
    e_ptr eaptr[4]; /* pointer to each element */
    int tindx = 0;  /* index for table pointers */
    int tct[4];     /* count for each level of tables */
    short attribute; /* attribute word for each element */ code_gen(argc,argv)
int argc;   /* number of arguments passed */
char **argv; /* pointer to output file pointer */
{

/********** Function declarations ************/
    int output_header();
    int build_entries();
    int output_global();
    int output_elements();
    int output_end();

/*****Local Variables********************/

FILE *fopen();

char *etype; /* name of element */
    int  i; /* scratch */

/********** CODE ****************************/
    line_ct = -1; /* force bogus line ct for all subsequent error messages */
# ifdef STATS
    for (i=0;i<=7;++i) { /* Initialize element counters */
      element_ct[i] = 0;
    }
# endif
    if (argc < 2) {
      error = 24;
      process_error();
      return;
    }
    if ((cfp = fopen(argv[1],"w")) == NULL) { /* Can not open output file */
      error = 25;
      process_error();
      return;
    }
```

```c
/* get include file */
if (argc < 3) {
  error = 29;
  process_error();
  return;
}
if ((lfp = fopen(argv[2],"w")) == NULL) { /* Can not open tlabel file */
  error = 30;
  process_error();
  return;
}
global_str = GLOBAL_TEMPLATE;
prog_str = PROG_TEMPLATE;
ascii_str = ASCII_TEMPLATE;
byte_str = BYTE_TEMPLATE;
word_str = WORD_TEMPLATE;
skip_str = SKIP_TEMPLATE;
end_str = END_TEMPLATE
close_str = CLOSE_TEMPLATE;
unlabel_str = UNLABEL_TEMPLATE;
include_str = INCLUDE_TEMPLATE;
prefix_str = PREFIX_TEMPLATE;
fprintf(stderr,"Code generator Pass 1\n");
fflush(stderr);
output_header(argv); /* Generate header information */
build_entries(); /* Find all elements */
output_global(); /* Generate global statements */
fprintf(stderr,"Code generator Pass 2\n");
fflush(stderr);
output_elements(); /* Output each element entry */
output_end(); /* close up */
fclose(cfp);
fclose(lfp);
# ifdef STATS
  fprintf(stderr,"Number of lines of code generated: %d\n",code_lines);
  fprintf(stderr,"Total number of code bytes generated: %d\n",code_size);
  for (i=0;i<=7;++i) { /* Print each number of elements generated */
    switch (i) {
      case 0: etype = "SCREEN"; break;
      case 1: etype = "SECTOR"; break;
      case 2: etype = "AREA"; break;
      case 3: etype = "LINE"; break;
      case 4: etype = "TEXT"; break;
      case 5: etype = "WAVE"; break;
      case 6: etype = "TOUCH"; break;
      case 7: etype = "TABLE"; break;
      default: break;
    }
    fprintf(stderr,"%d \"%s\" element(s) generated \n",element_ct[i],etype);
  }
# endif
} /* end code_generator */
```

```
/*********************************************/
/*                                           */
/* Output_line:                              */
/*    Outputs line to file and increments counts. */
/*                                           */
/*********************************************/
output_line()
{
  fputs(outline,cfp);
# ifdef STATS
  ++code_lines;
# endif
} /* end output_line */

/*********************************************/
/*                                           */
/* Output_label:                             */
/*    Outputs label line to file             */
/*                                           */
/*********************************************/
output_label()
{
  fputs(labline,lfp);
} /* end output_label */

/*********************************************/
/*                                           */
/* Output_header:                            */
/*    Generate header information for output file */
/*                                           */
/*********************************************/
output_header(argv)
char **argv; /* pointer to output file pointer */
{
  int output_line();
  char *upper_case();
  int len;

strcpy(outline,include_str);
  output_line();
} /* end output_header */

/*********************************************/
/*                                           */
/* Build_entries:                            */
/*    Find all element entries in the tables. */
/*                                           */
/*********************************************/
build_entries()
{
  int output_line();
  int increment_ptrs();
  int save_global();
  int i; /* scratch */
  short x; /* scratch */
  short y; /* scratch */
```

```
short maxx; /* Maximum X value for a sector */
short maxy; /* Maximum Y value for a sector */ char *sector_label; /* Current label for sector */

/* Go through the entire structure to do three things : */
/*    find all element labels for GLB statement */
/*    find size of each element in bytes; */
/*       add extra byte for even length strings */
    taptr[tindx] = (t_ptr)base;  /* start at the very top */
    tct[tindx] = 0;
    tptr = taptr[tindx];
    eptr = eaptr[tindx] = tptr->e[tct[tindx]];
    while (eptr != NULL) { /* For each screen/table */
# ifdef DEBUG
        printf("Pass 1 Ptr->%x Type %d\n",eptr,eptr->element_type);
        fflush(stdout);
endif
        if (eptr->element_type == SCREEN_TYPE) { /* do the screen */
            if (eptr->label[0] != NULL) {
                save_global(eptr->label,NULL);
            }
            eptr->length = SIZE_SCREEN;
            ++tindx;
            tptr = taptr[tindx] = eptr->t;
            tct[tindx] = 0;
            eptr = eaptr[tindx] = tptr->e[tct[tindx]];
            while (eptr != NULL) {  /* For each sector */
# ifdef DEBUG
            printf("Pass 1 Ptr->%x Type %d\n",eptr,eptr->element_type);
            fflush(stdout);
endif
            if (eptr->label[0] != NULL) {
                save_global(eptr->label,NULL);
            }
            sector_label = eptr->label;  /* Save for element label prefix */
            eptr->length = SIZE_SECTOR;
            /* save coordinates */
            maxx = eptr->loc[1].x;
            absx = eptr->loc[0].x;
            maxy = eptr->loc[1].y;
            absy = eptr->loc[0].y;
            ++tindx;
            tptr = taptr[tindx] = eptr->t;
            tct[tindx] = 0;
            eptr = eaptr[tindx] = tptr->e[tct[tindx]];
            while (eptr != NULL) { /* For each element */
ifdef DEBUG
                printf("Pass 1 Ptr->%x Type %d\n",eptr,eptr->element_type);
                fflush(stdout);
endif
                /* save label as a global */
                if (eptr->label[0] != NULL) {
                    save_global(sector_label,eptr->label);
                }
```

```c
        switch (eptr->element_type) {
          /* Calculate size of each element */
          /* and end of each element */
          /* Also check validity. This is necessary in */
          /* case this element has been repeated due */
          /* to an entire sector repeat request. In that */
          /* case the validity was checked in the Parser */
          /* only for the original NOT repeated sector */
          case LINE_TYPE:
            eptr->length = SIZE_LINE;
            /* Check validity */
            calculate_loc(0,0,0);
            calculate_loc(5,1,0);
            /* Where does this element end ? */
            calculate_loc(0,0,1,&x,&y);
            if (x > maxx) maxx = x;
            if (y > maxy) maxy = y;
            calculate_loc(5,1,1,&x,&y);
            if (x > maxx) maxx = x;
            if (y > maxy) maxy = y;
            break;
          case AREA_TYPE:
            eptr->length = SIZE_AREA;
            /* Area is another level down so ...*/
            ++tindx;
            tptr = taptr[tindx] = eptr->t;
            tct[tindx] = 0;
            eptr = eaptr[tindx] = tptr->e[tct[tindx]];
            while (eptr != NULL) { /* For each element */
ifdef DEBUG
              printf("Pass 1 Ptr->%x Type %d\n",eptr,eptr->element_type);
              fflush(stdout);
endif
              /* save label as a global */
              if (eptr->label[0] != NULL) {
                save_global(sector_label,eptr->label);
              }
              switch (eptr->element_type) {
                /* Calculate size of each element */
                case LINE_TYPE:
                  eptr->length = SIZE_LINE;
                  /* Check validity */
                  calculate_loc(0,0,0);
                  calculate_loc(0,1,0);
                  /* Where does this element end ? */
                  calculate_loc(0,0,1,&x,&y);
                  if (x > maxx) maxx = x;
                  if (y > maxy) maxy = y;
                  calculate_loc(5,1,1,&x,&y);
                  if (x > maxx) maxx = x;
                  if (y > maxy) maxy = y;
                  break;
                case TEXT_TYPE:
                  eptr->length = SIZE_TEXT + eptr->field_length + 1;
                  /* add extra byte for even length strings */
```

```
      /* remember actual string will include the null */
      if ((eptr->field_length % 2) == 0) {
         ++eptr->length;
      }
      /* Check validity */
      calculate_loc(0,0,0);
      calculate_loc(2,0,0);
      /* Where does this element end ? */
      calculate_loc(2,0,1,&x,&y);
      if (x > maxx) maxx = x;
      if (y > maxy) maxy = y;
      break;
   case WAVE_TYPE:
      eptr->length = SIZE_WAVE;
      /* Check validity */
      calculate_loc(0,0,0);
      calculate_loc(4,0,0);
      /* Where does this element end ? */
      calculate_loc(4,0,1,&x,&y);
      if (x > maxx) maxx = x;
      if (y > maxy) maxy = y;
      break;
   case TOUCH_TYPE:
      eptr->length = SIZE_TOUCH + eptr->field_length + 1;
      /* add extra byte for even length strings */
      /* remember actual string will include the null */
      if ((eptr->field_length % 2) == 0) {
         ++eptr->length;
      }
      /* Check validity */
      calculate_loc(0,0,0);
      calculate_loc(3,0,0);
      /* Where does this element end ? */
      calculate_loc(3,0,1,&x,&y);
      if (x > maxx) maxx = x;
      if (y > maxy) maxy = y;
      break;
   default: break;
   } /* end case */
   /* add element length to area length */
   eaptr[tindx-1]->length += eaptr[tindx]->length;
   increment_ptrs();
 } /* end for each element within an area */
 --tindx;
 break;
case TEXT_TYPE:
 eptr->length = SIZE_TEXT + eptr->field_length + 1;
 /* add extra byte for even length strings */
 /* remember actual string will include the null */
 if ((eptr->field_length % 2) == 0) {
    ++eptr->length;
 }
 /* Check validity */
 calculate_loc(0,0,0);
 calculate_loc(2,0,0);
 /* Where does this element end ? */
```

```
          calculate_loc(2,0,1,&x,&y);
          if (x > maxx) maxx = x;
          if (y > maxy) maxy = y;
          break;
        case WAVE_TYPE:
          eptr->length = SIZE_WAVE;
          /* Check validity */
          calculate_loc(0,0,0);
          calculate_loc(4,0,0);
          /* Where does this element end ? */
          calculate_loc(4,0,1,&x,&y);
          if (x > maxx) maxx = x;
          if (y > maxy) maxy = y;
          break;
        case TOUCH_TYPE:
          eptr->length = SIZE_TOUCH + eptr->field_length + 1;
          /* add extra byte for even length strings */
          /* remember actual string will include the null */
          if ((eptr->field_length % 2) == 0) {
             ++eptr->length;
          }
          /* Check validity */
          calculate_loc(0,0,0);
          calculate_loc(3,0,0);
          /* Where does this element end ? */
          calculate_loc(3,0,1,&x,&y);
          if (x > maxx) maxx = x;
          if (y > maxy) maxy = y;
          break;
         default: break;
        } /* end case */
        /* add element length to sector length */
        eaptr[tindx-1]->length += eaptr[tindx]->length;
        /* Put max X and Y as ending location for sector */
        eaptr[tindx-1]->loc[1].x = maxx;
        eaptr[tindx-1]->loc[1].y = maxy;
        increment_ptrs();
      } /* end for each element */
      --tindx;
      /* add length of sector to screen length */
      eaptr[tindx-1]->length += eaptr[tindx]->length;
      increment_ptrs();
    } /* end for each sector */
    --tindx;
  } /* end if this is a "screen" */
  else {
    if (eptr->element_type == TABLE_TYPE) { /* process table */
      tabptr = (tab_ptr)eptr;
      if (tabptr->label[0] != NULL) { /* save the label */
        save_global(tabptr->label,NULL);
      }
    } /* end if "table" */
  } /* end else not screen */
  increment_ptrs();
 } /* end for each screen or table */
} /* end build_entries */
```

```
/*******************************************************/
/*                                                     */
/* Increment_ptrs:                                     */
/*     Increment table and element pointers for       */
/*     going through the tables.                      */
/*                                                     */
/*******************************************************/
increment_ptrs()
{
  ++tct[tindx];
  if (tct[tindx] >= taptr[tindx]->ct) { /* get new table */
     tptr = taptr[tindx] = taptr[tindx]->next;
     if (tptr != NULL) {
        tct[tindx] = 0;
        eptr = eaptr[tindx] = tptr->e[tct[tindx]];
     }
     else {
        eptr = NULL;
     }
  }
  else {
    eptr = eaptr[tindx] = taptr[tindx]->e[tct[tindx]];
  }
} /* end increment_ptrs */

/*******************************************************/
/*                                                     */
/* Save_global:                                        */
/*     Save entry for globals.                        */
/*                                                     */
/*     Calling sequence:                              */
/*         save_global(prefix,suffix);                */
/*           prefix - points to screen, sector or     */
/*                    table label.                     */
/*           suffix - points to element label         */
/*                                                     */
/*******************************************************/
save_global(pptr,sptr)
char *pptr; /* prefix pointer */
char *sptr; /* suffix pointer */
{
  static int first = 0;

/* get space for entry */
  if (first != 0) {
    glast->next = (g_ptr)allocate(SIZE_G);
    glast = glast->next;
  }
  else { /* first time in */
    glast = (g_ptr)allocate(SIZE_G);
    str_global = glast;
    ++first;
  }
  glast->prefix = pptr;
  glast->suffix = sptr;
  glast->next = NULL;
} /* end save_global */
```

```
/***************************************************/
/*                                                 */
/* Output_global:                                  */
/*    Output "GLOBAL" statements by reading the    */
/*    global table. Labels are built by            */
/*    starting with the prefix "SG_" and           */
/*    appending the label suffix to the prefix as  */
/*    SG_PREFIX_SUFFIX                             */
/*        (all labels are uppercase)               */
/*    also appends each label to labels files in   */
/*    form:  PREFIX_SUFFIX                         */
/*                                                 */
/***************************************************/
output_global()
{
int output_line();
int output_label();
char *upper_case();

g_ptr gptr; /* scratch pointer */
int line_len = 32; /* number of current chars on line to output */
int len; /* scratch */
int start_len; /* scratch */ gptr = str_global;
strcpy(outline,global_str);
while (gptr != NULL) {
  if (line_len >= MAXLINE-14) {
    strcpy(&(outline[line_len]),close_str);
    output_line();
    line_len = 32;
    strcpy(outline,global_str);
  }
  start_len = line_len;
  strcpy(&(outline[line_len+1]),prefix_str); /* start with "SG_" */
  line_len += 3;
  if (gptr->prefix != NULL) {
    len = strlen(gptr->prefix);
    strcpy(&(outline[line_len+1]),upper_case(gptr->prefix));
    /* also output to label line */
    strcpy(labline,upper_case(gptr->prefix));
    line_len += len;
  }
  if (gptr->suffix != NULL) {
    if (gptr->prefix != NULL) {
      outline[line_len+1] = '_';
      labline[line_len-start_len-3] = '_';
      ++line_len;
    }
    len = strlen(gptr->suffix);
    strcpy(&(outline[line_len+1]),upper_case(gptr->suffix));
    strcpy(&(labline[line_len-start_len-3]),upper_case(gptr->suffix));
    line_len += len;
  }
```

```
    strcpy(&(labline[line_len-start_len-3]),close_str);
    output_label();
    outline[line_len+1] = ',';
    ++line_len;
    gptr = gptr->next;
  } /* end for each global entry */
  /* output last line if anything left */
  if (line_len > 32) {
    strcpy(&(outline[line_len]),close_str);
    output_line();
  }
} /* end output_global */

/******************************************************/
/*                                                    */
/* Output_end:                                        */
/*    Output end line.                                */
/*                                                    */
/******************************************************/
output_end()
{
  int output_line();

strcpy(outline,end_str),
  output_line();
} /* end output_end */

/******************************************************/
/*                                                    */
/* Output_elements:                                   */
/*    Find and output all elements.                   */
/*                                                    */
/******************************************************/
output_elements()
{
  int output_line();
  int output_ascii();
  int output_byte();
  int output_word();
  int output_long();
  int output_skip();
  int output_unlabel();
  int increment_ptrs();
  int calc_attrib();
  int i; /* scratch */
  short x; /* for conversion to abs pixels */
  short y; /* for conversion to abs pixels */
  char *sector_label; /* label for current sector */

/* put a "PROG" statement before the entries */
  strcpy(outline,prog_str);
  output_line();
```

```
/* Go through the entire structure to : */
/*   Find all elements and generate code for them */
 taptr[tindx] = (t_ptr)base;  /* start at the very top */
 tct[tindx] = 0;
 tptr = taptr[tindx];
 eptr = eaptr[tindx] = tptr->e[tct[tindx]];
 while (eptr != NULL) { /* For each screen/table */
   if (eptr->element_type == SCREEN_TYPE) { /* do the screen */
      ++element_ct[SCREEN_TYPE];
      output_skip(); /* skip between screens */
      if (eptr->label[0] != NULL) {
        output_word(SCREEN_TYPE,eptr->label,NULL);
      }
      else {
        output_unlabel();
        output_word(SCREEN_TYPE,NULL,NULL);
      }
      output_word(eptr->length,NULL,NULL);
      ++tindx;
      tptr = taptr[tindx] = eptr->t;
      tct[tindx] = 0;
      eptr = eaptr[tindx] = tptr->e[tct[tindx]];
      while (eptr != NULL) { /* For each sector */
        ++element_ct[SECTOR_TYPE];
        sector_label = eptr->label;
        absx = eptr->loc[0].x; /* save sector X coordinate */
        absy = eptr->loc[0].y; /* save sector X coordinate */
        if (eptr->label[0] != NULL) {
          output_word(SECTOR_TYPE,eptr->label,NULL);
        }
        else {
          output_unlabel();
          output_word(SECTOR_TYPE,NULL,NULL);
        }
        output_word(eptr->length,NULL,NULL);
        for (i=0;i<=1;++i) { /* do locations */
          output_word(eptr->loc[i].x,NULL,NULL);
          output_word(eptr->loc[i].y,NULL,NULL);
        }
        ++tindx;
        tptr = taptr[tindx] = eptr->t;
        tct[tindx] = 0;
        eptr = eaptr[tindx] = tptr->e[tct[tindx]];
        while (eptr != NULL) { /* For each element */
          ++element_ct[eptr->element_type];
          attribute = 0;
          /* Output appropriate fields and also convert */
          /* all locations to absolute pixels */
          switch (eptr->element_type) {
            case LINE_TYPE:
              if (eptr->label[0] != NULL) {
                output_word(LINE_TYPE,sector_label,eptr->label);
              }
              else {
                output_unlabel();
                output_word(LINE_TYPE,NULL,NULL);
```

```
      }
      output_word(eptr->length,NULL,NULL);
      output_byte(eptr->prog_auto);
      output_byte(0); /* for alignment */
      calc_attrib(); /* merge color and solid/dotted flag */
      output_word(attribute,NULL,NULL);
      for (i=0;i<=1;++i) { /* output location */
        calculate_loc(0,i,1,&x,&y); /* convert */
        output_word(x,NULL,NULL);
        output_word(y,NULL,NULL);
      }
      break;
    case AREA_TYPE:
      if (eptr->label[0] != NULL) {
        output_word(AREA_TYPE,sector_label,eptr->label);
      }
      else {
        output_unlabel();
        output_word(AREA_TYPE,NULL,NULL);
      }
      output_word(eptr->length,NULL,NULL);
      /* Area is another level down so .. */
      ++tindx;
      tptr = taptr[tindx] = eptr->t;
      tct[tindx] = 0;
      eptr = eaptr[tindx] = tptr->e[tct[tindx]];
      while (eptr != NULL) { /* For each element */
        ++element_ct[eptr->element_type];
        attribute = 0;
        switch (eptr->element_type) {
          case LINE_TYPE:
            if (eptr->label[0] != NULL) {
              output_word(LINE_TYPE,sector_label,eptr->label);
            }
            else {
              output_unlabel();
              output_word(LINE_TYPE,NULL,NULL);
            }
            output_word(eptr->length,NULL,NULL);
            output_byte(eptr->prog_auto);
            output_byte(0); /* for alignment */
            calc_attrib(); /* merge color and solid/dotted flag */
            output_word(attribute,NULL,NULL);
            for (i=0;i<=1;++i) { /* output location */
              calculate_loc(0,i,1,&x,&y); /* convert */
              output_word(x,NULL,NULL);
              output_word(y,NULL,NULL);
            }
            break;
          case TEXT_TYPE:
            if (eptr->label[0] != NULL) {
              output_word(TEXT_TYPE,sector_label,eptr->label);
            }
            else {
              output_unlabel();
              output_word(TEXT_TYPE,NULL,NULL);
```

```
    }
    output_word(eptr->length,NULL,NULL);
    output_byte(eptr->prog_auto);
    output_byte(eptr->trans_untrans);
    calc_attrib(); /* merge color,node,char_size,orient,*/
    output_word(attribute,NULL,NULL); /* and justif */
    calculate_loc(0,0,1,&x,&y); /* convert */
    output_word(x,NULL,NULL);
    output_word(y,NULL,NULL);
    output_byte(eptr->field_length);
    output_byte(eptr->size[0]);
    output_ascii(&(eptr->str[0]));
    /* add extra byte for even length strings */
    /* remember actual string will include the null */
    if ((eptr->field_length % 2) == 0) {
      output_byte(0);
    }
    break;
  case WAVE_TYPE:
    if (eptr->label[0] != NULL) {
      output_word(WAVE_TYPE,sector_label,eptr->label);
    }
    else {
      output_unlabel();
      output_word(WAVE_TYPE,NULL,NULL);
    }
    output_word(eptr->length,NULL,NULL);
    output_byte(eptr->prog_auto);
    output_byte(0); /* for alignment */
    calc_attrib(); /* merge color */
    output_word(attribute,NULL,NULL);
    calculate_loc(0,0,1,&x,&y); /* convert */
    output_word(x,NULL,NULL);
    output_word(y,NULL,NULL);
    output_byte(eptr->field_length); /* height in pixels */
    output_byte(eptr->size[0]); /* length in secs */
    break;
  case TOUCH_TYPE:
    if (eptr->label[0] != NULL) {
      output_word(TOUCH_TYPE,sector_label,eptr->label);
    }
    else {
      output_unlabel();
      output_word(TOUCH_TYPE,NULL,NULL);
    }
    output_word(eptr->length,NULL,NULL);
    output_byte(eptr->prog_auto);
    output_byte(eptr->trans_untrans);
    calc_attrib(); /* merge color,node,char_size,orient,*/
    output_word(attribute,NULL,NULL); /* and justif */
    calculate_loc(0,0,1,&x,&y); /* convert */
    output_word(x,NULL,NULL);
    output_word(y,NULL,NULL);
    output_byte(eptr->field_length);
    for (i=0;i<=2;++i) {
      output_byte(eptr->size[i]);
```

```
      }
      output_const(eptr->label,sector_label);
      output_byte(0); /* for alignment */
      output_byte(eptr->action);
      output_const(&(eptr->act_label[0]),NULL);
      output_byte(eptr->act_vtp);
      output_byte(0); /* for alignment */
      output_ascii(&(eptr->str[0]));
      /* add extra byte for even length strings */
      /* remember actual string will include the null */
      if ((eptr->field_length % 2) == 0) {
         output_byte(0);
      }
      break;
    default: break;
  } /* end case */
  increment_ptrs();
} /* end for each element within an area */
--tindx;
break;
  case TEXT_TYPE:
    if (eptr->label[0] != NULL) {
       output_word(TEXT_TYPE,sector_label,eptr->label);
    }
    else {
       output_unlabel();
       output_word(TEXT_TYPE,NULL,NULL);
    }
    output_word(eptr->length,NULL,NULL);
    output_byte(eptr->prog_auto);
    output_byte(eptr->trans_untrans);
    calc_attrib(); /* merge color,node,char_size,orient,*/
    output_word(attribute,NULL,NULL); /* and justif */
    calculate_loc(0,0,1,&x,&y); /* convert */
    output_word(x,NULL,NULL);
    output_word(y,NULL,NULL);
    output_byte(eptr->field_length);
    output_byte(eptr->size[0]);
    output_ascii(&(eptr->str[0]));
    /* add extra byte for even length strings */
    /* remember actual string will include the null */
    if ((eptr->field_length % 2) == 0) {
       output_byte(0);
    }
    break;
  case WAVE_TYPE:
    if (eptr->label[0] != NULL) {
       output_word(WAVE_TYPE,sector_label,eptr->label);
    }
    else {
       output_unlabel();
       output_word(WAVE_TYPE,NULL,NULL);
    }
    output_word(eptr->length,NULL,NULL);
    output_byte(eptr->prog_auto);
    output_byte(0); /* for alignment */
```

```
        calc_attrib(); /* merge color */
        output_word(attribute,NULL,NULL);
        calculate_loc(0,0,1,&x,&y); /* convert */
        output_word(x,NULL,NULL);
        output_word(y,NULL,NULL);
        output_byte(eptr->field_length); /* height in pixels */
        output_byte(eptr->size[0]); /* length in secs */
        break;
      case TOUCH_TYPE:
        if (eptr->label[0] != NULL) {
           output_word(TOUCH_TYPE,sector_label,eptr->label);
        }
        else {
           output_unlabel();
           output_word(TOUCH_TYPE,NULL,NULL);
        }
        output_word(eptr->length,NULL,NULL);
        output_byte(eptr->prog_auto);
        output_byte(eptr->trans_untrans);
        calc_attrib(); /* merge color,mode,char_size,orient,*/
        output_word(attribute,NULL,NULL); /* and justif */
        calculate_loc(0,0,1,&x,&y); /* convert */
        output_word(x,NULL,NULL);
        output_word(y,NULL,NULL);
        output_byte(eptr->field_length);
        for (i=0;i<=2;++i) {
           output_byte(eptr->size[i]);
        }
        output_const(eptr->label,sector_label);
        output_byte(0); /* for alignment */
        output_byte(eptr->action);
        output_const(&(eptr->act_label[0]),NULL);
        output_byte(eptr->act_vtp);
        output_byte(0); /* for alignment */
        output_ascii(&(eptr->str[0]));
        /* add extra byte for even length strings */
        /* remember actual string will include the null */
        if ((eptr->field_length % 2) == 0) {
           output_byte(0);
        }
        break;
      default: break;
      } /* end case */
      increment_ptrs();
   } /* end for each element */
   --tindx;
   increment_ptrs();
  } /* end for each sector */
} /* end if this is a "screen" */
else {
  if (eptr->element_type == TABLE_TYPE) { /* process table */
    ++element_ct[TABLE_TYPE];
    i = 0;
    tabptr = (tab_ptr)eptr;
    output_skip(); /* skip before tables */
```

```
    if (tabptr->label[0] != NULL) {
       output_word(TABLE_TYPE,tabptr->label,NULL);
    }
    else {
       output_unlabel();
       output_word(TABLE_TYPE,NULL,NULL);
    }
    output_word(tabptr->length,NULL,NULL);
    output_byte(eptr->trans_untrans);
    output_byte(0); /* for alignment */
    ++tindx;
    tct[tindx] = 0;
    while(tct[tindx] < eaptr[tindx-1]->length) { /* for each string */
       /* output the data */
       output_ascii(&(tabptr->e[i].str[0]));
       ++tct[tindx];
       ++i;
       if (i == SZENTRIES) { /* table is extended */
          tabptr = tabptr->next;  /* get extension */
          i = 0;
       } /* end if extension on table */
     } /* end for each string in "table" */
    } /* end if "table" */
   } /* end else not screen */
   --tindx,
   increment_ptrs();
 } /* end for each screen or table */
} /* end output_elements */

/*******************************************/
/*                                         */
/* Calc_attrib:                            */
/*    Calculate attributes word for given screen */
/*    element.                             */
/*                                         */
/*******************************************/
calc_attrib()
{
  /* do color for all elements */
  if ((eptr->color % 2) != 0) {
     attribute += ((eptr->color -1) * 32) + 256; /* display only node */
  }
  else {
     attribute += eptr->color * 32; /* display & slave node */
  }
  switch (eptr->element_type) {
    case LINE_TYPE: /* merge solid/dotted flag */
      attribute += eptr->mode * 4096;
                   /* merge single/double flag */
      attribute += eptr->char_size * 9192;
      break;
    case TEXT_TYPE: /* for text & touch merge mode, char_size,orient and */
    case TOUCH_TYPE: /* justification */
      /* do display mode */
```

```
    switch (eptr->mode) {
      case 0:                             /* off */
      case 1: break;                      /* normal */
      case 2:                             /* inverse */
      case 3: attribute += 8; break;      /* inverse & normal */
      case 4:                             /* blinking */
      case 5: attribute += 4; break;      /* blinking & normal */
      case 6:                             /* inverse & blinking */
      case 7: attribute += 12; break;     /* inverse & blinking & normal */
      case 8: attribute += 2; break;      /* bright */
      case 10:                            /* bright & inverse */
      case 11: attribute += 10; break;    /* bright & inverse & normal */
      case 16:                            /* blinking2 */
      case 17: attribute += 20; break;    /* blinking2 & normal */
      case 18:                            /* blinking2 & inverse */
      case 19: attribute += 24; break;    /* blinking2 & inverse & normal */
      default: /* invalid mode */
        error= 28;
        process_error();
        break;
    } /* end case for display mode */
    /* do size */
    attribute += eptr->char_size * 2048;

/* do orientation */
    attribute += eptr->orient * 1024;
    /* do justification */
    attribute += eptr->justif * 512;
    break;
  default: break;
  } /* end for each type */
} /* end calc_attrib */

/******************************************************/
/*                                                    */
/* Output_ascii:                                      */
/*    Output ascii string pointed to.                 */
/*                                                    */
/******************************************************/
output_ascii(ptr)
char *ptr; /* points to string to be output */
{
  int output_line();
  int output_byte();

int len; /* scratch length of string */
  char delimiter; /* character string delimiter */ strcpy(outline,ascii_str);
  /* Search string for occurrence of a " */
  /* If not found use it as string delimiter, otherwise */
  /* use a ' */
  delimiter = '\"';
  if (strchr(ptr,delimiter) != NULL) {
    delimiter = '\'';
  }
```

```
  outline[32] = deliniter;
  len = strlen(ptr);
  strcpy(&(outline[33]),ptr);
  output_line();
  /* now output closing quote and carriage return */
  /* this is done separately because above string contains */
  /* a null which terminated the output process */
  outline[0] = deliniter;
  strcpy(&(outline[1]),close_str);
  output_line();
  /* Now output a real null to terminate string */
  output_byte(0);
# ifdef STATS
  --code_lines;
  code_size += len;
# endif
} /* end output_ascii */

/**********************************************/
/*                                            */
/* Output_byte                                */
/*    Output byte value in ascii in the form: */
/*              DC.B   XXX                    */
/*                                            */
/**********************************************/
output_byte(numb)
int numb; /* number to be output */
{
  char *numb_to_ascii();
  int output_line();

int len; /* scratch length of string */
  char *ascnum ; /* points to number converted to ascii */ strcpy(outline,byte_str);
  ascnum = numb_to_ascii(numb); /* convert number to ascii */
  len = strlen(ascnum);
  strncpy(&(outline[32]),ascnum,len);
  strcpy(&(outline[32+len]),close_str);
  output_line();
# ifdef STATS
  ++code_size;
# endif
} /* end output_byte */

/**********************************************/
/*                                            */
/* Output_word:                               */
/*    Output word value in ascii in the form: */
/*     LABEL   DC.W   XXX                     */
/*         where LABEL is optional            */
/*                                            */
/**********************************************/
output_word(numb,sptr,ptr)
  int numb; /* number to be output */
  char *sptr; /* pointer to sector label */
```

```
char *ptr; /* pointer to optional label */
{
  char *numb_to_ascii();
  char *upper_case();
  int output_line();

int len; /* scratch length of string */
  char *ascnum ; /* points to number converted to ascii */ strcpy(outline,word_str);
  /* move prefix if either label is present */
  if (sptr != NULL || ptr != NULL) {
    strncpy(outline,prefix_str,3); /* do not move null */
  }
  /* move sector label in if there */
  if (sptr != NULL) {
    len = strlen(sptr);
    strncpy(&(outline[3]),upper_case(sptr),len); /* do not move null */
    len += 3;
  }
  else {
    len = 3;
  }
  /* move element label in if there */
  if (ptr != NULL) {
    if (len != 3) { /* put in underscore */
      outline[len] = '_';
      ++len;
    }
    strncpy(&(outline[len]),upper_case(ptr),strlen(ptr)); /* no null */
  }
  ascnum = numb_to_ascii(numb); /* convert number to ascii */
  len = strlen(ascnum);
  strncpy(&(outline[32]),ascnum,len);
  strcpy(&(outline[32+len]),close_str),
  output_line();
# ifdef STATS
  code_size += 2;
# endif
} /* end output_word */

/*******************************************/
/*                                         */
/* Output_const:                           */
/*    Output constant value in ascii in the form:*/
/*            DC.W   LABEL                 */
/*                                         */
/*******************************************/
output_const(ptr,sptr)
char *ptr; /* pointer to label constant to be output */
char *sptr; /* optional sector label pointer to be used as prefix */
{
char *upper_case();
int output_line();

int len; /* scratch length of string */
```

```
  int indx; /* position in output string */ strcpy(outline,word_str);
  indx = 32;
  /* Put in optional sector label prefix */
  if (sptr != NULL) {
    len = strlen(sptr);
    strncpy(&(outline[indx]),upper_case(sptr),len);
    outline[indx+len] = '_';
    indx += len + 1;
  }
  /* Put in label */
  len = strlen(ptr);
  if (len > 0) {
    strncpy(&(outline[indx]),upper_case(ptr),len);
  }
  else {
    outline[indx] = '0';
    len = 1;
  }
  strcpy(&(outline[indx+len]),close_str);
  output_line();
# ifdef STATS
  code_size += 2;
# endif
} /* end output_const */

/*********************************************/
/*                                           */
/* Output_skip:                              */
/*    Output skip line in the form:          */
/*              SKIP                         */
/*                                           */
/*********************************************/
output_skip()
{
  int output_line();

strcpy(outline,skip_str);
  output_line();
} /* end output_skip */

/*********************************************/
/*                                  .        */
/* Output_unlabel:                           */
/*    Output comment for unlabeled elements. */
/*                                           */
/*********************************************/
output_unlabel()
{
  int output_line();
  strcpy(outline,unlabel_str);
  output_line();
} /* end output_unlabel */
```

```c
/************************************************/
/*                                              */
/* Upper_case:                                  */
/*    Converts a character string to upper_case */
/*    stopping at the null character.           */
/*                                              */
/************************************************/
char *upper_case(str)
char *str;  /* pointer to the string */
{
  int i = 0; /* index */
  static char tstring[MAXLINE+1]; /* converted string */
  while (str[i] != NULL) {
    tstring[i] = toupper(str[i]); /* convert each character */
    ++i;
  }
  tstring[i] = NULL; /* add null at the end of case string */
  return(tstring);
} /* end upper_case */

/************************************************/
/*                                              */
/* Numb_to_ascii:                               */
/*    Converts a number to a null terminated    */
/*    character string.                         */
/*                                              */
/************************************************/
char *numb_to_ascii(numb)
int numb; /* number to be converted */
{
  int i = 0; /* index */
  int j; /* scratch */
  int k; /* scratch */
  int l; /* scratch */
  char asc_zero = '0';
  static char tstring[7]; /* converted string */ if (numb<0) { /* negative number insert minus and continue */
    tstring[0] = '-';
    numb = -1 * numb;
    l = 1;
  }
  else {
    l = 0;
  }
  j = 10000;
  for (i=l;i<=(4+l);++i) {
    k = numb/j;
    tstring[i] = k + asc_zero;
    numb -= j*k;
    j /= 10;
  }
  tstring[i] = NULL; /* add null at the end of string */
  return(tstring);
} /* end numb_to_ascii */
```

```
# define MAXSTRING 48
# define MAXLABEL 5
# define NEWLINE 0
# define LABEL 1
# define STRING 2
# define LENGTH 3
# define D_LENGTH 4
# define LOCATION 5
# define END_OF_FILE 9
# define ABSOLUTE 10
# define ACTION 11
# define AREA 12
# define AT 13
# define AUTO 14
# define BLINKING 15
# define BLINKING2 16
# define BRIGHT 17
# define CENTERED 18
# define CENTRAL 19
# define CHAR 20
# define COLOR 21   —

# define DOTTED 23
# define DOUBLE 8
# define END 24
# define FOR 25
# define FROM 26
# define GREEN 27
/* HELP same as AREA above */
# define IN 28
# define INVERSE 29
# define KEY 59
# define LARGE 30
# define LEFTJ 31
# define LINE 32
# define NEW 33
# define NONE 34
# define NORMAL 35
# define OFF 36
# define ON 37
# define PIXEL 38
# define PROG 39
# define RED 40
# define RELATIVE 41
# define REPEAT 42
# define SCREEN 43
# define SECOND 44
# define SECTOR 45
# define SINGLE 7
# define SLAVE 46
# define SMALL 47
# define SOLID 48
# define TABLE 49
# define TEXT 50
# define TO 51
# define TOUCH 52
```

```
# define YTOUCH_OFFSET   4   /* Additional Y pixels for touch key */
# define WAVE_X          49  /* Number of X alpha pixels/wave second */
# define WAVE_Y          69  /* Number of Y alpha pixels/wave */
# define LINE_WIDTH      2   /* Width of a line in pixels */
/* Defaults for touch keys */
# define DEFAULT_KEYX    7   /* Touch key defaults to 7 x 1 */
# define DEFAULT_KEYY    1

/***********************************************/
/*                                             */
/*   Screeng include file -                    */
/*       flags, mode & type definitions        */
/*       for Orion Screen Generator Parser &   */
/*       Code Generator.                       */
/*                                             */
/***********************************************/
/* Element types */
# define SCREEN_TYPE     0   /* element type for "SCREEN" */
# define SECTOR_TYPE     1   /* element type for "SECTOR" */
# define AREA_TYPE       2   /* element type for "AREA" */
# define LINE_TYPE       3   /* element type for "LINE" */
# define TEXT_TYPE       4   /* element type for "TEXT" */
# define WAVE_TYPE       5   /* element type for "WAVE" */
# define TOUCH_TYPE      6   /* element type for "TOUCH" */
# define TABLE_TYPE      7   /* element type for "TABLE" */
/* Flags */
# define PROG_FLAG       0   /* programmatic flag */
# define AUTO_FLAG       1   /* automatic flag */
# define TRANS_FLAG      0   /* translatable flag */
# define UNTRANS_FLAG    1   /* untranslatable flag */
# define PIXEL_UNITS     0   /* location units in pixels */
# define CHAR_UNITS      1   /* location units in chars */
# define REL_FLAG        0   /* location is relative */
# define ABS_FLAG        1   /* location is absolute */
# define CENTERED_FLAG   1   /* text will be centered */
# define LEFTJ_FLAG      0   /* text will be left-justified */
# define HORIZ_FLAG      0   /* text will be horizontal */
# define VERTICAL_FLAG   1   /* text will be vertical */
# define SMALL_FLAG      0   /* text characters will be small (normal) */
# define LARGE_FLAG      1   /* text characters will be large */
# define DOTTED_MODE     0   /* line will be dotted */
# define SOLID_MODE      1   /* line will be solid */
# define SINGLE_LINE     1   /* line will be a single line */
# define DOUBLE_LINE     0   /* line will be a double horizontal line */
/* Display modes, these are logically additive */
# define INVERSE_MODE    2   /* display mode is inverse video */
# define BLINKING_MODE   4   /* display mode is blinking */
# define BLINKING2_MODE  16  /* display mode is alternate blinking */
# define BRIGHT_MODE     8   /* display mode is bright alpha */
# define NORMAL_MODE     1   /* display mode is normal video */
# define OFF_MODE        0   /* display mode is off (no video) */
/* Colors, these are logical additive */
# define WHITE_COLOR     0   /* appears on Central and slave */
# define SLAVE_COLOR     0   /* appears on Central and slave */
```

```
# define CENTRAL_COLOR  1   /* appears on Central display only */
# define RED_COLOR      2   /* as in cherries */
# define YELLOW_COLOR   4   /* like submarines */
# define GREEN_COLOR    8   /* is for GO */
/* Screen size values *NOTE* in terms of alpha-dots */
# define X_PIXELS       9   /* Number of X pixels per char cell */
# define Y_PIXELS       12  /* Number of Y pixels per char cell */
# define MAXX_COORD     431 /* Largest X coordinate on the screen */
# define MAXY_COORD     479 /* Largest Y coordinate on the screen */
# define XTOUCH_OFFSET  2   /* Additional X pixels for touch key */
# define TRANSL 53
# define UNTRANSL 54
# define VERTICAL 55
# define WAVE 56
# define WHITE 57
# define WITH 58

# define YELLOW 60
```

TRANSLATION TOOL PROGRAM

```
PROGRAM tool (INPUT,OUTPUT);                                              186-0.
(*
**    Who         What                When        Where
**    ---         ----                ----        -----
**    wgd         First pass          850222      Main
**    wgd         User interface      850307      Main
**    wgd         File handlers       850310      Main
*)

( $EXTEND    )
( $INCLUDE: 'PDECLS.INC' )

CONST begining    = 1;
    white_space = ' ';
    start_of_infile  = 1;
    start_of_outfile = 1;
    not_found   = 10;
    under_score = 0;
    inverse_cell = 1;
    off = -1;

forwd = TRUE;
    backwd = FALSE;

max_help_length = 78;
    max_help    = 5;
    max_length  = 81;
    max_pass    = 6;
    max_name_ext = 14;
    max_name    = 8;
    max_files   = 6;
    max_title   = 40;
    max_line    = 13;
    max_page    = 200;

max_touch_fields = 6;
    max_text_fields  = 5;
    max_table_fields = 5;
    max_help_fields  = 13;

continuation  = 0;
    help_continue = -1;
    table_continue = -2;
```

```
blank_touch    = '          ';
blank_text     = '          ';
blank_table    = '          ';
blank_help     = '          ';

no_action = 0;

eof_type = 99;
sof_type = -1;

sector_token      = ' sector ';
sector_token_len  = 8;
sector_type       = 9;
touch_token       = ' touch ';
touch_token_len   = 7;
touch_type        = 1;

table_token       = ' table ';
table_token_len   = 7;
table_type        = 2;

text_token        = ' text ';
text_token_len    = 6;
text_type         = 3;

help_token        = ' help ';
help_token_len    = 6;
help_type         = 4;

untransl_token     = ' untransl ';
untransl_token_len = 10;
untransl_type      = 5;

end_token     = ' end ';
end_token_len = 5;
end_type      = 6;

comment_token     = '*';
comment_token_len = 1;
comment_type      = 7;

helptext_token     = '$';
helptext_token_len = 1;
helptext_type      = 8;

extension = '.IDX';
controlfile_name = 'CONTROL.IDX';
reportfile_name  = 'REPORTS.IDX';

{ Constants for FORMS/400 package } mem_size = 4000;

english = 'English';

h_b_i = 'JJJJJJJJJJJJJJJJJJJJJJJJJJJJJJJJJJJJJJJJ';
b_i   = 'BBBBBBBBBBBBBBBBBBBBBBBBBBBBBBBBBBBBBBBB';

tool_sign_on     = 'sign_on          ';
tool_file_choice = 'file_choice_form ';
tool_touch_edit  = 'touch_edit_form  ';
tool_text_edit   = 'text_edit_form   ';
tool_table_edit  = 'table_edit_form  ';
tool_help_edit   = 'help_edit_form   ';

half_bright_inv = 'J';
bright_inv      = 'B';
home_up         = 'H';
clear_disp      = 'J';

continue = label_record (half_bright_inv,half_bright_inv,
                'Continue',' ');
```

```
report    = label_record (half_bright_inv,half_bright_inv,
                         ' Report ','         ');

next_line = label_record (half_bright_inv,half_bright_inv,
                         ' Next   ','  Line   ');

prev_line = label_record (half_bright_inv,half_bright_inv,
                         'Previous','  Line   ');

next_page = label_record (half_bright_inv,half_bright_inv,
                         ' Next   ','  Page   ');

prev_page = label_record (half_bright_inv,half_bright_inv,
                         'Previous','  Page   ');

clr_line  = label_record (half_bright_inv,half_bright_inv,
                         ' Clear  ','  Line   ');

cpy_line  = label_record (half_bright_inv,half_bright_inv,
                         ' Copy   ','  Line   ');

res_edit  = label_record (half_bright_inv,half_bright_inv,
                         ' Resume ','  EDIT   ');

view_eng  = label_record (half_bright_inv,half_bright_inv,
                         ' View   ',' English');

other_keys = label_record (half_bright_inv,half_bright_inv,
                         ' Other  ','  Keys   ');

start_trans = label_record (half_bright_inv,half_bright_inv,
                         ' Start  ','  Trans  ');

start_over = label_record (half_bright_inv,half_bright_inv,
                         ' Start  ','  Over   ');

enter     = label_record (half_bright_inv,half_bright_inv,
                         ' Enter  ','         ');

finish    = label_record (half_bright_inv,half_bright_inv,
                         ' Done   ','         ');

blank     = label_record (half_bright_inv,half_bright_inv,
                         '        ','         ');

menu_key  = label_record (half_bright_inv,half_bright_inv,
                         ' MENU   ','         ');

exit      = label_record (half_bright_inv,half_bright_inv,
                         ' EXIT   ','         ');

TYPE buffer    = PACKED ARRAY [begining..max_length] OF CHAR;
   fname     = PACKED ARRAY [begining..max_name] OF CHAR;
   fname_ext = PACKED ARRAY [begining..max_name_ext] OF CHAR;
   help_line = PACKED ARRAY [begining..max_help_length] OF CHAR;

edit_ptr = ^edit_rec;
   edit_rec = RECORD
        token_type      : integer;
        quote_pos       : integer;
        quote_len       : integer;
        trans_num       : integer;
        chars_num       : integer;
        lines_num       : integer;
        trans_flag      : boolean;
        untran_text     : buffer;
        tran_text       : buffer;
        helptext        : ARRAY [1..max_help] OF help_line;
        source_rec      : integer;
        previous_edit   : edit_ptr;
```

```
        next_edit        : edit_ptr;
    END;

menu_rec = RECORD
        choice_num : char;
        indexfile_name : fname_ext;
        choice_title : PACKED ARRAY [1..max_title] OF CHAR;
    END;

line_rec = RECORD
        rec_num : INTEGER;
        changes_made : boolean;
    END;

menu_list = ARRAY [1..max_files] OF menu_rec;
    edit_list = ARRAY [1..max_line+1] OF edit_rec;
    rec_list  = ARRAY [1..max_line+1] OF line_rec;

VAR
    edit_num       : integer;
    edit           : edit_list;
    menu           : menu_list;
    edit_status    : rec_list;
    last_page      : integer;
    page_list      : ARRAY [0..max_page] OF integer;
    line           : integer;
    field          : integer;
    line_cnt       : integer;
    field_cnt      : integer;
    first_field    : integer;
    last_field     : integer;
    num_of_fields  : integer;

direction      : boolean;
    first_line     : integer;
    last_line      : integer;
    first_rec      : integer;
    last_rec       : integer;

last_type      : integer;
    selection      : integer;
    max_choice     : integer;
    record_num     : integer;
    out_rec_num    : integer;
    format         : integer;
    type_of_token  : integer;
    current_token_type : integer;
    token_len      : integer;
    report_file    : text;
    index_file     : FILE of edit_rec;
    control_file   : text;
    line_buffer    : buffer;
    found          : boolean;
    translate      : boolean;
    length         : integer;
    position       : integer;
    start_pos      : integer;
    end_pos        : integer;

i              : integer;
    tran_string    : buffer;
    tran_len       : integer;
    untran_string  : buffer;
    untran_len     : integer;
    enh_line       : string (48);   (max possible lengthfor trans string)
    trans_title    : string(40);
    language       : string(8);
    title          : string(40);
    translator_name : string(40);
    trans_date     : string(20);
    trans_rev      : string(10);
    status         : integer;
    language_key   : char;
    exit_flag      : boolean;
```

```
    menu_flag         : boolean;
    selection_made    : boolean;
    start_edit        : boolean;
    view_frame        : boolean;
    end_of_indexfile  : boolean;

sourcefile_pos    : integer;
    destfile_pos      : integer;

controlfile_open  : boolean;
    indexfile_open    : boolean;
    reportfile_open   : boolean;
    reportfile_empty  : boolean;
    source_file       : fname;
    dest_file         : lstring(12);

( Variables for FORMS/100 package )

comarea           : forms_comarea;
    memarea           : PACKED ARRAY [1..mem_size] OF byte;
    keyboard_open     : boolean;
    formsfile_open    : boolean;
    done              : boolean;
    forms_file        : lstring(64);
    formname          : lstring(16);
    comoptns          : word;
    num_forms         : integer;
    name_list         : form_name_list;
    key_label         : label_record;
    message           : PACKED ARRAY [1..30] OF char;

(****************************************************************)
( Include external procedures )
( $INCLUDE: 'PEXTRNS1.INC'    )
( $INCLUDE: 'PEXTRNS3.INC'    )
(****************************************************************)

(****************************************************************)

PROCEDURE EndXqq; EXTERNAL;

(*
** Input: none
**
** Output: none
**
** Function: a pascal intrinsic to unconditionally abort the
**           calling program
**
** Errors: none
**
** wgd - 850226.1620
*)

(****************************************************************)

PROCEDURE check_status;

(*
** Input : global status of FORMS and all files used
**
** Output : none
**
** Function : close any open files and re-enable the keyboard
**
** Errors : FORMS error code if generated
**
** wgd - 850226.1621
*)

VAR
    comsts : integer;
```

```
BEGIN
    comsts := comarea.status;

IF (comsts <> 0) THEN
        BEGIN
            IF reportfile_open THEN close (report_file);

IF indexfile_open THEN close (index_file);

IF keyboard_open THEN P_CloseKeyboard (comarea);

IF formsfile_open THEN P_CloseFormsFile (comarea);

writeln ('Error: status = ',comsts:3);
            EndXqq;

END;
END;

(************************************************************)

PROCEDURE file_err (VAR f:text);

(*
**
** Input: 'f' text file
**
** Output: none
**
** Function: trap file I/O errors and abort if F.ERRS <> 0
**
** Errors: see procedure
**
** wgd - 850226.1622
*)
BEGIN
        CASE f.ERRS  OF
                 0:message := '                                ';
                 1:message  := 'Hard data error                 ';
                 2:message := 'Invalid unit/device/volume      ';
                 3:message := 'Invalid Operation on device     ';
                 4:message := 'Internal file system error      ';
                 5:message := 'Device offline                  ';
                 6:message := 'Lost file                       ';
                 7:message := 'Invalid syntax, name too long   ';
                 8:message := 'Disk directory full             ';
                 9:message := 'Unit/device/volume not found    ';
                10:message:= 'File not found                   ';
                11:message:= 'Protected file                   ';
                12:message:= 'File in use                      ';
                13:message:= 'File not open                    ';
                14:message:= 'Data format error                ';
                15:message:= 'Line too long                    ';

OTHERWISE
                message:= 'Undefined Error                    ';
        END;

END;

(************************************************************)

PROCEDURE clean_up ;

(*
** Input : global file and FORMS status flags
**
** Output : none
**
```

```
** Function : close open files and re-enable keyboard
**
** Errors : forms status error code if any generated
**
** wgd - 850227.0905
*)

BEGIN
   IF controlfile_open THEN
       BEGIN
           close (control_file);
           file_err (control_file);
       END;
   IF reportfile_open THEN
       BEGIN
           close (report_file);
           file_err (report_file);
       END;
   IF indexfile_open THEN
       BEGIN
           close (index_file);
       END;
   IF keyboard_open THEN P_CloseKeyboard (comarea);
   IF formsfile_open THEN P_CloseFormsFile (comarea);

P_Execute (home_up);
   P_Execute (clear_disp);
   P_CursorType (0);

END;

(****************************************************************)

PROCEDURE menu_labels;

(*
** Input : none
**
** Output : none
**
** Function : to display softkey labels
**
** Errors : check_status
**
** wgd - 850227.0913
*)

BEGIN key_label := continue;
   P_WriteLabel (1,key_label);

key_label := blank ;
   P_WriteLabel (7,key_label);

key_label := exit;
   P_WriteLabel (8,key_label);

P_DisplayLabels;

END;

(****************************************************************)
PROCEDURE edit_labels;

(*
** Input : none
**
** Output : none
**
** Function : to display alternate softkey labels
**
** Errors : check_status
**
```

```
** wgd - 850227.0915
*)

VAR
   i : integer;

BEGIN key_label := next_line;
   P_WriteLabel (1,key_label);

key_label := prev_line;
   P_WriteLabel (2,key_label);

key_label := next_page;
   P_WriteLabel (3,key_label);

key_label := prev_page;
   P_WriteLabel (4,key_label);

key_label := clr_line;
   P_WriteLabel (5,key_label);

key_label := cpy_line;
   P_WriteLabel (6,key_label);

key_label := blank;
   P_WriteLabel (7,key_label);

key_label := menu_key;
   P_WriteLabel (8,key_label);

P_DisplayLabels;

END;

(*****************************************************************)

PROCEDURE blank_labels;

(*
** Input : none
**
** Output : none
**
** Function : blank out softkeys
**
** Errors : check_status
**
** wgd - 850227.0917
*)

VAR
   i : integer;

BEGIN key_label := blank;
   FOR i:=1 TO 8 DO
      P_WriteLabel (i,key_label);

P_DisplayLabels;

END;

(*****************************************************************)

PROCEDURE read_forward ( VAR last_line : integer ;
                             rec : integer ;
                         VAR end_of_indexfile : boolean );
CONST
   first_line = 1;
```

```
VAR
   line : integer;
   initial_type : integer;
   current_type : integer;

BEGIN end_of_indexfile := FALSE;
   line := first_line;

seek (index_file,rec);
   get (index_file);
   edit_status[line].rec_num := rec;
   edit_status[line].changes_made := FALSE;
   edit[line] := index_file^;
   initial_type := edit[line].token_type;

IF NOT eof(index_file) THEN BEGIN

CASE initial_type OF touch_type :

REPEAT rec := rec + 1;
            line := line + 1;
            seek (index_file,rec);
            get (index_file);

IF NOT eof(index_file) THEN
               BEGIN
                  edit_status[line].rec_num := rec;
                  edit_status[line].changes_made := FALSE;
                  edit[line] := index_file^;
                  current_type := edit[line].token_type;
               END
            ELSE
               ( if at eof then reset indexes to same rec as last page )
               edit_status[line].rec_num := edit_status[first_line].rec_num;

UNTIL eof(index_file)
            OR (line = max_touch_fields+1) OR (current_type <> initial_type);

text_type :

REPEAT rec := rec + 1;
            line := line + 1;
            seek (index_file,rec);
            get (index_file);

IF NOT eof(index_file) THEN
               BEGIN
                  edit_status[line].rec_num := rec;
                  edit_status[line].changes_made := FALSE;
                  edit[line] := index_file^;
                  current_type := edit[line].token_type;
               END
            ELSE
               ( if at eof then reset indexes to same rec as last page )
               edit_status[line].rec_num := edit_status[first_line].rec_num;

UNTIL eof(index_file)
            OR (line = max_text_fields+1) OR (current_type <> initial_type);

help_type :

REPEAT
```

```
                rec := rec + 1;
                line := line + 1;
                seek (index_file,rec);
                get (index_file);

IF NOT eof(index_file) THEN
                    BEGIN
                        edit_status[line].rec_num := rec;
                        edit_status[line].changes_made := FALSE;
                        edit[line] := index_file^;
                        current_type := edit[line].token_type;
                    END
                ELSE
                    ( if at eof then reset indexes to same rec as last page )
                    edit_status[line].rec_num := edit_status[first_line].rec_num;

UNTIL eof(index_file)
                OR (line = max_help_fields+1) OR (current_type <> continuation);

table_type :
            REPEAT rec := rec + 1;
                line := line + 1;
                seek (index_file,rec);
                get (index_file);

IF NOT eof(index_file) THEN
                    BEGIN
                        edit_status[line].rec_num := rec;
                        edit_status[line].changes_made := FALSE;
                        edit[line] := index_file^;
                        current_type := edit[line].token_type;
                    END
                ELSE
                    ( if at eof then reset indexes to same rec as last page )
                    edit_status[line].rec_num := edit_status[first_line].rec_num;

UNTIL eof(index_file)
                OR (line = max_table_fields+1) OR (current_type <> continuation);

END; (case)

last_line := line - 1;

END;(if)

IF eof(index_file) THEN end_of_indexfile := TRUE;

END;

(*****************************************************************)

PROCEDURE get_screen (direction    : boolean ;
                VAR last_page : integer ;
                VAR last_line : integer ;
                VAR end_of_indexfile : boolean);

(*
** Input : direction of current SEEK
**
** Output : edit list is loaded with next set of edit records
**
** Function : index file directed seek
**
** Errors : none
**
** wgd - 850310.2123
*)

CONST
    first_line = 1;
```

```
VAR
   last_rec : integer;
   look_ahead_rec : integer;
   look_back_rec  : integer;
   look_ahead_line : integer;
BEGIN CASE direction OF forwd:
         IF NOT (end_of_indexfile) THEN BEGIN look_ahead_line := last_line + 1;
            look_ahead_rec := edit_status[look_ahead_line].rec_num;

look_back_rec := edit_status[first_line].rec_num;

read_forward (last_line,look_ahead_rec,end_of_indexfile);

last_page := last_page + 1;

page_list[last_page] := look_back_rec;

END;

backwd:
         BEGIN
            IF (last_page > 1) THEN BEGIN look_back_rec := page_list[last_page];
               read_forward (last_line,look_back_rec,end_of_indexfile);

last_page := last_page - 1;

END;

END;

END (case)

END;

(************************************************************)

PROCEDURE save_screen (last_line : integer);

BEGIN line := 0;
   REPEAT
       line := line + 1;
       seek (index_file,edit_status[line].rec_num);
       index_file^ := edit[line];
       put (index_file);
   UNTIL (line = last_line);

END;

(************************************************************)

PROCEDURE top_form (l : integer);

CONST
   max_lines_per_page = 66;
VAR
   i : integer;

BEGIN

FOR i:= 1 TO max_lines_per_page DO writeln;

END;
```

(*************************************************************)

```pascal
PROCEDURE translation_report;

CONST
    first_line = 1;
    max_lines_per_page = 60;

VAR
    i : integer;
    tran_len : integer;
    untran_len : integer;
    look_ahead_rec : integer;
    look_ahead_line : integer;
    end_of_indexfile : boolean;

last_line : integer;
    current_token_type : integer;
    last_token_type : integer;
    line_cnt : integer;
    output_line : integer;
    num_lines : integer;
    num_chars : integer;

form_feed : char;
    top_of_form : string(2);
    bold_on  : string(5);
    bold_off : string(5);
    expand : string(5);
    normal : string(5);
    cpress : string(5);
    xpress : string(5);

space_2  : string(2);
    space_5  : string(5);
    space_10 : string(10);
    space_15 : string(15);
    space_20 : string(20);
    space_25 : string(25);

BEGIN end_of_indexfile := FALSE;
    look_ahead_rec := 1;

form_feed := CHR(12);
    top_of_form := CHR(27)*'E';
    bold_on  := CHR(27)*'(s1B';
    bold_off := CHR(27)*'(s0B';
    expand := CHR(27)*'&k1S';
    normal := CHR(27)*'&k0S';
    cpress := CHR(27)*'&k2S';
    xpress := CHR(27)*'&k3S';

space_2  := '  ';
    space_5  := '     ';
    space_10 := '          ';
    space_15 := '               ';
    space_20 := '                    ';
    space_25 := '                         ';

( Write report heading name, date and revision here )

writeln (top_of_form);

FOR i:= 1 TO 8 DO writeln;

writeln (space_2,bold_on,expand,trans_title,bold_off,normal);
    writeln;
    writeln;
    writeln;
    writeln;
```

```
writeln (space_15,bold_on,'Translated by : ',bold_off,translator_name);
writeln;
writeln (space_15,bold_on,'     Language : ',bold_off,language);
writeln;
writeln (space_15,bold_on,'         Date : ',bold_off,trans_date);
writeln;
writeln (space_15,bold_on,'     Revision : ',bold_off,trans_rev);

FOR i:= 1 TO 30 DO writeln;

writeln (space_20,
         bold_on,'Approved By : _____');
writeln;
writeln;
writeln (space_20,
         bold_on,'       Date : _____');
writeln (bold_off);

top_form (57);

FOR i:=1 TO max_choice DO BEGIN assign (index_file,menu[i].indexfile_name);
   index_file.TRAP := TRUE;
   index_file.MODE := DIRECT;
   reset  (index_file);

output_line := 1;
   last_line := 0;
   last_page := 0;
   last_token_type := 0;
   edit_status[1].rec_num := 1;
   end_of_indexfile := FALSE;

REPEAT ( until eof on index file )

look_ahead_line := last_line + 1;
      look_ahead_rec := edit_status[look_ahead_line].rec_num;
      read_forward (last_line,look_ahead_rec,end_of_indexfile);
      IF (last_page < max_page) THEN
         BEGIN
            last_page := last_page + 1;
            look_ahead_line := last_line + 1;
            look_ahead_rec := edit_status[look_ahead_line].rec_num;
            page_list[last_page] := look_ahead_rec;
         END;

line_cnt := 0;
      current_token_type := edit[first_line].token_type;

CASE current_token_type OF touch_type : BEGIN

IF (current_token_type <> last_token_type) THEN BEGIN
               last_token_type := current_token_type;
               writeln;writeln;
               writeln(space_10,normal,bold_on,
                               menu[i].choice_title,normal,bold_off);
               writeln;writeln;
               writeln(space_10,bold_on,english,space_25,language,bold_off);
               writeln;
             END;

REPEAT ( until last line )

line_cnt := line_cnt + 1;

untran_len := edit[line_cnt].trans_num;
                tran_len   := edit[line_cnt].trans_num;
```

```
                 writeln;
                 write   (space_10,edit[line_cnt].untran_text:untran_len);
                 write   (space_20,'[',edit[line_cnt].tran_text:tran_len,']');
                 writeln(tran_len:4,cpress,' Characters max.');
                 writeln(normal);

UNTIL (line_cnt = last_line);

END; ( touch type )

text_type : BEGIN

IF (current_token_type <> last_token_type) THEN BEGIN
             last_token_type := current_token_type;
             writeln;writeln;
             writeln(space_10,normal,bold_on,
                                menu[i].choice_title,normal,bold_off);
             writeln;writeln;
            END;

REPEAT ( until last line )

line_cnt := line_cnt + 1;

untran_len := edit[line_cnt].trans_num;
               tran_len   := edit[line_cnt].trans_num;

writeln;
               writeln(space_10,bold_on,english,'  :   ',bold_off,
                        edit[line_cnt].untran_text:untran_len);
               writeln(space_10,bold_on,language,' : ',bold_off,
                        '[',edit[line_cnt].tran_text:tran_len,']');
               writeln(space_20,tran_len:4,cpress,' Characters max.');
               writeln(normal);

UNTIL (line_cnt = last_line);

END; ( text type )

help_type : BEGIN writeln (form_feed);

IF (current_token_type <> last_token_type) THEN
                last_token_type := current_token_type;
            writeln;writeln;
            writeln(space_10,normal,bold_on,
                                menu[i].choice_title,normal,bold_off);

writeln;writeln;
            writeln(space_10,bold_on,english,bold_off);
            writeln;writeln;

REPEAT ( until last line )

line_cnt := line_cnt + 1;

untran_len := edit[first_line].chars_num;

writeln(space_10,' ',edit[line_cnt].untran_text:untran_len);

UNTIL (line_cnt = last_line);

line_cnt := 0;

num_lines := edit[first_line].lines_num;
            num_chars := edit[first_line].chars_num;

writeln;writeln;
            writeln;writeln;
            write   (space_10,bold_on,language,bold_off);
```

```
            writeln(space_10,num_chars:4,cpress,' Characters by ',
                    normal,num_lines:4,cpress,' Lines max.');
            writeln(normal);
            writeln;writeln;

REPEAT ( until last line )

line_cnt := line_cnt + 1;

tran_len   := edit[first_line].chars_num;
                    writeln(space_10,'[',edit[line_cnt].tran_text:tran_len,']');

UNTIL (line_cnt = last_line);

END; ( help type )

table_type : BEGIN

IF (current_token_type <> last_token_type) THEN BEGIN
             last_token_type := current_token_type;
             writeln;writeln;
             writeln(space_10,normal,bold_on,
                                menu[i].choice_title,normal,bold_off);
             writeln;writeln;
            END;

REPEAT ( until last line )

line_cnt := line_cnt + 1;

untran_len := edit[line_cnt].quote_len;
                tran_len   := edit[line_cnt].quote_len;

writeln;
                writeln(space_10,bold_on,english,' :   ',bold_off,
                        edit[line_cnt].untran_text:untran_len);
                writeln(space_10,bold_on,language,' : ',bold_off,
                        '[',edit[line_cnt].tran_text:tran_len,']');
                writeln(space_20,tran_len:4,cpress,' Characters max.');
                writeln(normal);

UNTIL (line_cnt = last_line);

END; ( table type )

END; ( case )

UNTIL (end_of_indexfile);

close (index_file);
   writeln (form_feed);

END;

writeln (form_feed);

END;

(************************************************************
**
** main
**
************************************************************)

BEGIN ( initialize flags )
   keyboard_open := FALSE;
   formsfile_open := FALSE;
   controlfile_open := FALSE;
   reportfile_empty := FALSE;
   reportfile_open := FALSE;
```

```
   indexfile_open := FALSE;
   selection_made := TRUE;
   start_edit := FALSE;
   exit_flag := FALSE;
   menu_flag := TRUE;

P_Execute (home_up);
   P_Execute (clear_disp);

assign (control_file,controlfile_name);
   reset (control_file);
   controlfile_open := TRUE;
   readln (control_file,trans_title);
   readln (control_file,language);
   readln (control_file,language_key);

i := 0;
   REPEAT ( until eof on control_file )
       i := i+1;
       readln (control_file,menu[i].choice_num);
       readln (control_file);( skip a line )
       readln (control_file,menu[i].indexfile_name);
       readln (control_file,menu[i].choice_title);
       max_choice := i;
   UNTIL eof(control_file) OR (max_choice = max_files);

close (control_file);
   controlfile_open := FALSE;

( Open forms file )
   forms_file := 'FORMS.NLT'*CHR(00);
   P_OpenFormsFile (comarea,ads(forms_file[1]),1,0,ads(memarea),mem_size);
   check_status;
   formsfile_open := TRUE;

( Initialize forms name table )
   num_forms := 6;
   name_list[1] := tool_sign_on;
   name_list[2] := tool_file_choice;
   name_list[3] := tool_touch_edit;
   name_list[4] := tool_text_edit;
   name_list[5] := tool_table_edit;
   name_list[6] := tool_help_edit;

( Make them memory resident )
   P_LoadForms (comarea,num_forms,name_list);
   check_status;

( Display name and date form )
   P_DisplayForm (comarea,name_list[1]);
   check_status;

blank_labels;
   P_PutField (comarea,100,40,ads(trans_title),No_Change_Ptr,No_Change_Ptr);
   P_PutField (comarea,101,8,ads(language),No_Change_Ptr,No_Change_Ptr);

P_OpenKeyboard (comarea);
   check_status;
   keyboard_open := TRUE;

assign(report_file,reportfile_name);
   report_file.TRAP := TRUE;
   reset (report_file);

IF (report_file.ERRS <> 0) THEN
      BEGIN
          discard (report_file);
          assign (report_file,reportfile_name);
          rewrite (report_file);
          translator_name := '                                        ';
          trans_date := '                    ';
          trans_rev := '          ';
          writeln (report_file,translator_name:40);
          writeln (report_file,trans_date:20);
```

```
        writeln (report_file,trans_rev:10);
        close (report_file);
        reset (report_file);
    END;

reportfile_open := TRUE;
readln(report_file,translator_name);
readln(report_file,trans_date);
readln(report_file,trans_rev);
close (report_file);

P_PutField (comarea,1,40,ads(translator_name),No_Change_Ptr,No_Change_Ptr);
P_PutField (comarea,2,20,ads(trans_date),No_Change_Ptr,No_Change_Ptr);
P_PutField (comarea,3,10,ads(trans_rev),No_Change_Ptr,No_Change_Ptr);

menu_labels;

comoptns := 0;
comarea.options := comoptns;
comarea.startfield := 1;
comarea.errmsgfield := 255;

REPEAT ( until continue key (f1) is hit )
    P_CursorType (under_score);
    P_ReadInput (comarea);
    check_status;
    P_CursorType (off);
    comarea.options := comoptns;

CASE (comarea.lastact) OF
        1:BEGIN (wake_up)
                message := 'Please press softkey           ';
                P_SetMessage (comarea,ads(message),30);
                check_status;
                comoptns := comoptns OR Error_Read;
                comarea.errmsgfield := 255;
                comarea.startfield := comarea.endfield;
                comarea.startoffset := comarea.endoffset;
            END;
    2:BEGIN (break_keys)
        CASE (comarea.lastkey) OF
            37:BEGIN (return)
                CASE (comarea.endfield) OF
                    1:BEGIN
                            P_GetField (comarea,1,40,ads(translator_name),
                                        No_Change_Ptr,No_Change_Ptr);
                            comarea.startfield := 2;
                        END;
                    2:BEGIN
                            P_GetField (comarea,2,20,ads(trans_date),
                                        No_Change_Ptr,No_Change_Ptr);
                            comarea.startfield := 3;
                        END;
                    3:BEGIN
                            P_GetField (comarea,3,10,ads(trans_rev),
                                        No_Change_Ptr,No_Change_Ptr);
                            comarea.startfield := 1;
                        END;
                    0:BEGIN
                            message := 'Cursor must be in field         ';
                            P_SetMessage (comarea,ads(message),30);
                            check_status;
                            comarea.errmsgfield := 255;
                            comarea.startfield := comarea.endfield;
                            comarea.startoffset := comarea.endoffset;
                        END;
                    END;
                END;
            7:BEGIN (EXIT Key)
                blank_labels;
                clean_up;
                EndXqq;
                END;
```

```
               0:BEGIN ( Continue Key )
                   ( re_GET any changes made )
                   P_GetField (comarea,1,40,ads(translator_name),
                                            No_Change_Ptr,No_Change_Ptr);
                   P_GetField (comarea,2,20,ads(trans_date),
                                            No_Change_Ptr,No_Change_Ptr);
                   P_GetField (comarea,3,10,ads(trans_rev),
                                            No_Change_Ptr,No_Change_Ptr);

discard (report_file);
                   assign (report_file,reportfile_name);
                   rewrite (report_file);
                   writeln (report_file,translator_name);
                   writeln (report_file,trans_date);
                   writeln (report_file,trans_rev);
                   close (report_file);
                   reportfile_empty := FALSE;
                   reportfile_open := FALSE;
                   start_edit := TRUE;
               END;
           END; ( CASE )
        END;
     END;( CASE )
 UNTIL (start_edit);

REPEAT (until exit flag)
        ( The BIG LOOP starts here )
        ( Now fill in form choices )

comoptns := 0;

REPEAT (start edit)

selection_made := FALSE;

P_DisplayForm (comarea,name_list[2]);
            check_status;

blank_labels;

P_PutField (comarea,101,8,ads(language),No_Change_Ptr,No_Change_Ptr);

i := 0;
            REPEAT ( until i = max_choice )
                i := i + 1;
                P_PutField (comarea,i,1,ads(menu[i].choice_num),
                                            No_Change_Ptr,ads(b_i));
                check_status;

P_PutField (comarea,i+10,40,ads(menu[i].choice_title),
                                            No_Change_Ptr,ads(h_b_i));
                check_status;

UNTIL (i = max_choice) OR (i = max_files);

menu_labels;

REPEAT ( until selection made )

( this time add report key )
                key_label := report;
                P_WriteLabel (7,key_label);
                P_DisplayLabels;

comarea.options := comoptns;
                comarea.errmsgfield := 255;
                comarea.startfield := 100;
                P_CursorType (inverse_cell);
                P_ReadInput (comarea);
                check_status;
                P_CursorType (off);
```

```
{ Determine if user entered a valid choice or hit EXIT or REPORT key }
    CASE (comarea.lastact) OF
        1:BEGIN
                message := 'Not a valid menu choice       ';
                P_SetMessage (comarea,ads(message),30);
                check_status;
                comoptns := comoptns OR Error_Read;
                comarea.errmsgfield := 255;
                comarea.startfield := 100;
            END;
        2:BEGIN
                CASE (comarea.lastkey) OF
                    7:BEGIN (break key f8 - EXIT )
                            exit_flag := TRUE;
                            menu_flag := FALSE;
                            start_edit := TRUE;
                            selection_made := TRUE;
                        END;
                    1:BEGIN (done entering file choice )
                            P_GetInt (comarea,100,selection);
                            IF (comarea.status > 0)
                            OR (selection <= 0)
                            OR (selection > max_choice) THEN
                                BEGIN
                                    comoptns := comoptns OR Error_Read;
                                    message :=
                                            'Not a valid menu choice      ';
                                    P_SetMessage (comarea,ads(message),30);
                                    start_edit := FALSE;
                                END
                            ELSE
                                BEGIN
                                    IF (indexfile_open) THEN
                                                    close (index_file);
                                    assign (index_file,
                                        menu[selection].indexfile_name);
                                    index_file.TRAP := TRUE;
                                    index_file.MODE := DIRECT;
                                    reset (index_file);
                                    indexfile_open := TRUE;
                                    selection_made := TRUE;
                                    menu_flag := TRUE;
                                    start_edit := TRUE;
                                END;
                        END;
                    6:BEGIN (REPORT key)
                            BEGIN
                                P_CursorType(off);
                                blank_labels;
                                translation_report;
                                P_CursorType(inverse_cell);
                                menu_labels;
                            END;
                        END;
                    37:BEGIN
                            comoptns := comoptns OR Error_Read;
                            message := 'Press Continue key please    ';
                            P_SetMessage (comarea,ads(message),30);
                            check_status;
                            comarea.startfield := 100;
                            comarea.errmsgfield := 255;
                        END;
                END;(case)
            END;(begin)
        END;(case)
    UNTIL (selection_made);
UNTIL (start_edit);

{-----------------------------------------------}
{ Initialize for first SEEK and begin editing   }
{-----------------------------------------------} direction := forwd;
```

```
            first_line := 1;
            last_line := 0;
            last_rec := 1;
            line := 1;
            last_type := 0;
            edit_status[1].rec_num := begining;
            last_page := 0;
            end_of_indexfile := FALSE;

FOR i:=1 TO max_page DO page_list[i] := 1;

WHILE (menu_flag) AND NOT (exit_flag) DO BEGIN get_screen (direction,last_page,last_line,end_of_indexfile);

current_token_type := edit[first_line].token_type;
            CASE current_token_type OF (---------------------------------------------------------------)
(                                                               )
(    TOUCH                                                      )
(                                                               )
(---------------------------------------------------------------)

touch_type :
                    BEGIN
                        ( display appropriate form IF different from )
                        ( last form                                  )
                        IF (last_type <> current_token_type) THEN
                            BEGIN
                                last_type := current_token_type;
                                P_DisplayForm(comarea,name_list[3]);
                                check_status;
                                edit_labels;
                                P_PutField (comarea,100,40,
                                        ads(menu[selection].choice_title),
                                                No_Change_Ptr,No_Change_Ptr);
                                P_PutField (comarea,101,8,ads(language),
                                                No_Change_Ptr,No_Change_Ptr);
                                P_PutField (comarea,102,7,ads(english),
                                                No_Change_Ptr,No_Change_Ptr);
                            END;

( display page of strings to be translated )
                        line_cnt := 0;
                        field_cnt := 0;
                        REPEAT ( until line = last_line or max_line )

line_cnt := line_cnt + 1;
                            field_cnt := field_cnt + 1;

enh_line := h_b_i;
                            P_PutField (comarea,field_cnt,
                                    edit[line_cnt].trans_num,
                                        ads(edit[line_cnt].untran_text),
                                        No_Change_Ptr,ads(enh_line));
                            check_status;

P_PutField (comarea,field_cnt+6,
                                    edit[line_cnt].trans_num,
                                        ads(edit[line_cnt].tran_text),
                                            No_Change_Ptr,ads(enh_line));
                            check_status;

UNTIL (line_cnt=last_line) OR (line_cnt=max_touch_fields);

{Set screen parameters for this form} field := 7;
                        line := 1;
                        num_of_fields := 6;
                        first_line := 1;
                        first_field := 7;
                        last_field := (first_field + num_of_fields) - 1;
```

{This loop processes edit commands for a selected line} done := FALSE;

REPEAT ( until done with page )
( fill in helptext field for this line )
```
    FOR i:=1 TO 5 DO
        BEGIN
            P_PutField (comarea,200+i,78,
                        ads(edit[line].helptext[i]),
                                No_Change_Ptr,No_Change_Ptr);
            check_status;
        END;

(read user input and see what you get )

comoptns := 0;
    comarea.options := comoptns OR Quick_Read;
    comarea.startfield := field;
    comarea.startoffset := 0;
    comarea.errmsgfield := 255;
    P_CursorType (under_score);
    P_ReadInput (comarea);
    check_status;
    P_CursorType (off);

CASE (comarea.lastact) OF
        1:BEGIN {wake_up}
            message := 'Please press softkey.           ';
            P_SetMessage (comarea,ads(message),30);
            check_status;
            comarea.options := comoptns OR Error_Read;
            comarea.startfield := comarea.endfield;
          END;
        2:BEGIN {break key}
            CASE (comarea.lastkey) OF
                37:BEGIN {return key}
                    comoptns := comoptns OR Quick_Read;
                   END;
                 0:BEGIN {next line}
                    { Input storage and validation occurs here }
                    P_GetField (comarea,field,
                        edit[line].trans_num,
                        ads (edit[line].tran_text),
                        No_Change_Ptr,No_Change_Ptr);
                    check_status;
                    IF (line < last_line) THEN
                        BEGIN
                            line := line + 1;
                            field := field + 1;
                        END
                    ELSE
                        BEGIN {next page}
                        (reget last field just in case)
                            P_GetField (comarea,field,
                              edit[line].trans_num,
                                ads(edit[line].tran_text),
                                No_Change_Ptr,No_Change_Ptr);
                            save_screen (last_line);
                            {blank out fields}
                            FOR i := 1 TO 6 DO BEGIN
                                P_PutField (comarea,i,1,
                                    ads(white_space),
                                        No_Change_Ptr,Default_Ptr);
                                P_PutField (comarea,i+6,1,
                                    ads(white_space),
                                        No_Change_Ptr,Default_Ptr);
                            END;

(Set SEEK directionand exit edit loop)
                            direction := forwd;
                            done := TRUE;
                        END;
```

```
        END;
1:BEGIN (previous line)
  { Input storage and validation occurs here )
      P_GetField (comarea,field,
          edit[line].trans_num,
              ads(edit[line].tran_text),
              No_Change_Ptr,No_Change_Ptr);
      IF (line > first_line) THEN
          BEGIN
              line := line - 1;
              field := field - 1;
          END
      ELSE
          BEGIN (previous page)
              (re_get lastfield just in case)
                  P_GetField (comarea,field,
                      edit[line].trans_num,
                          ads(edit[line].tran_text),
                              No_Change_Ptr,No_Change_Ptr);
              save_screen (last_line);
              (blank out fields)
              FOR i := 1 TO 6 DO BEGIN
                  P_PutField (comarea,i,1,
                      ads(white_space),
                          No_Change_Ptr,Default_Ptr
                  P_PutField(comarea,i+6,1,
                      ads(white_space),
                          No_Change_Ptr,Default_Ptr
              END;
              (Set SEEK direction and exit edit
              direction := backwd;
              done := TRUE;
          END;

END;
2:BEGIN (next page)
   (reget last field just in case)
   P_GetField (comarea,field,
       edit[line].trans_num,
       ads(edit[line].tran_text),
       No_Change_Ptr,No_Change_Ptr);
   save_screen (last_line);
   (blank out fields)
   FOR i := 1 TO 6 DO BEGIN
       P_PutField (comarea,i,1,ads(white_space),
           No_Change_Ptr,Default_Ptr);
       P_PutField (comarea,i+6,1,ads(white_space),
           No_Change_Ptr,Default_Ptr);
   END;

(Set SEEK directionand exit edit loop)
   direction := forwd;
   done := TRUE;
   END;

3:BEGIN (previous page)
     (re_get lastfield just in case)
     P_GetField (comarea,field,
              edit[line].trans_num,
              ads(edit[line].tran_text),
              No_Change_Ptr,No_Change_Ptr);
     save_screen (last_line);
     (blank out fields)
     FOR i := 1 TO 6 DO BEGIN
       P_PutField (comarea,i,1,ads(white_space),
              No_Change_Ptr,Default_Ptr);
       P_PutField(comarea,i+6,1,ads(white_space),
              No_Change_Ptr,Default_Ptr);
     END;
     (Set SEEK direction and exit edit loop)
     direction := backwd;
     done := TRUE;
   END;
```

```
                    4:BEGIN (clear line)
                        P_PutField (comarea,field,1,
                                    ads(white_space),
                                 No_Change_Ptr,No_Change_Ptr);
                        check_status;
                    END;
                    5:BEGIN (copy line)
                        P_PutField (comarea,field,
                                    edit[line].trans_num,
                                    ads(edit[line].untran_text),
                                 No_Change_Ptr,No_Change_Ptr);
                        check_status;
                    END;
                    7:BEGIN (MENU key)
                        done := TRUE;
                        menu_flag := FALSE;
                        (re_get lastfield just in case)
                        P_GetField (comarea,field,
                                    edit[line].trans_num,
                                    ads(edit[line].tran_text),
                                 No_Change_Ptr,No_Change_Ptr);
                        ( do save of edited data )
                        save_screen (last_line);
                        close (index_file);
                        indexfile_open := FALSE;
                    END;
                END; (case)
            END;
        END;    (CASE)
    UNTIL (done);
END; (touch type)

{---------------------------------------------------------------}
{                                                               }
{       TEXT                                                    }
{                                                               }
{---------------------------------------------------------------} text_type :
        BEGIN
            ( display appropriate form IF different from )
            ( last form                                  )
            IF (last_type <> current_token_type) THEN
            BEGIN
                last_type := current_token_type;
                P_DisplayForm(comarea,name_list[4]);
                check_status;
                edit_labels;
                P_PutField (comarea,100,40,
                            ads(menu[selection].choice_title),
                         No_Change_Ptr,No_Change_Ptr);
            END;

( display tralslation headings )

FOR i:= 101 TO (100+last_line) DO
                BEGIN
                    P_PutField (comarea,i,8,ads(language),
                             No_Change_Ptr,No_Change_Ptr);
                    P_PutField (comarea,i+5,7,ads(english),
                             No_Change_Ptr,No_Change_Ptr);
                END;

( display page of strings to be translated )
            line_cnt := 0;
            field_cnt := 0;
            REPEAT ( until line = last_line or max_line )

line_cnt := line_cnt + 1;
                field_cnt := field_cnt + 1;

enh_line := h_b_i;
                P_PutField (comarea,field_cnt,
                            edit[line_cnt].trans_num,
```

```
                    ads(edit[line_cnt].untran_text),
                    No_Change_Ptr,ads(enh_line));
    check_status;
    P_PutField (comarea,field_cnt+5,
                edit[line_cnt].trans_num,
                ads(edit[line_cnt].tran_text),
                    No_Change_Ptr,ads(enh_line));
    check_status;

UNTIL (line_cnt=last_line) OR (line_cnt=max_text_fields);

(Set screen parameters for this form)

field := 6;
line := 1;
num_of_fields := 5;
first_line := 1;
first_field := 6;
last_field := (first_field + num_of_fields) - 1;

(This loop processes edit commands for a selected line)

done := FALSE;

REPEAT ( until done with page )
( fill in helptext field for this line )
    FOR i:=1 TO 5 DO
        BEGIN
            P_PutField (comarea,200+i,78,
                        ads(edit[line].helptext[i]),
                            No_Change_Ptr,No_Change_Ptr);
            check_status;
        END;

(read user input and see what you get )

comoptns := 0;
    comarea.options := comoptns OR Quick_Read;
    comarea.startfield := field;
    comarea.startoffset := 0;
    comarea.errmsgfield := 255;
    P_CursorType (under_score);
    P_ReadInput (comarea);
    check_status;
    P_CursorType (off);

CASE (comarea.lastact) OF
        1:BEGIN (wake_up)
            message := 'Please press softkey.        ';
            P_SetMessage (comarea,ads(message),30);
            check_status;
            comarea.options := comoptns OR Error_Read;
            comarea.startfield := comarea.endfield;
        END;
        2:BEGIN (break key)
            CASE (comarea.lastkey) OF
            37:BEGIN (return key)
                comoptns := comoptns OR Quick_Read;
              END;
             0:BEGIN (next line)
                ( Input storage and validation occurs here )
                    P_GetField (comarea,field,
                        edit[line].trans_num,
                        ads (edit[line].tran_text),
                        No_Change_Ptr,No_Change_Ptr);
                    check_status;
                    IF (line < last_line) THEN
                        BEGIN
                            line := line + 1;
                            field := field + 1;
                        END
                    ELSE
                        BEGIN (next page)
```

```
                    (reget last field just in case)
                    P_GetField (comarea,field,
                        edit[line].trans_num,
                            ads(edit[line].tran_text),
                                No_Change_Ptr,No_Change_Ptr);
                    save_screen (last_line);

(blank out fields)
                    FOR i := 1 TO 5 DO BEGIN
                        P_PutField (comarea,i,1,
                            ads(white_space),
                                No_Change_Ptr,Default_Ptr);
                        P_PutField (comarea,i+5,1,
                            ads(white_space),
                                No_Change_Ptr,Default_Ptr);
                        P_PutField (comarea,i+100,1,
                            ads(white_space),
                                No_Change_Ptr,Default_Ptr);
                        P_PutField (comarea,i+105,1,
                            ads(white_space),
                                No_Change_Ptr,Default_Ptr);
                    END;

(Set SEEK directionand exit edit loop)
                    direction := forwd;
                    done := TRUE;
                END;
        END;
    1:BEGIN (previous line)
        ( Input storage and validation occurs here )
            P_GetField (comarea,field,
                edit[line].trans_num,
                ads(edit[line].tran_text),
                No_Change_Ptr,No_Change_Ptr);
            IF (line > first_line) THEN
                BEGIN
                    line := line - 1;
                    field := field - 1;
                END
            ELSE
                BEGIN (previous page)
                    (re_get lastfield just in case)
                    P_GetField (comarea,field,
                        edit[line].trans_num,
                            ads(edit[line].tran_text),
                                No_Change_Ptr,No_Change_Ptr);
                    save_screen (last_line);

(blank out fields)
                    FOR i := 1 TO 5 DO BEGIN
                        P_PutField (comarea,i,1,
                            ads(white_space),
                                No_Change_Ptr,Default_Ptr);
                        P_PutField(comarea,i+5,1,
                            ads(white_space),
                                No_Change_Ptr,Default_Ptr);
                        P_PutField (comarea,i+100,1,
                            ads(white_space),
                                No_Change_Ptr,Default_Ptr);
                        P_PutField (comarea,i+105,1,
                            ads(white_space),
                                No_Change_Ptr,Default_Ptr);
                    END;

(Set SEEK direction and exit edit loop)
                    direction := backwd;
                    done := TRUE;
                END;
        END;
    2:BEGIN (next page)
        (reget last field just in case)
        P_GetField (comarea,field,
            edit[line].trans_num,
            ads(edit[line].tran_text),
```

```
              No_Change_Ptr,No_Change_Ptr);
       save_screen (last_line);

(blank out fields)
       FOR i := 1 TO 5 DO BEGIN
          P_PutField (comarea,i,1,
             ads(white_space),
                No_Change_Ptr,Default_Ptr);
          P_PutField (comarea,i+5,1,
             ads(white_space),
                No_Change_Ptr,Default_Ptr);
          P_PutField (comarea,i+100,1,
             ads(white_space),
                No_Change_Ptr,Default_Ptr);
          P_PutField (comarea,i+105,1,
             ads(white_space),
                No_Change_Ptr,Default_Ptr);
       END;

(Set SEEK directionand exit edit loop)
       direction := forwd;
       done := TRUE;
       END;

3:BEGIN (previous page)
       (re_get lastfield just in case)
       P_GetField (comarea,field,
                   edit[line].trans_num,
                   ads(edit[line].tran_text).
                   No_Change_Ptr,No_Change_Ptr
       save_screen (last_line);

(blank out fields)
       FOR i := 1 TO 5 DO BEGIN
          P_PutField (comarea,i,1,
             ads(white_space),
                No_Change_Ptr,Default_Ptr);
          P_PutField(comarea,i+5,1,
             ads(white_space),
                No_Change_Ptr,Default_Ptr);
          P_PutField (comarea,i+100,1,
             ads(white_space),
                No_Change_Ptr,Default_Ptr);
          P_PutField (comarea,i+105,1,
             ads(white_space),
                No_Change_Ptr,Default_Ptr);
       END;

(Set SEEK direction and exit edit loop)
       direction := backwd;
       done := TRUE;
    END;

4:BEGIN (clear line)
       P_PutField (comarea,field,1,
                      ads(white_space),
                 No_Change_Ptr,No_Change_Ptr);
       check_status;
    END;
   5:BEGIN (copy line)
       P_PutField (comarea,field,
                   edit[line].trans_num,
                   ads(edit[line].untran_text),
                   No_Change_Ptr,No_Change_Ptr);
       check_status;
    END;
   7:BEGIN (MENU key)
       done := TRUE;
       menu_flag := FALSE;
       (re_get lastfield just in case)
       P_GetField (comarea,field,
                   edit[line].trans_num,
                   ads(edit[line].tran_text),
                   No_Change_Ptr,No_Change_Ptr);
```

```
                        ( do save of edited data )
                        save_screen (last_line);
                        close (index_file);
                        indexfile_open := FALSE;
                   END;
                END; (case)
             END;
          END;    (CASE)
       UNTIL (done);
    END; (text type)

(-----------------------------------------------------------------)
(                                                                 )
( HELP                                                            )
(                                                                 )
(-----------------------------------------------------------------)

help_type :
       BEGIN
          ( display appropriate form IF different from )
          ( last form                                  )
             IF (last_type <> current_token_type) THEN
                BEGIN
                   last_type := current_token_type;
                   P_DisplayForm(comarea,name_list[6]);
                   check_status;
                   edit_labels;
                   key_label := view_eng;
                   P_WriteLabel (7,key_label);
                   P_DisplayLabels;
                   P_PutField (comarea,100,40,
                               ads(menu[selection].choice_title),
                                     No_Change_Ptr,No_Change_Ptr);
                   P_PutField (comarea,101,8,ads(language),
                                     No_Change_Ptr,No_Change_Ptr);
                END;

( display blank page to be translated )
          line_cnt := 0;
          field_cnt := 0;
          REPEAT ( until line = last_line or max_line )

line_cnt := line_cnt + 1;
             field_cnt := field_cnt + 1;

enh_line := h_b_i;
             P_PutField (comarea,field_cnt,edit[1].chars_num,
                         ads(edit[line_cnt].tran_text),
                              No_Change_Ptr,ads(enh_line));

check_status;

UNTIL (line_cnt=last_line) OR (line_cnt=max_help_fields);

(Set screen parameters for this form)

field := 1;
          line := 1;
          num_of_fields := 13;
          first_line := 1;
          first_field := 1;
          last_field := (first_field + num_of_fields) - 1;

(This loop processes edit commands for a selected line)

( fill in helptext field for this line )
             FOR i:=1 TO 5 DO
                BEGIN
                   P_PutField (comarea,200+i,78,
                               ads(edit[line].helptext[i]),
                                     No_Change_Ptr,No_Change_Ptr);
                   check_status;
                END;
```

```
view_frame := FALSE;
done     := FALSE;
REPEAT (until done with page)

(read user input and see what you get )
   comoptns := 0;
   comarea.options := comoptns OR Quick_Read;
   comarea.startfield := field;
   comarea.startoffset := 0;
   comarea.errmsgfield := 255;
   P_CursorType (under_score);
   P_ReadInput (comarea);
   check_status;
   P_CursorType (off);

CASE (comarea.lastact) OF
      1:BEGIN (wake_up)
            message := 'Please press softkey.        ';
            P_SetMessage (comarea,ads(message),30);
            check_status;
            comarea.options := comoptns OR Error_Read;
            comarea.startfield := comarea.endfield;
         END;
      2:BEGIN (break key)
            CASE (comarea.lastkey) OF
            37:BEGIN (return key)
                  comoptns := comoptns OR Quick_Read;
               END;
             0:BEGIN (next line)
                  ( Input storage and validation occurs here )
                     P_GetField (comarea,field,
                        edit[1].chars_num,
                        ads (edit[line].tran_text),
                        No_Change_Ptr,No_Change_Ptr);
                  check_status;
                  IF (line < last_line) THEN
                     BEGIN
                        line := line + 1;
                        field := field + 1;
                     END
                  ELSE
                     BEGIN (next page)
                        (reget last field just in case)
                           P_GetField (comarea,field,
                              edit[1].chars_num,
                              ads(edit[line].tran_text),
                              No_Change_Ptr,No_Change_Ptr);
                        save_screen (last_line);

(blank out fields)
                           FOR i := 1 TO 13 DO BEGIN
                              P_PutField (comarea,i,1,
                                 ads(white_space),
                                 No_Change_Ptr,Default_Ptr);
                           END;

(Set SEEK directionand exit edit loop)
                           direction := forwd;
                           done := TRUE;
                     END;
               END;
             1:BEGIN (previous line)
                  ( Input storage and validation occurs here )
                     P_GetField (comarea,field,
                        edit[1].chars_num,
                        ads(edit[line].tran_text),
                        No_Change_Ptr,No_Change_Ptr);
                  IF (line > first_line) THEN
                     BEGIN
                        line := line - 1;
                        field := field - 1;
                     END
                  ELSE
                     BEGIN (previous page)
```

```
                    {re_get lastfield just in case}
                    P_GetField (comarea,field,
                         edit[1].chars_num,
                            ads(edit[line].tran_text),
                                No_Change_Ptr,No_Change_Ptr);
                    save_screen (last_line);

{blank out fields}
                    FOR i := 1 TO 13 DO BEGIN
                        P_PutField (comarea,i,1,
                            ads(white_space),
                                No_Change_Ptr,Default_Ptr);
                    END;
                    {Set SEEK direction and exit edit loop}
                    direction := backwd;
                    done := TRUE;
                END;
         END;
      2:BEGIN {next page}
          {reget last field just in case}
          P_GetField (comarea,field,
                      edit[1].chars_num,
                      ads(edit[line].tran_text),
                      No_Change_Ptr,No_Change_Ptr);
          save_screen (last_line);

{blank out fields}
          FOR i := 1 TO 13 DO BEGIN
              P_PutField (comarea,i,1,ads(white_space),
                            No_Change_Ptr,Default_Ptr);
          END;

{Set SEEK directionand exit edit loop}
          direction := forwd;
          done := TRUE;
          END;

3:BEGIN {previous page}
            {re_get lastfield just in case}
            P_GetField (comarea,field,
                        edit[1].chars_num,
                        ads(edit[line].tran_text),
                        No_Change_Ptr,No_Change_Ptr);
          save_screen (last_line);

{blank out fields}
          FOR i := 1 TO 13 DO BEGIN
             P_PutField (comarea,i,1,ads(white_space),
                         No_Change_Ptr,Default_Ptr);
          END;
          {Set SEEK direction and exit edit loop}
          direction := backwd;
          done := TRUE;
          END;
      4:BEGIN {clear line}
            P_PutField(comarea,field,1,ads(white_space),
                          No_Change_Ptr,No_Change_Ptr);
            check_status;
            FOR i:= 1 TO 13 DO BEGIN
                P_GetField (comarea,i,edit[1].chars_num,
                            ads(edit[i].tran_text),
                            No_Change_Ptr,No_Change_Ptr);
                check_status;
            END;
         END;
      6:BEGIN {view text}
            P_PutField (comarea,101,7,ads(english),
                        No_Change_Ptr,No_Change_Ptr);
            blank_labels;
            key_label := res_edit;
            P_WriteLabel (7,key_label);
            P_DisplayLabels;
            view_frame := TRUE;
            {re_get lastfield just in case}
```

```
                    P_GetField (comarea,field,edit[1].chars_num,
                                ads(edit[line].tran_text),
                                No_Change_Ptr,No_Change_Ptr);
                    FOR i:= 1 TO 13 DO BEGIN
                        P_PutField (comarea,i,edit[1].chars_num,
                                    ads(edit[i].untran_text),
                                    No_Change_Ptr,No_Change_Ptr);
                        check_status;
                    END;

REPEAT (until done with view frame)
                        P_ReadInput (comarea);
                        check_status;
                        IF (comarea.lastact = 2)
                           AND (comarea.lastkey = 6) THEN
                                view_frame := FALSE;
                    UNTIL NOT (view_frame);

FOR i:= 1 TO 13 DO BEGIN
                        P_PutField (comarea,i,edit[1].chars_num,
                                    ads(edit[i].tran_text),
                                    No_change_Ptr,No_Change_Ptr);
                    END;
                    P_PutField (comarea,101,8,ads(language),
                                No_Change_Ptr,No_Change_Ptr);
                    edit_labels;
                    key_label := view_eng;
                    P_WriteLabel (7,key_label);
                    P_DisplayLabels;
                END;
              5:BEGIN (copy line)
                    P_PutField (comarea,field,
                                edit[line].trans_num,
                                ads(edit[line].untran_text,
                                No_Change_Ptr,No_Change_Ptr
                    check_status;
                END;
              7:BEGIN (MENU key)
                    done := TRUE;
                    menu_flag := FALSE;
                    (re_get lastfield just in case)
                    P_GetField (comarea,field,
                                edit[line].chars_num,
                                ads(edit[line].tran_text),
                                No_Change_Ptr,No_Change_Ptr);
                    ( do save of edited data )
                    save_screen (last_line);
                    close (index_file);
                    indexfile_open := FALSE;
                END;
              END; (case)
            END;
          END;    (CASE)
        UNTIL (done);
      END; (help type)

{----------------------------------------------------------------}
{                                                                }
{     TABLE                                                      }
{                                                                }
{----------------------------------------------------------------} table_type :
        BEGIN
            ( display appropriate form IF different from )
            ( last form                                  )
            IF (last_type <> current_token_type) THEN
                BEGIN
                    P_DisplayForm(comarea,name_list[5]);
                    check_status;
                    edit_labels;
                    P_PutField (comarea,100,40,
                                ads(menu[selection].choice_title),
                                No_Change_Ptr,No_Change_Ptr);
                END;
```

```
{ fill in helptext field }
   FOR i:=1 TO 5 DO
      BEGIN
         P_PutField (comarea,200+i,78,
                     ads(edit[1].helptext[i]),
                              No_Change_Ptr,No_Change_Ptr);
         check_status;
      END;

last_type := current_token_type;

{Set screen parameters for this form} field := 6;
   line := 1;
   num_of_fields := 5;
   first_line := 1;
   first_field := 6;
   last_field := (first_field + num_of_fields) - 1;

{ display tralslation headings }
      FOR i:= 101 TO (100+last_line) DO
         BEGIN
            P_PutField (comarea,i,8,ads(language),
                           No_Change_Ptr,No_Change_Ptr);
            P_PutField (comarea,i+5,7,ads(english),
                           No_Change_Ptr,No_Change_Ptr);
         END;

{ display page of strings to be translated }
      line_cnt := 0;
      field_cnt := 0;
      REPEAT { until line = last_line or max_line } line_cnt := line_cnt + 1;
         field_cnt := field_cnt + 1;

enh_line := h_b_i;
         P_PutField (comarea,field_cnt,
                  edit[line_cnt].quote_len,
                     ads(edit[line_cnt].untran_text),
                  No_Change_Ptr,ads(enh_line));
         check_status;

P_PutField (comarea,field_cnt+5,
                  edit[line_cnt].quote_len,
                     ads(edit[line_cnt].tran_text),
                     No_Change_Ptr,ads(enh_line));
         check_status;

UNTIL (line_cnt=last_line) OR (line_cnt=max_table_fields);

{Set screen parameters for this form} field := 6;
      line := 1;
      num_of_fields := 5;
      first_line := 1;
      first_field := 6;
      last_field := (first_field + num_of_fields) - 1;

{This loop processes edit commands for a selected line} done := FALSE;

REPEAT ( until done with page )

(read user input and see what you get )
         comoptns := 0;
         comarea.options := comoptns OR Quick_Read;
         comarea.startfield := field;
```

```
comarea.startoffset := 0;
comarea.errmsgfield := 255;
P_CursorType (under_score);
P_ReadInput (comarea);
check_status;
P_CursorType (off);

CASE (comarea.lastact) OF
   1:BEGIN (wake_up)
        message := 'Please press softkey.          ';
        P_SetMessage (comarea,ads(message),30);
        check_status;
        comarea.options := comoptns OR Error_Read;
        comarea.startfield := comarea.endfield;
    END;
   2:BEGIN (break key)
        CASE (comarea.lastkey) OF
        37:BEGIN (return key)
             comoptns := comoptns OR Quick_Read;
           END;
         0:BEGIN (next line)
             ( Input storage and validation occurs here )
               P_GetField (comarea,field,
                   edit[line].quote_len,
                   ads (edit[line].tran_text),
                   No_Change_Ptr,No_Change_Ptr);
             check_status;
             IF (line < last_line) THEN
               BEGIN
                  line := line + 1;
                  field := field + 1;
               END
             ELSE
               BEGIN (next page)
                 (reget last field just in case)
                   P_GetField (comarea,field,
                       edit[line].quote_len,
                           ads(edit[line].tran_text),
                               No_Change_Ptr,No_Change_Ptr);
                   save_screen (last_line);

(blank out fields)
                   FOR i := 1 TO 5 DO BEGIN
                       P_PutField (comarea,i,1,
                           ads(white_space),
                               No_Change_Ptr,Default_Ptr);
                       P_PutField (comarea,i+5,1,
                           ads(white_space),
                               No_Change_Ptr,Default_Ptr);
                       P_PutField (comarea,i+100,1,
                           ads(white_space),
                               No_Change_Ptr,Default_Ptr);
                       P_PutField (comarea,i+105,1,
                           ads(white_space),
                               No_Change_Ptr,Default_Ptr);
                   END;

(Set SEEK directionand exit edit loop)
                   direction := forwd;
                   done := TRUE;
               END;
           END;
         1:BEGIN (previous line)
             ( Input storage and validation occurs here )
               P_GetField (comarea,field,
                   edit[line].quote_len,
                   ads(edit[line].tran_text),
                   No_Change_Ptr,No_Change_Ptr);
             IF (line > first_line) THEN
               BEGIN
                  line := line - 1;
                  field := field - 1;
               END
             ELSE
               BEGIN (previous page)
```

```
            (re_get lastfield just in case)
            P_GetField (comarea,field,
                edit[line].quote_len,
                    ads(edit[line].tran_text),
                        No_Change_Ptr,No_Change_Ptr);
            save_screen (last_line);

(blank out fields)
            FOR i := 1 TO 5 DO BEGIN
                P_PutField (comarea,i,1,
                    ads(white_space),
                        No_Change_Ptr,Default_Ptr);
                P_PutField(comarea,i+5,1,
                    ads(white_space),
                        No_Change_Ptr,Default_Ptr);
                P_PutField (comarea,i+100,1,
                    ads(white_space),
                        No_Change_Ptr,Default_Ptr);
                P_PutField (comarea,i+105,1,
                    ads(white_space),
                        No_Change_Ptr,Default_Ptr);
            END;

(Set SEEK direction and exit edit loop)
            direction := backwd;
            done := TRUE;
        END;

END;
  2:BEGIN (next page)
    (reget last field just in case)
    P_GetField (comarea,field,
        edit[line].quote_len,
        ads(edit[line].tran_text),
        No_Change_Ptr,No_Change_Ptr);
    save_screen (last_line);

(blank out fields)
    FOR i := 1 TO 5 DO BEGIN
        P_PutField (comarea,i,1,
            ads(white_space),
                No_Change_Ptr,Default_Ptr);
        P_PutField (comarea,i+5,1,
            ads(white_space),
                No_Change_Ptr,Default_Ptr);
        P_PutField (comarea,i+100,1,
            ads(white_space),
                No_Change_Ptr,Default_Ptr);
        P_PutField (comarea,i+105,1,
            ads(white_space),
                No_Change_Ptr,Default_Ptr);
    END;

(Set SEEK directionand exit edit loop)
    direction := forwd;
    done := TRUE;
    END;

3:BEGIN (previous page)
        (re_get lastfield just in case)
        P_GetField (comarea,field,
                    edit[line].quote_len,
                    ads(edit[line].tran_text),
                    No_Change_Ptr,No_Change_Ptr);
        save_screen (last_line);

(blank out fields)
        FOR i := 1 TO 5 DO BEGIN
          P_PutField (comarea,i,1,
              ads(white_space),
                  No_Change_Ptr,Default_Ptr);
          P_PutField(comarea,i+5,1,
              ads(white_space),
                  No_Change_Ptr,Default_Ptr);
```

```
                    P_PutField (comarea,i+100,1,
                            ads(white_space),
                                No_Change_Ptr,Default_Ptr);
                    P_PutField (comarea,i+105,1,
                            ads(white_space),
                                No_Change_Ptr,Default_Ptr);
                END;

(Set SEEK direction and exit edit loop)
                direction := backwd;
                done := TRUE;
            END;

4:BEGIN (clear line)
            P_PutField (comarea,field,1,
                        ads(white_space),
                            No_Change_Ptr,No_Change_Ptr);
            check_status;
        END;
        5:BEGIN (copy line)
            P_PutField (comarea,field,
                            edit[line].trans_num,
                            ads(edit[line].untran_text),
                            No_Change_Ptr,No_Change_Ptr);
            check_status;
        END;
        7:BEGIN (MENU key)
            done := TRUE;
            menu_flag := FALSE;
            (re_get lastfield just in case)
            P_GetField (comarea,field,
                            edit[line].quote_len,
                            ads(edit[line].tran_text),
                            No_Change_Ptr,No_Change_Ptr);
            ( do save of edited data )
            save_screen (last_line);
            close (index_file);
            indexfile_open := FALSE;
        END;
        END; (case)
        END;
    END;    (CASE)
    UNTIL (done);
    END; (table type)

END ( token type case)
  END; (while)

UNTIL (exit_flag);

clean_up;
blank_labels;

END.
PROGRAM index (INPUT,OUTPUT);
(*
**     Who           What                   When           Where
**     ---           ----                   ----           -----
**     wgd           First pass             850222         Main
**     wgd           Header comments        850227         Everywhere
**     wgd           Reworked lists         850228         Main
**     wgd              "                   850228         get_helptext
**     wgd           WORKS !!!!!!!!         850305         Everywhere
**
** NOTE: INDEX07.PAS fixes for INDEXER implimentation
**       INDEX99.PAS contains procedures that aren't needed here
**
**
*)

( $EXTEND    )
( $INCLUDE: 'PDECLS.INC' )
```

```
CONST
    begining   = 1;
    white_space = ' ';
    start_of_infile  = 0;
    start_of_outfile = 0;

max_help_length = 78;
    max_help   = 5;
    max_length = 81;
    max_pass   = 6;
    max_name   = 8;

no_action = 0;

sector_token     = ' sector ';
    sector_token_len = 8;
    sector_type      = 9;

touch_token     = ' touch ';
    touch_token_len = 7;
    touch_type      = 1;

table_token     = ' table ';
    table_token_len = 7;
    table_type      = 2;

text_token     = ' text ';
    text_token_len = 6;
    text_type      = 3;

help_token     = ' help ';
    help_token_len = 6;
    help_type      = 4;

untransl_token     = ' untransl ';
    untransl_token_len = 10;
    untransl_type      = 5;

repeat_token     = ' repeat ';
    repeat_token_len = 8;
    repeat_type      = 10;

end_token     = ' end ';
    end_token_len = 5;
    end_type      = 6;

comment_token     = '*';
    comment_token_len = 1;
    comment_type      = 7;

helptext_token     = '$';
    helptext_token_len = 1;
    helptext_type      = 8;

extension = '.IDX';
    controlfile_name = 'CONTROL.IDX';

( Constants for FORMS/100 package )

mem_size = 2000;

index_form_1 = 'choose_language ';
    index_form_2 = 'enter_file_title';
    index_form_3 = 'index_in_progres';

half_bright_inv = 'J';
    bright_inv      = 'B';
    home_up         = 'H';
    clear_disp      = 'J';

h_b_i = 'JJJJJJJJJJJJJJJJJJJJJJJJJJJJJJJJJJJJ';
      b_i = 'BBBBBBBBBBBBBBBBBBBBBBBBBBBBBBBBBBBB';
```

```
german    = label_record (half_bright_inv,half_bright_inv,
                          '  German ','            ');

french    = label_record (half_bright_inv,half_bright_inv,
                          '  French ','            ');

spanish   = label_record (half_bright_inv,half_bright_inv,
                          ' Spanish ','            ');

dutch     = label_record (half_bright_inv,half_bright_inv,
                          '  Dutch  ','            ');

italian   = label_record (half_bright_inv,half_bright_inv,
                          ' Italian ','            ');

swedish   = label_record (half_bright_inv,half_bright_inv,
                          ' Swedish ','            ');

danish    = label_record (half_bright_inv,half_bright_inv,
                          ' Danish  ','            ');

norwgn    = label_record (half_bright_inv,half_bright_inv,
                          ' Norwgn. ','            ');

katakana  = label_record (half_bright_inv,half_bright_inv,
                          'Katakana','            ');

english   = label_record (half_bright_inv,half_bright_inv,
                          'English ','            ');

other_keys = label_record (half_bright_inv,half_bright_inv,
                           '  Other ',' Keys   ');

start_index = label_record (half_bright_inv,half_bright_inv,
                            '  Start ',' Index  ');

start_over = label_record (half_bright_inv,half_bright_inv,
                           '  Start ',' Over   ');

entry     = label_record (half_bright_inv,half_bright_inv,
                          '  Enter ','          ');

finish    = label_record (half_bright_inv,half_bright_inv,
                          '  Done  ','          ');

blank     = label_record (half_bright_inv,half_bright_inv,
                          '        ','          ');

exit      = label_record (half_bright_inv,half_bright_inv,
                          '  EXIT  ','          ');

TYPE buffer   = PACKED ARRAY [begining..max_length] OF CHAR;
  fname    = PACKED ARRAY [begining..max_name] OF CHAR;

line_ptr = ^line;

line = RECORD
      line_of_text   : buffer;
      rec            : integer;
      next_line      : line_ptr;
  END;

help_line = PACKED ARRAY [begining..max_help_length] OF char;
  helptype  = ARRAY [1..max_help] OF help_line;

edit_ptr = ^edit;

edit = RECORD
      token_type    : integer;
      quote_pos     : integer;
      quote_len     : integer;
```

```
        trans_num          : integer;
        chars_num          : integer;
        lines_num          : integer;
        trans_flag         : boolean;
        untran_text        : buffer;
        tran_text          : buffer;
        helptext           : helptype;
        source_rec         : integer;
        previous_edit      : edit_ptr;
        next_edit          : edit_ptr;
END;
   VAR
        line_list          : line_ptr;
        edit_list          : edit_ptr;
        temp_line_ptr      : line_ptr;
        temp_edit_ptr      : edit_ptr;
        current_line       : line_ptr;
        current_edit       : edit_ptr;
        first_line         : line_ptr;
        first_edit         : edit_ptr;
        last_line          : line_ptr;
        last_edit          : edit_ptr;
        next_element       : line_ptr;
        start_of_element   : line_ptr;
        end_of_element     : line_ptr;
        temp_helptext      : helptype;

touch_edit_list    : edit_ptr;
        text_edit_list     : edit_ptr;
        table_edit_list    : edit_ptr;
        help_edit_list     : edit_ptr;

first_touch_edit   : edit_ptr;
        current_touch_edit : edit_ptr;
        last_touch_edit    : edit_ptr;

first_text_edit    : edit_ptr;
        current_text_edit  : edit_ptr;
        last_text_edit     : edit_ptr;

first_table_edit   : edit_ptr;
        current_table_edit : edit_ptr;
        last_table_edit    : edit_ptr;

first_help_edit    : edit_ptr;
        current_help_edit  : edit_ptr;
        last_help_edit     : edit_ptr;

edit_num       : integer;
        record_num     : integer;
        out_rec_num    : integer;
        format         : integer;
        type_of_token  : integer;
        token_len      : integer;
        in_file        : text;
        out_file       : FILE of edit;
        control_file   : text;
        line_buffer    : buffer;
        found          : boolean;
        translate      : boolean;
        length         : integer;
        position       : integer;
        start_pos      : integer;
        end_pos        : integer;
        trans_elements : integer;
        table_elements : integer;
        help_elements  : integer;
        i              : integer;
        level          : integer;
        pass           : integer;
        cell           : integer;
        trans_title    : string(40);
        language       : string(8);
        title          : string(40);
```

```
    ascii_pass      : char;
    separate        : boolean;
    status          : integer;
    language_key    : char;
    ready_to_index  : boolean;
    title_entered   : boolean;
    language_chosen : boolean;

sourcefile_pos  : integer;
    destfile_pos    : integer;

controlfile_open : boolean;
    sourcefile_open  : boolean;
    destfile_open    : boolean;
    source_file      : fname;
    dest_file        : lstring(12);

{ Variables for FORMS/100 package } comarea         : forms_comarea;
    memarea         : PACKED ARRAY [1..mem_size] OF byte;
    keyboard_open   : boolean;
    formsfile_open  : boolean;
    done            : boolean;
    forms_file      : lstring(64);
    formname        : lstring(16);
    comoptns        : word;
    num_forms       : integer;
    name_list       : form_name_list;
    key_label       : label_record;
    message         : PACKED ARRAY [1..30] OF char;

(****************************************************************)
{ Include external procedures }
{ $INCLUDE: 'PEXTRNS1.INC'    }
{ $INCLUDE: 'PEXTRNS3.INC'    }
(****************************************************************)

PROCEDURE clear_buffer(VAR s:buffer);

(*
** Input   : buffer of max_length and type CHAR
**
** Output  : this buffer is returned with white_spaces
**
** Function : initialize buffer
**
** Errors  : none
**
** wgd - 850226.1618
*)

VAR
    i : integer;

BEGIN
    FOR i := 1 TO max_length DO
        s[i] := white_space
END;

(****************************************************************)

PROCEDURE clear_helptext_line ( VAR h : help_line );

VAR
    i : integer;

BEGIN
    FOR i := begining TO max_help_length DO
        h[i] := white_space
END;

(****************************************************************)
```

```
FUNCTION line_length (s:buffer) : integer;

(*
** Input : line of text 's'
**
** Output : length of line (trailing blanks ignored)
**
** Function : determine line length
**
** Errors : none
**
** wgd - 850227.0921
*)

VAR
    i     : integer;
    blank : boolean;

BEGIN
    i := max_length;
    blank := TRUE;

WHILE (i>0) and blank DO

IF s[i] = white_space THEN
            i := i - 1
        ELSE
            blank := FALSE;

line_length := i;
END;
(****************************************************************)

FUNCTION name_length (n : fname) : word;

(*
** Input : string 'n'
**
** Output : name_length, number of non-blank characters in file name
**
** Function : find length of 'n' ignoring trailing blanks
**
** Errors : none
**
** wgd - 850228.1120
*)

VAR
    i     : word;
    blank : boolean;

BEGIN i := max_name;
    blank := TRUE;

WHILE (i>0) AND blank DO

IF n[i] = white_space THEN
            i := i - 1
        ELSE
            blank := FALSE;

name_length := i;
END;
(****************************************************************)

FUNCTION endscan(s:buffer): integer;

(*
** Input : line of text 's'
**
```

```
'* Output : position in line after which data need not be searched
'*          ie. after '*','$', comment or helptext
'*
'* Function : to minimize searching
'*
'* Errors : none
'*
'* wgd - 850227.0925
*)

VAR
        pos_1   : integer;
        pos_2   : integer;

BEGIN
        pos_1 := positn(comment_token,s,begining);
        pos_2 := positn(helptext_token,s,begining);

IF (pos_1 = 0) AND (pos_2 = 0) THEN endscan := max_length
        ELSE
          IF (pos_2 = 0) AND (pos_1 > 0) THEN endscan := pos_1
          ELSE
            IF (pos_1 = 0) AND (pos_2 > 0) THEN endscan := pos_2
            ELSE
              IF (pos_1 < pos_2) THEN endscan := pos_1
              ELSE
                IF (pos_2 < pos_1) THEN endscan := pos_2;
END;

(**************************************************************)

PROCEDURE EndXqq; EXTERNAL;

(*
** Input: none
**
** Output: none
**
** Function: a pascal intrinsic to unconditionally abort the
**           calling program
**
** Errors: none
**
** wgd - 850226.1620
*)

(**************************************************************)

PROCEDURE check_status;

(*
** Input : global status of FORMS and all files used
**
** Output : none
**
** Function : close any open files and re-enable the keyboard
**
** Errors : FORMS error code if generated
**
** wgd - 850226.1621
*)

VAR
   comsts : integer;

BEGIN comsts := comarea.status;

IF (comsts <> 0) THEN

BEGIN
```

```
            IF sourcefile_open THEN close (in_file);

IF destfile_open THEN close (out_file);

IF keyboard_open THEN P_CloseKeyboard (comarea);

IF formsfile_open THEN P_CloseFormsFile (comarea);

writeln ('Error: status = ',comsts:3);

EndXqq;

END;
 END;

(******************************************************************)

FUNCTION shift(VAR s:char) : char ;

(*
** Input : character 's'
**
** Output : chraracter of opposite case
**
** Function : toggle case of alpha character
**
** Errors : none
**
** wgd - 850227.0927
*)

CONST
        space_char = ' ';

VAR
        case_change     : integer;
        letter          : integer;

BEGIN case_change := ORD(space_char);
        letter := ORD(s);

IF (letter IN [65..90]) THEN
                letter := letter + case_change
        ELSE
                IF (letter IN [97..122]) THEN
                        letter := letter - case_change;

shift := CHR(letter);

END;

(******************************************************************)

PROCEDURE file_err (VAR f:text);

(*
**
** Input: 'f' text file
**
** Output: none
**
** Function: trap file I/O errors and abort if F.ERRS <> 0
**
** Errors: see procedure
**
** wgd - 850226.1622
*)

BEGIN
        CASE f.ERRS OF
                0:message := '                                       ';
                1:message := 'Hard data error                        ';
```

```
          2:message := 'Invalid unit/device/volume    ';
          3:message := 'Invalid Operation on device   ';
          4:message := 'Internal file system error    ';
          5:message := 'Device offline                ';
          6:message := 'Lost file                     ';
          7:message := 'Invalid syntax, name too long ';
          8:message := 'Disk directory full           ';
          9:message := 'Unit/device/volume not found  ';
         10:message:= 'File not found                ';
         11:message:= 'Protected file                ';
         12:message:= 'File in use                   ';
         13:message:= 'File not open                 ';
         14:message:= 'Data format error             ';
         15:message:= 'Line too long                 ';

OTHERWISE
              message:= 'Undefined Error                ';
      END;

END;

(**************************************************************)

PROCEDURE readln_file (VAR f:text ; VAR s:buffer ; VAR record_num:integer (*
** Input: 'f' text file
**
** Output: 's' packed array
**
** Function: reads a line of text from 'f', substitutes the sequence
**           <null-space-null> for tab characters and puts it in 's'
**
** Errors: none
**
** wgd - 850226.1623
*)

CONST
   null = CHR(00);
   space = CHR(32);

VAR
   i    : integer;
   temp : char;
   blank_line : boolean;

BEGIN blank_line := TRUE;

WHILE (blank_line) DO BEGIN clear_buffer(s);
      blank_line := FALSE;
      i:= 1;

WHILE NOT eoln(f) AND (i < max_length) DO BEGIN
         i := i + 1;
         read (f,temp);
         IF eoln(f) AND (i = 1) THEN
            blank_line := TRUE
         ELSE
            IF (temp < space) THEN BEGIN
               s[i] := space;
               i := i + 1;
               s[i] := null;
               i := i + 1;
               s[i] := space
            END
         ELSE
               s[i] := temp;
      END;(while)
```

```
    get(f);
    record_num := record_num + 1;

END;(while)

END;

(*******************************************************************)

PROCEDURE quote ( s:buffer ; VAR quote_pos:integer ; VAR quote_len:integer);

(*
** Input : line of text 's'
**
** Output : position and length of quoted string if found else zero
**
** Function : to find a quoted string in a line of text
**
** Errors : none
**
** wgd - 850227.0731
** wgd - 850313.1429 - quote_len return taint right
*)

CONST
        quote_1 = CHR(39);
        quote_2 = CHR(34);
        quote_3 = CHR(96);
        num_of_quotes = 3;

VAR
        i,j             : integer;
        pos             : integer;
        end_pos         : integer;
        open_quote      : char;
        close_quote     : char;
        quote_found     : boolean;
        quote_list      : PACKED ARRAY [1..num_of_quotes] OF CHAR;

BEGIN
        i := 0;
        j := 0;

quote_pos := 0;
        quote_len := 0;
        quote_found := FALSE;

quote_list[1] := quote_1;
        quote_list[2] := quote_2;
        quote_list[3] := quote_3;

end_pos := endscan(s);

WHILE ((not quote_found) AND (j < end_pos)) DO
        BEGIN
                j := j + 1;
                i := 0;
                    WHILE (not quote_found) AND (i < num_of_quotes) DO
                        BEGIN
                                i := i + 1;
                                quote_found := (quote_list[i] = s[j]);
                        END
        END;

IF (quote_found) THEN
        BEGIN
                j := j+1;
                open_quote := quote_list[i];
                close_quote := quote_list[i];
                pos := positn(quote_list[i],s,j);
                quote_pos := j;
                quote_len := pos-j;
        END
END;
```

(*************************************************************)
PROCEDURE token (CONST p:string; CONST l:integer; s:buffer;
                                 VAR token_pos:integer);

(*
** Input : token to find 'p' and length of token 'l', line of text
**         to search 's'
**
** Output : position of token if found or zero if not found
**
** Function : find token position if in a line of text
**
** Errors : none
**
** wgd - 850226.1631
*)

VAR
        i,j,k,m         : integer;
        start_scan      : integer;
        end_scan        : integer;
        position        : integer;
        quote_pos       : integer;
        quote_len       : integer;
        quote_end       : integer;
        lc_pos          : integer;
        uc_pos          : integer;
        done            : boolean;
        match           : boolean;
        char_temp       : char;
        shift_char_temp : char;

BEGIN
        token_pos := 0;
        done := FALSE;
        found := FALSE;
        i := 0;
        j := 1;
        k := 0;
        m := 0;

quote (s,quote_pos,quote_len);

quote_end := quote_pos + quote_len;

end_scan := endscan(s);

IF ( end_scan = 1 ) THEN
                done := TRUE
        ELSE
           end_scan := end_scan + 1;

BEGIN

WHILE (not done) DO

BEGIN j := 1;
                k := i+1;
                i := i+1;
                match := TRUE;

WHILE (match) AND (i < end_scan) DO
                           BEGIN char_temp := p[j];
                                shift_char_temp := shift(char_temp);
                                IF (i < quote_pos) OR (i > quote_end) THEN
                                  BEGIN
                                     lc_pos := scaneq(end_scan,char_temp,s,i);
                                     uc_pos := scaneq(end_scan,shift_char_temp,s,i);

```
                    IF (lc_pos = 0) OR (uc_pos = 0) THEN
                        BEGIN
                            match := TRUE;
                            i := i+1;
                            m := i;
                            j := j+1
                        END
                    ELSE
                        BEGIN
                            match := FALSE ;
                            i := k
                        END
                END
            ELSE
                i := i + quote_len;
            END;

IF ((j-1) = 1) THEN
                BEGIN
                    done := TRUE;
                    match := FALSE;
                    token_pos := m - 1
                END;

IF (i >= end_scan) THEN
                BEGIN
                    token_pos := 0;
                    done := TRUE ;
                    match := FALSE
                END
            END
        END
END;
(**************************************************************)

FUNCTION num_check (c:char) : boolean;

(*
** Input : numeric character
**
** Output : boolean flag
**
** Function : determine if character is valid numeric
**
** Errors : none
**
** wgd - 850227.0935
*)

VAR
        num : integer;

BEGIN
        num := ORD(c)-ORD('0');
        IF num IN [0..9] THEN
                num_check := TRUE
        ELSE
                num_check := FALSE
END;
(**************************************************************)

FUNCTION last_non_num (s:buffer ; i:integer ) : char ;

BEGIN

WHILE (ORD(s[i]) IN [48..57]) AND (i > 0) DO
            i := i - 1;

last_non_num := s[i];

END;
(**************************************************************)
```

```
PROCEDURE next_non_space (s:buffer ; i:integer ; VAR p:char ; VAR j:integer);

BEGIN
      j := i;

WHILE ((ORD(s[j]) IN [48..57]) OR (s[j] = ' ')) AND (j < max_length) DO
         j := j + 1;

p := s[j];

END;

(***************************************************************)

PROCEDURE get_num (s:buffer ;VAR i:integer ;VAR n:integer);

CONST
   max_char = 2;

VAR
   j : integer;
   k : integer;
   num      : string(max_char);
   num_lstr : lstring(max_char);
   ok : boolean;

BEGIN

FOR k:=1 TO max_char DO num[k] := ' ';

k := 1;
      REPEAT
         num[k] := s[i] ;
         k := k + 1;
         i := i + 1;
      UNTIL NOT (s[i] IN ['0'..'9']) OR (k = max_char+1);
      i := i - 1;

copylst(num,num_lstr);
      ok := decode(num_lstr,n);

END;

(***************************************************************)

PROCEDURE field (s:buffer ; start_pos:integer ; end_pos:integer;
         VAR trans_num:integer; VAR chars_num:integer; VAR lines_num: integer);

(*
** Input : line of text 's' and the starting and ending position for search
**
** Output : d-length as described in screen generator guide
**
** Function : return d-length line specification
**
** Errors : none
**
** wgd - 850227.0737
**     - 850327.0959 - changed default return values
*)

CONST
        lh_paren        = '(';
        rh_paren        = ')';

VAR
        p : char;
        i,j        : integer;
        done       : boolean;
        chars_found : boolean;

BEGIN
```

```
    j := 1;

IF (start_pos = 0) THEN start_pos := 1;

i := start_pos;
    done := FALSE;
    chars_found := FALSE;

WHILE (i < end_pos) AND NOT (done) DO BEGIN

CASE s[i] OF

'(' : BEGIN
            REPEAT
                i := i+1;
            UNTIL (s[i] = ')');
            i := i + 1;
          END;

'0'..'9':BEGIN next_non_space (s,i,p,j);
            IF ( p = '-') THEN get_num (s,i,trans_num)
                ELSE
                    IF (p = 'x') OR (p = 'X') THEN
                        BEGIN
                            get_num (s,i,chars_num) ;
                            chars_found := TRUE;
                        END
                    ELSE
                        IF (last_non_num(s,i)=' ') THEN get_num(s,i,chars_num)
                            ELSE
                            BEGIN
                                IF ((last_non_num(s,i) = 'x')
                                OR (last_non_num(s,i) = 'X')) AND chars_found
                                    THEN BEGIN
                                            get_num(s,i,lines_num);
                                            done := TRUE;
                                        END;
                            END ;
            i := i + 1;

END;(begin)

OTHERWISE i := i + 1;
        END; (case)

END;(while)

END;

(***************************************************************)

PROCEDURE input_list (VAR last_line:line_ptr ; VAR record_num : integer);

(*
** Input : pointer to tail of input linked list
**
** Output : new line record attached to list
**
** Function : attach new record to line list
**
** Errors : none
**
** wgd - 850227.0740
*)

VAR
        sector_pos : integer;
        table_pos  : integer;

BEGIN
        table_pos := 0;
        sector_pos := 0;
```

```
                WHILE ((sector_pos = 0) AND (table_pos = 0))
                  AND ( not eof(in_file)) DO
                    BEGIN new (current_line);

last_line^.next_line := current_line;

last_line := current_line;

readln_file (in_file,current_line^.line_of_text,record_num);
                        current_line^.rec := record_num;

token (sector_token,sector_token_len,
                                   current_line^.line_of_text,sector_pos);
                        token (table_token,table_token_len,
                                   current_line^.line_of_text,table_pos);

END;

last_line^.next_line := nil;
    END;

(*****************************************************************)

PROCEDURE input_table_list (VAR last_line:line_ptr;VAR record_num : integer);

(*
** Input : pointer to tail of input linked list
**
** Output : adds rest of table list to line list
**
** Function : attach new record to line list
**
** Errors : none
**
** wgd - 850227.0740
*)

VAR
        end_pos : integer;

BEGIN
        end_pos := 0;

WHILE (end_pos = 0) AND ( not eof(in_file)) DO
            BEGIN new (current_line);

last_line^.next_line := current_line;

last_line := current_line;

readln_file (in_file,current_line^.line_of_text,record_num);
                    current_line^.rec := record_num;

token (end_token,end_token_len,
                               current_line^.line_of_text,end_pos);

END;

last_line^.next_line := nil;
END;

(*****************************************************************)

PROCEDURE output_edit_list (edit_list:edit_ptr ;VAR out_rec_num:integer);

(*
** Input : pointer to head of edit list
**
```

```
** Output : edit record is written to output file
**
** Function : to write edit record to index file
**
** Errors : none
**
** wgd - 850301.1028
*)

VAR
   current_rec : edit_ptr;

BEGIN
   current_rec := edit_list^.next_edit;

WHILE (current_rec <> nil) DO BEGIN
      out_rec_num := out_rec_num + 1;
      seek (out_file,out_rec_num);
      out_file^ := current_rec^;
      put (out_file);
      current_rec := current_rec^.next_edit;
   END;

END;

(*****************************************************************)

PROCEDURE get_end_token (s:buffer; VAR token_pos:integer);

(*
** Input : line of text 's'
**
** Output : position in line of text of END token
**
** Function : to find END token
**
** Errors : none
**
** wgd - 850227.0806
**
*)

VAR
   i : integer;
   end_scan : integer;
   quote_pos : integer;
   quote_len : integer;
   quote_end : integer;
   found : boolean;
   car_return : char;
   space : char;
   up_e,lo_e : char;
   up_n,lo_n : char;
   up_d,lo_d : char;

BEGIN up_e := CHR(69);
   lo_e := CHR(101);
   up_n := CHR(78);
   lo_n := CHR(110);
   up_d := CHR(68);
   lo_d := CHR(100);

car_return := CHR(13);
   space := CHR(32);

found := FALSE;
   i := 0;

quote (s,quote_pos,quote_len);
   quote_end := quote_pos + quote_len;
```

```
   end_scan := endscan(s);

WHILE (i < end_scan) AND NOT (found) DO
   BEGIN

IF (i > quote_pos) AND (i < quote_end) THEN i := i + quote_len;

i := i+1;
      IF (s[i] = space) THEN
         BEGIN
            IF (s[i+1] = lo_e) OR (s[i+1] = up_e) THEN
               BEGIN
                  IF (s[i+2] = lo_n) OR (s[i+2] = up_n) THEN
                     BEGIN
                        IF (s[i+3] = lo_d) OR (s[i+3] = up_d) THEN
                           BEGIN
                              IF (s[i+4] = space) OR (s[i+4] = car_return) THEN
                                 BEGIN
                                    token_pos := i;
                                    found := TRUE;
                                 END;
                           END;
                     END;
               END;
         END;
   END;

IF NOT (found) THEN
      BEGIN
         token_pos := 0;
      END;
END;
(*****************************************************************)
PROCEDURE get_translate_flag (current_line,end_of_element:line_ptr;
                              VAR translate:boolean);

(*
** Input : pointer to current line of text in line list and last
**         line pointer of the current element
**
** Output : boolean flag TRUE for translatable element
**
** Function : determine if an element is translatable
**
** Errors : none
**
** wgd - 850227.0812
*)

VAR
   untransl_token_pos    : integer;
   repeat_token_pos      : integer;
   do_not_translate      : boolean;
   repeat_found          : boolean;

BEGIN
   translate := TRUE;
   do_not_translate := FALSE;
   repeat_found := FALSE;

REPEAT token (untransl_token,untransl_token_len,
             current_line^.line_of_text,untransl_token_pos);

token (repeat_token,repeat_token_len,
             current_line^.line_of_text,repeat_token_pos);

IF (untransl_token_pos <> 0) THEN do_not_translate := TRUE;
      IF (repeat_token_pos <> 0) THEN repeat_found := TRUE;

current_line := current_line^.next_line;

UNTIL (current_line = end_of_element);
```

```
IF (do_not_translate) OR (repeat_found) THEN translate := FALSE;

END;

(******************************************************************)

PROCEDURE get_token_type (VAR start_of_element,end_of_element:line_ptr;
                          VAR type_of_token:integer);
(*
** Input  : start and end pointers of current element
**
** Output : token type (integer)
**
** Function : determine token type
**
** Errors : none
**
** wgd - 850227.0817
*)

VAR
    end_pos      : integer;
    token_pos    : integer;
    current_line : line_ptr;

BEGIN current_line := start_of_element;
    token_pos := 0;

REPEAT

BEGIN
            token (touch_token,touch_token_len,
                   current_line^.line_of_text,token_pos);
            IF (token_pos <> 0) THEN
                BEGIN
                    start_of_element := current_line;
                    type_of_token := touch_type;
                END
        END ;

IF (token_pos = 0) THEN

BEGIN
                token (help_token,help_token_len,
                       current_line^.line_of_text,token_pos);
                IF (token_pos <> 0) THEN
                    BEGIN
                        start_of_element := current_line;
                        type_of_token := help_type;
                    END
            END;

IF (token_pos = 0) THEN

BEGIN
                    token (table_token,table_token_len,
                           current_line^.line_of_text,token_pos);
                    IF (token_pos <> 0) THEN
                        BEGIN
                            start_of_element := current_line;
                            type_of_token := table_type;
                        END
                END;

IF (token_pos = 0) THEN
                    BEGIN
                        token (text_token,text_token_len,
                               current_line^.line_of_text,token_pos);
                        IF (token_pos <> 0) THEN
                            BEGIN
```

```
                start_of_element := current_line;
                type_of_token := text_type;
            END
        END;

IF (token_pos = 0) THEN
            BEGIN
                get_end_token (current_line^.line_of_text,token_pos);
                type_of_token := end_type;
            END;

current_line := current_line^.next_line;

UNTIL (token_pos <> 0) OR (current_line = nil);

IF (type_of_token <> end_type) THEN

REPEAT
            get_end_token (current_line^.line_of_text,end_pos);
            current_line := current_line^.next_line;
        UNTIL (end_pos <> 0) OR (current_line = nil)
                              OR (current_line = end_of_element);

end_of_element := current_line;

END;

(*************************************************************)

PROCEDURE get_quote (VAR current_line:line_ptr;end_of_element:line_ptr;
                     VAR current_edit:edit_ptr);
(*
** Input  : start and end pointers of current element in line list
**
** Output : quote string and record number if translatable
**
** Function : get translation text and its record location in source file
**
** Errors : none
**
** wgd - 850227.0825
*)

VAR
    i,j    : integer;
    start  : integer;
    stop   : integer;
    length : integer;

BEGIN

REPEAT quote (current_line^.line_of_text,
               current_edit^.quote_pos,current_edit^.quote_len);

IF (current_edit^.quote_pos <> 0) THEN
            BEGIN
                j := 1;
                start := current_edit^.quote_pos;
                length := current_edit^.quote_len;
                stop := start+length-1;

FOR i:= start TO stop DO
                    BEGIN
                        current_edit^.untran_text[j] :=
                                        current_line^.line_of_text[i];
                        j := j+1;
                    END;
                current_edit^.source_rec := current_line^.rec;
            END;

current_line := current_line^.next_line;
```

```
        UNTIL (current_edit^.quote_pos <> 0) OR (current_line = end_of_element);

END;
(***********************************************************)

PROCEDURE get_field (current_line,end_of_line:line_ptr;
                    VAR current_edit:edit_ptr);

(*
** Input : current line and end of element pointers
**
** Output : pointer to next line of text
**
** Function : to put d-length into edit record
**
** Errors : none
**
** wgd - 850227.0849
*)

VAR
   start_pos    : integer;
   stop_pos     : integer;

BEGIN

REPEAT start_pos := current_edit^.quote_pos;
      stop_pos := endscan (current_line^.line_of_text);

field (current_line^.line_of_text,start_pos,stop_pos,
             current_edit^.trans_num,current_edit^.chars_num,
                                     current_edit^.lines_num);

current_line := current_line^.next_line;

UNTIL (current_edit^.chars_num <> 0) OR (current_line = end_of_line);

IF (current_edit^.lines_num = 0) THEN current_edit^.lines_num := 1;

IF (current_edit^.trans_num = 0) THEN
         current_edit^.trans_num :=
             current_edit^.chars_num * current_edit^.lines_num;

END;
(***********************************************************)

PROCEDURE get_helptext (current_line,end_of_element:line_ptr;
                       VAR current_edit:edit_ptr);

(*
** Input : current line and end of element pointers
**
** Output : attaches helptext list to current edit record
**
** Function : create helptext list
**
** Errors : none
**
** wgd - 850227.0900
** wgd - 850313.1317 - fixed k index
*)

VAR
   token_pos,i,j,k   : integer;
   start,stop        : integer;

BEGIN

FOR k:=1 TO 5 DO
      clear_helptext_line (current_edit^.helptext[k]);

k := 1;
   REPEAT
```

```
        j := 1;
        token_pos := positn(helptext_token,
                            current_line^.line_of_text,begining);

IF (token_pos <> 0 ) THEN
            BEGIN start := token_pos + 1;
                stop  := line_length (current_line^.line_of_text);

FOR i:= start TO stop DO
                    BEGIN
                        current_edit^.helptext[k,j] :=
                                        current_line^.line_of_text[i];
                        j := j+ 1;
                    END;
                k := k+1;
            END;

current_line := current_line^.next_line;

UNTIL (current_line = nil) OR (current_line = end_of_element) OR (k=6);
END;

(***************************************************************)

PROCEDURE clean_up ;

(*
** Input : global file and FORMS status flags
**
** Output : none
**
** Function : close open files and re-enable keyboard
**
** Errors : forms status error code if any generated
**
** wgd - 850227.0905
*)

BEGIN
    IF controlfile_open THEN
        BEGIN
            close (control_file);
            file_err (control_file);
        END;
    IF sourcefile_open THEN
        BEGIN
            close (in_file);
            file_err (in_file);
        END;
    IF destfile_open THEN
        BEGIN
            close (out_file);
            {file_err (out_file);}
        END;
    IF keyboard_open THEN P_CloseKeyboard (comarea);
    IF formsfile_open THEN P_CloseFormsFile (comarea);

{   P_Execute (home_up);    }
{   P_Execute (clear_disp); }
    P_CursorType (0);

END;

(***************************************************************)

PROCEDURE show_me (edit_list:edit_ptr;line_list:line_ptr);

(*
** Input : pointers to heads of line and edit lists
**
```

```
**  Output : writes list data to screen
**
**  Function : DEBUG !!!!!!
**
**  Errors : none
**
**  wgd - 850227.0907
*)

VAR
    current_edit        : edit_ptr;

BEGIN
    current_edit := edit_list^.next_edit;

writeln;
    writeln('>-----------------------------------------------------------<');
    writeln;

IF (current_edit <> nil) THEN

REPEAT writeln ('record  # = ',current_edit^.source_rec);
        writeln ('token type = ',current_edit^.token_type);
        writeln ('quote pos  = ',current_edit^.quote_pos);
        writeln ('quote len  = ',current_edit^.quote_len);
        writeln ('trans num  = ',current_edit^.trans_num);
        writeln ('chars num  = ',current_edit^.chars_num);
        writeln ('lines num  = ',current_edit^.lines_num);
        writeln ('untran text   ');
        writeln (current_edit^.untran_text);
        writeln;

current_edit := current_edit^.next_edit;

UNTIL (current_edit = nil)

ELSE
        writeln ('No translations for this sector');

END;
(**********************************************************************)

PROCEDURE reset_current_edit (VAR current_edit:edit_ptr);

(*
**  Input : current edit record pointer
**
**  Output : initialized edit record
**
**  Function : initialize edit record
**
**  Errors : none
**
**  wgd - 850227.0910
*)

VAR
    i,k :integer;

BEGIN current_edit^.source_rec := 0;
    current_edit^.token_type := 0;
    current_edit^.quote_pos  := 0;
    current_edit^.quote_len  := 0;
    current_edit^.trans_num  := 0;
    current_edit^.chars_num  := 0;
    current_edit^.lines_num  := 0;
```

```
   FOR i:=1 TO max_length DO
      BEGIN
         current_edit^.tran_text[i]   := white_space;
         current_edit^.untran_text[i] := white_space;
      END;

FOR k := 1 TO 5 DO BEGIN
      FOR i := 1 TO max_help_length DO
            current_edit^.helptext[k,i] := white_space;
   END;

current_edit^.trans_flag := FALSE;
   current_edit^.next_edit  := nil;
END;

(**************************************************************)

PROCEDURE level_1_labels;

(*
** Input : none
**
** Output : none
**
** Function : to display softkey labels
**
** Errors : check_status
**
** wgd - 850227.0913
*)

BEGIN
   key_label := other_keys;
   P_WriteLabel (1,key_label);

key_label := german;
   P_WriteLabel (2,key_label);

key_label := french;
   P_WriteLabel (3,key_label);

key_label := spanish;
   P_WriteLabel (4,key_label);

key_label := dutch;
   P_WriteLabel (5,key_label);

key_label := italian;
   P_WriteLabel (6,key_label);

key_label := swedish;
   P_WriteLabel (7,key_label);

key_label := exit;
   P_WriteLabel (8,key_label);

P_DisplayLabels;

END;

(**************************************************************)

PROCEDURE level_2_labels;

(*
** Input : none
**
** Output : none
**
** Function : to display alternate softkey labels
**
** Errors : check_status
**
```

```
**  wgd - 850227.0915
*)

VAR
    i : integer;

BEGIN key_label := danish;
    P_WriteLabel (2,key_label);

key_label := norwgn;
    P_WriteLabel (3,key_label);

key_label := katakana;
    P_WriteLabel (4,key_label);

key_label := english;
    P_WriteLabel (5,key_label);

key_label := blank;
    FOR i := 6 TO 7 DO
        BEGIN
            P_WriteLabel (i,key_label);
        END;

key_label := exit;
    P_WriteLabel (8,key_label);

P_DisplayLabels;

END;

(***********************************************************)

PROCEDURE blank_labels;

(*
** Input : none
**
** Output : none
**
** Function : blank out softkeys
**
** Errors : check_status
**
** wgd - 850227.0917
*)

VAR
    i : integer;

BEGIN key_label := blank;
    FOR i:=1 TO 8 DO
        P_WriteLabel (i,key_label);

P_DisplayLabels;

END;

(***********************************************************
**
** main
**
***********************************************************)

BEGIN title_entered := FALSE;
    language_chosen := FALSE;
    done := FALSE;
```

```
    P_Execute (home_up);
    P_Execute (clear_disp);

{ Open forms file }
    forms_file := 'FORMS.IDX'*CHR(00);
    P_OpenFormsFile (comarea,ads(forms_file[1]),1,0,ads(memarea),mem_size);
    check_status;
    formsfile_open := TRUE;

{ Initialize forms name table }
    num_forms := 3;
    name_list[1] := index_form_1;
    name_list[2] := index_form_2;
    name_list[3] := index_form_3;

{ Make them memory resident }
    P_LoadForms (comarea,num_forms,name_list);
    check_status;

{ Display first form }
    P_DisplayForm (comarea,name_list[1]);
    check_status;

level := 1;
    level_1_labels;

{ Open keyboard and read input filename }
    P_OpenKeyboard (comarea);
    check_status;
    keyboard_open := TRUE;

P_CursorType (0); (under_score)

comoptns := 0;
    comarea.options := comoptns;
    comarea.startfield := 1;
    comarea.startoffset := 0;
    comarea.errmsgfield := 255;

REPEAT

P_ReadInput (comarea);
        check_status;

CASE (comarea.lastact) OF

1:BEGIN {wake_up}
                message := 'Fill in field and select again';
                P_SetMessage (comarea,ads(message),30);
                check_status;
                comoptns := comoptns OR Error_Read;
                comarea.errmsgfield := 255;
                comarea.startfield := 1;
                comarea.startoffset := 0;
            END;

2:BEGIN {break_keys}
                BEGIN
                    P_GetField (comarea,1,40,ads(trans_title),
                                No_Change_Ptr,No_Change_Ptr);
                    check_status;
                    title_entered := TRUE;
                END;
                CASE (comarea.lastkey) OF
                    0:BEGIN {other keys}
                        CASE level OF
                            1:BEGIN
                                level_2_labels;
                                level := 2;
                            END;
                            2:BEGIN
```

```
                level_1_labels;;
                level := 1;
             END;
        END;
   END;
7:BEGIN {EXIT key}
        clean_up;
        P_Execute (home_up);
        P_Execute (clear_disp);
        EndXqq;
   END;
1:BEGIN
        IF (level = 1) THEN
            BEGIN
                language := 'German  ';
                language_key := 'G';
                language_chosen := TRUE;
            END;
        IF (level = 2) THEN
            BEGIN
                language := 'Danish  ';
                language_key := 'D';
                language_chosen := TRUE;
            END;
   END;
2:BEGIN
        IF (level = 1) THEN
            BEGIN
                language := 'French  ';
                language_key := 'F';
                language_chosen := TRUE;
            END;
        IF (level = 2) THEN
            BEGIN
                language := 'Norwgn  ';
                language_key := 'N';
                language_chosen := TRUE;
            END;
   END;
3:BEGIN
        IF (level = 1) THEN
            BEGIN
                language := 'Spanish ';
                language_key := 'S';
                language_chosen := TRUE;
            END;
        IF (level = 2) THEN
            BEGIN
                language := 'Katakana';
                language_key := 'K';
                language_chosen := TRUE;
            END;
   END;
4:BEGIN
        IF (level = 1) THEN
            BEGIN
                language := 'Dutch   ';
                language_key := 'D';
                language_chosen := TRUE;
            END;
        IF (level = 2) THEN
            BEGIN
                language := 'English ';
                language_key := '_';
                language_chosen := TRUE;
            END;
   END;
5:BEGIN
        IF (level = 1) THEN
            BEGIN
                language := 'Italian ';
                language_key := 'I';
                language_chosen := TRUE;
            END;
```

```
                        IF (level = 2) THEN
                            BEGIN
                                language := 'BOGUS   ';
                                language_key := '*';
                                language_chosen := FALSE;
                            END;
                    END;
                6:BEGIN
                    IF (level = 1) THEN
                        BEGIN
                            language := 'Swedish ';
                            language_key := 'W';
                            language_chosen := TRUE;
                        END;
                    IF (level = 2) THEN
                        BEGIN
                            language := 'BOGUS   ';
                            language_key := '*';
                            language_chosen := FALSE;
                        END;
                END;
            END;
        END;
    END;
UNTIL (language_chosen) AND (title_entered);

REPEAT ready_to_index := TRUE;

P_CursorType (-1);

P_DisplayForm (comarea,name_list[2]);
    check_status;

P_PutField (comarea,100,8,ads(language),Default_Ptr,Default_Ptr);
    check_status;

key_label := blank;
    FOR i:= 3 TO 7 DO
        BEGIN
            P_WriteLabel (i,key_label);
        END;

IF (controlfile_open) THEN close (control_file);
    assign (control_file,controlfile_name);
    control_file.TRAP := TRUE;
    rewrite (control_file);
    file_err (control_file);
    controlfile_open := TRUE;

writeln (control_file,trans_title);
    writeln (control_file,language);
    writeln (control_file,language_key);

done := FALSE;
    pass := 0;

P_CursorType (0);

REPEAT blank_labels;

key_label := entry;
        P_WriteLabel (1,key_label);

IF (pass <> 0) THEN
            BEGIN
                key_label := start_index;
                P_WriteLabel (2,key_label);
            END;
```

```
        key_label := start_over;
        P_WriteLabel (3,key_label);

key_label := exit;
        P_WriteLabel (8,key_label);

P_DisplayLabels;

comoptns := Quick_Read;
        comarea.options := comoptns;
        comarea.errmsgfield := 255;

comarea.startfield := 1;
        P_ReadInput (comarea);
        check_status;

{ Determine if user entered valid input (alphas) or hit EXIT key }
        CASE (comarea.lastact) OF
          1:BEGIN
                message := 'Illegal input !!               ';
                P_SetMessage (comarea,ads(message),30);
                check_status;
                comoptns := comoptns OR Error_Read;
                comarea.errmsgfield := 255;
                comarea.startfield := comarea.endfield;
          END;
      2:BEGIN
          CASE (comarea.lastkey) OF
            7:BEGIN (break key f8 - EXIT }
                clean_up;
                P_Execute (home_up);
                P_Execute (clear_disp);
                EndXqq;
            END;
            1:BEGIN (done entering file names)
                IF (pass <> 0) THEN
                    BEGIN
                        done := TRUE;
                        ready_to_index := TRUE;
                    END;
            END;
            2:BEGIN (start over key)
                done := TRUE;
                ready_to_index := FALSE;
            END;
            0:BEGIN
                { If OK then get the alpha string }
                    P_GetField  (comarea,1,8,ads(source_file),
                                 No_Change_Ptr,No_Change_Ptr);

check_status;

blank_labels;

key_label := entry;
                P_WriteLabel (1,key_label);
                P_Displaylabels;

REPEAT

{ If OK then get the accompanying title }
                    comarea.startfield := 2;
                    P_ReadInput (comarea);
                    check_status;

IF (comarea.lastact = 2)
                        AND (comarea.lastkey = 0) THEN

BEGIN
                        { OK then get title }
                            P_GetField (comarea,2,40,ads(title),
                                        No_Change_Ptr,No_Change_Ptr);
                            check_status;
```

```
                pass := pass + 1;
                P_NumToAscii (ads(pass),
                              1,ads(ascii_pass),1,',','.',
                                           separate,0,status :
                writeln (control_file,ascii_pass);
                writeln (control_file,source_file);

copylst (source_file,dest_file);
                dest_file.LEN := name_length(source_file);
                dest_file[3] := language_key;
                concat (dest_file,extension);

writeln (control_file,dest_file);

writeln (control_file,title);

cell := pass * 10;
                P_PutField (comarea,(cell+1),1,ads(ascii_pass),
                                        Default_Ptr,ads(h_b_i));
                check_status;
                P_PutField (comarea,(cell+2),8,ads(source_file),
                                        Default_Ptr,ads(h_b_i));
                check_status;
                P_PutField (comarea,(cell+3),40,ads(title),
                                        Default_Ptr,ads(h_b_i));
                check_status;
              END;

UNTIL (comarea.lastact = 2) AND (comarea.lastkey = 0);

END;
       END;

END;

END;

UNTIL (done) OR (pass = 6);

UNTIL (ready_to_index);

blank_labels;

P_DisplayForm (comarea,name_list[3]);
 check_status;

P_CursorType (-1);

{ Reset control file start indexing } cell := 0;
 reset (control_file);
 readln (control_file,trans_title);
 readln (control_file,language);
 readln (control_file,language_key);

REPEAT (until end of control file)

readln (control_file,ascii_pass);
    readln (control_file,source_file);
    readln (control_file,dest_file);
    readln (control_file,title);

P_PutField (comarea,(cell+1),1,ads(ascii_pass),
                       Default_Ptr,ads(h_b_i));
    check_status;
    P_PutField (comarea,(cell+2),8,ads(source_file),
                       Default_Ptr,ads(h_b_i));
    check_status;
    P_PutField (comarea,(cell+3),40,ads(title),
                  Default_Ptr,ads(h_b_i));
    check_status;

cell := cell + 3;
```

```
    assign (in_file,source_file);
    in_file.MODE := DIRECT;
    in_file.TRAP := TRUE;
    reset (in_file);
    IF (in_file.ERRS <> 0 ) THEN BEGIN
        message := 'ERROR - Last File Not Found   ';
        P_PutField (comarea,255,40,ads(message),Default_Ptr,ads(b_i));
        clean_up;
        EndXqq;
    END;

sourcefile_open := TRUE;

assign (out_file,dest_file);
    out_file.MODE := DIRECT;
    out_file.TRAP := TRUE;
    discard (out_file);
    rewrite (out_file);
    destfile_open := TRUE;

( Create linked lists and reset pointers )

new (line_list);
    new (edit_list);
    reset_current_edit (edit_list);

out_rec_num := start_of_outfile;
    record_num := start_of_infile;

( input_list (last_line,record_num);)

REPEAT first_line := line_list;
        last_line  := line_list;

reset_current_edit (edit_list);

first_edit := edit_list;
        last_edit  := edit_list;

input_list (last_line,record_num);

start_of_element := line_list^.next_line;

REPEAT get_token_type (start_of_element,end_of_element,type_of_token);

CASE (type_of_token) OF end_type   : BEGIN
                                start_of_element := end_of_element;
                             END;

touch_type : BEGIN get_translate_flag (start_of_element,
                                                    end_of_element,translate);

IF (translate) THEN

BEGIN new (current_edit);
                                        reset_current_edit (current_edit);

last_edit^.next_edit :=
                                                            current_edit;

last_edit := current_edit;

current_edit^.token_type :=
                                                            type_of_token;
```

```
                    current_edit^.next_edit := nil;

get_helptext (start_of_element,
                                  end_of_element,
                                      current_edit);

get_field (start_of_element,
                               end_of_element,
                                   current_edit);

get_quote (start_of_element,
                               end_of_element,
                                   current_edit);

END ;

start_of_element := end_of_element;

END;

table_type : BEGIN input_table_list (last_line,record_num);

end_of_element := last_line;

get_translate_flag (start_of_element,
                             end_of_element,translate);

IF (translate) THEN

BEGIN new (current_edit);
                reset_current_edit (current_edit);

last_edit^.next_edit :=
                                      current_edit;

last_edit := current_edit;

current_edit^.token_type :=
                                      type_of_token;
                current_edit^.next_edit := nil;

get_helptext (start_of_element,
                              end_of_element,
                                  current_edit);

temp_helptext :=
                          current_edit^.helptext;

get_field (start_of_element,
                           end_of_element,
                               current_edit);

get_quote (start_of_element,
                           end_of_element,
                               current_edit);

current_edit^.trans_num :=
                          current_edit^.quote_len;

table_elements :=
                          current_edit^.chars_num;

FOR i:=2 TO table_elements DO

BEGIN new (current_edit);
                        reset_current_edit(current_edit);
```

```
                last_edit^.next_edit :=
                            current_edit;

last_edit := current_edit;

current_edit^.next_edit := nil;

IF (((i-1) MOD 5) = 0) THEN BEGIN
                    current_edit^.helptext :=
                                temp_helptext;

current_edit^.token_type :=
                                type_of_token;
                END;

get_quote (start_of_element,
                            end_of_element,
                                current_edit);

current_edit^.trans_num :=
                        current_edit^.quote_len;

END;

start_of_element := end_of_element;

END;

END;

help_type : BEGIN
                get_translate_flag (start_of_element,
                                end_of_element,translate);

IF (translate) THEN

BEGIN new (current_edit);
                        reset_current_edit (current_edit);

last_edit^.next_edit :=
                                    current_edit;

last_edit := current_edit;

current_edit^.token_type := type_of_token;

get_helptext (start_of_element,
                                end_of_element,
                                    current_edit);

get_field (start_of_element,
                                end_of_element,
                                    current_edit);

current_edit^.trans_num :=
                                current_edit^.chars_num;

trans_elements := current_edit^.chars_num;

help_elements :=
                                current_edit^.lines_num;

start_of_element :=
                                start_of_element^.next_line;

get_token_type (start_of_element,
                                    end_of_element,
                                        type_of_token);
```

```
            get_quote (start_of_element,
                      end_of_element,
                              current_edit);

start_of_element := end_of_element;

FOR i:=2 TO help_elements DO
                BEGIN
                    new (current_edit);
                    reset_current_edit (current_edit);

last_edit^.next_edit :=
                                    current_edit;

last_edit := current_edit;
                    current_edit^.next_edit := nil;

get_token_type (start_of_element,
                                    end_of_element,
                                        type_of_token);

get_quote (start_of_element,
                               end_of_element,
                                       current_edit);

current_edit^.trans_num :=
                                    trans_elements;

start_of_element := end_of_element;

END;

END;

END;

text_type : BEGIN get_translate_flag (start_of_element,
                            end_of_element,translate);

IF (translate) THEN
            BEGIN
                new (current_edit);
                reset_current_edit (current_edit);

last_edit^.next_edit :=
                                current_edit;

last_edit := current_edit;

current_edit^.token_type :=
                                type_of_token;

current_edit^.next_edit := nil;

get_helptext (start_of_element,
                              end_of_element,
                                      current_edit);

get_field (start_of_element,
                           end_of_element,
                                   current_edit);

get_quote (start_of_element,
                           end_of_element,
                                   current_edit);

END;
```

```
            start_of_element := end_of_element;

END;
         OTHERWISE

END;

UNTIL (start_of_element = nil);

{     show_me (edit_list,line_list); )     ( << DEBUG >> }
      output_edit_list (edit_list,out_rec_num);

temp_edit_ptr := edit_list^.next_edit;

WHILE (temp_edit_ptr <> nil) DO BEGIN
         current_edit := temp_edit_ptr;
         dispose (current_edit);
         temp_edit_ptr := temp_edit_ptr^.next_edit;
      END;

temp_line_ptr := line_list^.next_line;

WHILE (temp_line_ptr <> nil) DO BEGIN
         current_line := temp_line_ptr;
         dispose (current_line);
         temp_line_ptr := temp_line_ptr^.next_line;
      END;

UNTIL (eof(in_file));

dispose (edit_list);
dispose (line_list);

close (out_file);
close (in_file)

UNTIL eof(control_file);

close (control_file);
clean_up;

END.

PROGRAM ovrlay (INPUT,OUTPUT);

(*
**      Who             What                    When            Where
**      ---             ----                    ----            -----
**      wgd             First pass              850222          Main
**      wgd
**      wgd
**      wgd
**      wgd
**
**
**
*)

{ $EXTEND    }
{ $INCLUDE: 'PDECLS.INC' }

CONST begining  = 1;
   null = CHR(00);
   white_space = ' ';
   start_of_infile  = 0;
   start_of_outfile = 0;

max_length = 81;
   max_name   = 8;
```

```
    extension   = '.IDX';
    controlfile = 'CONTROL.IDX';

{ Constants for FORMS/100 package } mem_size = 2000;

ovrly_form_1 = 'sign_on          ';
    ovrly_form_2 = 'ovrly_in_progres';

half_bright_inv = 'J';
    bright_inv      = 'B';
    home_up         = 'H';
    clear_disp      = 'J';

h_b_i = 'JJJJJJJJJJJJJJJJJJJJJJJJJJJJJJJJJJJJJJJ';
     b_i  = 'BBBBBBBBBBBBBBBBBBBBBBBBBBBBBBBBBBBBBBB';

start_overlay = label_record (half_bright_inv,half_bright_inv,
                                 ' Start ','Overlay ');

blank = label_record (half_bright_inv,half_bright_inv,
                         '       ','        ');

exit  = label_record (half_bright_inv,half_bright_inv,
                         ' EXIT  ','        ');

TYPE
    buffer    = PACKED ARRAY [begining..max_length] OF CHAR;
    fname     = PACKED ARRAY [begining..max_name] OF CHAR;

help_line = PACKED ARRAY [1..78] OF CHAR;
    helptype  = ARRAY [1..5] OF help_line;

edit_ptr = ^edit;

edit = RECORD
        token_type      : integer;
        quote_pos       : integer;
        quote_len       : integer;
        trans_num       : integer;
        chars_num       : integer;
        lines_num       : integer;
        trans_flag      : boolean;
        untran_text     : buffer;
        tran_text       : buffer;
        helptext        : helptype;
        source_rec      : integer;
        previous_edit   : edit_ptr;
        next_edit       : edit_ptr;
    END;

VAR edit_rec     : edit;
    edit_num     : integer;
    source_line  : integer;
    temp_line    : buffer;
    new_line     : buffer;
    tran_str     : string(80);
    line_buffer  : buffer;
    found        : boolean;
    translate    : boolean;
    str_1_len    : integer;
    str_3_len    : integer;
    len          : integer;
    length       : integer;
    position     : integer;
    start_pos    : integer;
    end_pos      : integer;
    i,j          : integer;
    cell         : integer;
```

```
    trans_title     : string(40);
    language        : string(8);
    title           : string(40);
    status          : integer;
    language_key    : char;
    ascii_pass      : char;

t_len    : integer;
    q_len    : integer;
    q_start  : integer;
    q_stop   : integer;

last_type : integer;

str_1 : buffer;
    str_2 : buffer;
    str_3 : buffer;

controlfile_open : boolean;
    sourcefile_open  : boolean;
    destfile_open    : boolean;
    indexfile_open   : boolean;

controlfile_name: lstring(12);
    sourcefile_name : fname;
    destfile_name   : fname;
    indexfile_name  : lstring(12);
    tempfile_name   : fname;

control_file : text;
    source_file  : text;
    dest_file    : text;
    index_file   : FILE OF edit;

( Variables for FORMS/100 package )

comarea         : forms_comarea;
    memarea         : PACKED ARRAY [1..mem_size] OF byte;
    keyboard_open   : boolean;
    formsfile_open  : boolean;

done         : boolean;
    forms_file   : lstring(64);
    formname     : lstring(16);
    comoptns     : word;
    num_forms    : integer;
    name_list    : form_name_list;
    key_label    : label_record;
    message      : PACKED ARRAY [1..30] OF char;

(*******************************************************)
{ Include external procedures }
{ $INCLUDE: 'PEXTRNS1.INC'    }
{ $INCLUDE: 'PEXTRNS3.INC'    }
(*******************************************************)

PROCEDURE clear_buffer(VAR s:buffer);

(*
** Input  : buffer of max_length and type CHAR
**
** Output : this buffer is returned with white_spaces
**
** Function : initialize buffer
**
** Errors : none
**
** wgd - 850226.1618
*)

VAR
    i : integer;

BEGIN
```

```
   FOR i := 1 TO max_length DO
       s[i] := white_space
END;

(*******************************************************************)

FUNCTION line_length (s:buffer) : integer;

(*
** Input : line of text 's'
**
** Output : length of line (trailing blanks ignored)
**
** Function : determine line length
**
** Errors : none
**
** wgd - 850227.0921
*)

VAR
    i     : integer;
    blank : boolean;

BEGIN
    i := max_length;
    blank := TRUE;

WHILE (i>0) and blank DO

IF (s[i] = white_space)OR (s[i] = null) THEN
          i := i - 1
       ELSE
          blank := FALSE;

line_length := i;
END;

(*******************************************************************)

FUNCTION name_length (n : fname) : word;

(*
** Input : string 'n'
**
** Output : name_length, number of non-blank characters in file name
**
** Function : find length of 'n' ignoring trailing blanks
**
** Errors : none
**
** wgd - 850228.1120
*)

VAR
    i     : word;
    blank : boolean;

BEGIN i := max_name;
    blank := TRUE;

WHILE (i>0) AND blank DO

IF n[i] = white_space THEN
          i := i - 1
       ELSE
          blank := FALSE;

name_length := i;
END;

(*******************************************************************)
```

```
PROCEDURE EndXqq; EXTERNAL;

(*
** Input: none
**
** Output: none
**
** Function: a pascal intrinsic to unconditionally abort the
**           calling program
**
** Errors: none
**
** wgd - 850226.1620
*)

(*************************************************************)

PROCEDURE check_status;

(*
** Input : global status of FORMS and all files used
**
** Output : none
**
** Function : close any open files and re-enable the keyboard
**
** Errors : FORMS error code if generated
**
** wgd - 850226.1621
*)

VAR
   comsts : integer;

BEGIN comsts := comarea.status;

IF (comsts <> 0) THEN

BEGIN

IF sourcefile_open THEN close (source_file);

IF destfile_open THEN close (dest_file);

IF indexfile_open THEN close (index_file);

IF controlfile_open THEN close (control_file);

IF keyboard_open THEN P_CloseKeyboard (comarea);

IF formsfile_open THEN P_CloseFormsFile (comarea);

writeln ('Error: status = ',comsts:3);

EndXqq;

END;
END;

(*************************************************************)

FUNCTION shift(VAR s:char) : char ;

(*
** Input : character 's'
**
** Output : chraracter of opposite case
**
** Function : toggle case of alpha character
**
** Errors : none
**
```

```
** wgd - 850227.0927
*)

CONST
        space_char = ' ';

VAR
        case_change    : integer;
        letter         : integer;

BEGIN case_change := ORD(space_char);
        letter := ORD(s);

IF (letter IN [65..90]) THEN
                letter := letter + case_change
        ELSE
                IF (letter IN [97..122]) THEN
                        letter := letter - case_change;

shift := CHR(letter);

END;

(***************************************************************)

PROCEDURE file_err (VAR f:text);

(*
**
** Input: 'f' text file
**
** Output: none
**
** Function: trap file I/O errors and abort if F.ERRS <> 0
**
** Errors: see procedure
**
** wgd - 850226.1622
*)

BEGIN
        CASE f.ERRS  OF
                0:message := '                                   ';
                1:message := 'Hard data error                    ';
                2:message := 'Invalid unit/device/volume         ';
                3:message := 'Invalid Operation on device        ';
                4:message := 'Internal file system error         ';
                5:message := 'Device offline                     ';
                6:message := 'Lost file                          ';
                7:message := 'Invalid syntax, name too long      ';
                8:message := 'Disk directory full                ';
                9:message := 'Unit/device/volume not found       ';
                10:message:= 'File not found                     ';
                11:message:= 'Protected file                     ';
                12:message:= 'File in use                        ';
                13:message:= 'File not open                      ';
                14:message:= 'Data format error                  ';
                15:message:= 'Line too long                      ';

OTHERWISE
                message:= 'Undefined Error                       ';
        END;

END;

(***************************************************************)

PROCEDURE readln_file (VAR f:text ; VAR s:buffer ; record_num:integer);

(*
** Input: 'f' text file
```

```
**
** Output: 's' packed array
**
** Function: reads a line of text from 'f', substitutes the sequence
**           <null-space-null> for tab characters and puts it in 's'
**
** Errors: none
**
** wgd - 850226.1623
*)

CONST
   null  = CHR(00);
   space = CHR(32);

VAR
   i    : integer;
   temp : char;

BEGIN
   clear_buffer(s);
   i:= 1;
   WHILE NOT eoln(f) AND (i < max_length) DO
      BEGIN
         i := i + 1;
         read (f,temp);
         IF (temp < space) THEN
            BEGIN
               s[i] := space;
               i := i + 1;
               s[i] := null;
               i := i + 1;
               s[i] := space
            END
         ELSE
               s[i] := temp;
      END;
   get(f);
END;

(***********************************************************************)

PROCEDURE writeln_file (VAR f:text ; s:buffer);

(*
** Input  : file 'f' and a line of text in 's'
**
** Output : line of text to file 'f'
**
** Function : write line to file and re-substitute tabs back in text
**
** Errors : none
**
** wgd - 850226.1627
*)

CONST
        null  = CHR(00);
        space = CHR(32);
        tab   = CHR(09);
VAR
        i,j       : integer;
        temp_line : buffer;

BEGIN
                i := 0;
                j := 0;
                clear_buffer(temp_line);

REPEAT
                   i := i + 1;
                   j := j + 1;
```

```
            IF (s[i] = space)AND(s[i+1] = null)AND(s[i+2] = space) THEN
               BEGIN
                   temp_line[j] := tab;

i := i + 2;
                    END
                ELSE
                        temp_line[j] := s[i];

UNTIL (i = max_length);

writeln(f,temp_line:line_length(temp_line));
        END;

(****************************************************************)

PROCEDURE clean_up ;

(*
** Input : global file and FORMS status flags
**
** Output : none
**
** Function : close open files and re-enable keyboard
**
** Errors : forms status error code if any generated
**
** wgd - 850227.0905
*)

BEGIN
    IF controlfile_open THEN
        BEGIN
            close (control_file);
        END;
    IF sourcefile_open THEN
        BEGIN
            close (source_file);
        END;
    IF destfile_open THEN
        BEGIN
            close (dest_file);
        END;
    IF indexfile_open THEN
        BEGIN
            close (index_file);
        END;
    IF keyboard_open THEN P_CloseKeyboard (comarea);
    IF formsfile_open THEN P_CloseFormsFile (comarea);

P_Execute (home_up);
    P_Execute (clear_disp);

P_CursorType (0);

END;

(****************************************************************)

PROCEDURE blank_labels;

(*
** Input : none
**
** Output : none
**
** Function : blank out softkeys
**
** Errors : check_status
**
** wgd - 850227.0917
*)
```

```
VAR
   i : integer;

BEGIN key_label := blank;
   FOR i:=1 TO 8 DO
      P_WriteLabel (i,key_label);

P_DisplayLabels;

END;

(****************************************************************
**
** main
**
****************************************************************)

BEGIN

P_Execute (home_up);
   P_Execute (clear_disp);
   P_CursorType (-1); (cursor off)

{ Open forms file }
   forms_file := 'FORMS.OVR'+CHR(00);
   P_OpenFormsFile (comarea,ads(forms_file[1]),1,0,ads(memarea),mem_size);
   check_status;
   formsfile_open := TRUE;

{ Initialize forms name table }
   num_forms := 2;
   name_list[1] := ovrly_form_1;
   name_list[2] := ovrly_form_2;

{ Make them memory resident }
   P_LoadForms (comarea,num_forms,name_list);
   check_status;

{ Display first form }
   P_DisplayForm (comarea,name_list[1]);
   check_status;

{ Open keyboard and read input filename }
   P_OpenKeyboard (comarea);
   check_status;
   keyboard_open := TRUE;

P_CursorType (-1); ( cursor off )
{ Open Control file and get started }
   assign (control_file,controlfile);
   reset (control_file);

{ Reset control file start indexing } cell := 0;
   readln (control_file,trans_title);
   readln (control_file,language);
   readln (control_file,language_key);

P_PutField (comarea,100,40,ads(trans_title),Default_Ptr,ads(h_b_i));

P_PutField (comarea,101,8,ads(language),Default_Ptr,Default_Ptr);

REPEAT (until end of control file)

readln (control_file,ascii_pass);
      readln (control_file,sourcefile_name);
      readln (control_file,indexfile_name);
      readln (control_file,title);
```

```
        tempfile_name := sourcefile_name;
        tempfile_name[3] := language_key;
        destfile_name := tempfile_name;

P_PutField (comarea,(cell+1),1,ads(ascii_pass),Default_Ptr,ads(h_b_i));

P_PutField (comarea,(cell+2),8,ads(sourcefile_name),
                                                        Default_Ptr,ads(h_b_i));

P_PutField (comarea,(cell+3),40,ads(title),Default_Ptr,ads(h_b_i));

cell := cell + 3;
    UNTIL eof(control_file);

close (control_file);

blank_labels;

key_label := start_overlay;
    P_WriteLabel (1,key_label);

key_label := exit;
    P_WriteLabel (8,key_label);

P_DisplayLabels;

comoptns := Quick_Read;
    comarea.options := comoptns;
    comarea.errmsgfield := 255;
    comarea.startfield := 1;

P_ReadInput (comarea);
    check_status;

{ Determine if user entered valid input (alphas) or hit EXIT key }
    CASE (comarea.lastact) OF
        1:BEGIN (BOGUS INPUT)
            message := 'Illegal input !!                    ';
            P_SetMessage (comarea,ads(message),30);
            check_status;
            comoptns := comoptns OR Error_Read;
            comarea.errmsgfield := 255;
            comarea.startfield := comarea.endfield;
        END;
        2:BEGIN (EXIT)
            CASE (comarea.lastkey) OF
                7:BEGIN (break key f8 - EXIT )
                    clean_up;
                    P_Execute (home_up);
                    P_Execute (clear_disp);
                    EndXqq;
                END;
                1:BEGIN (User wants to install )
                    done := TRUE;
                END;
            END;

END;

END;

blank_labels;

P_DisplayForm (comarea,name_list[2]);
    check_status;

{ Open Control file and get started }
    reset (control_file);

{ Reset control file start indexing }
```

```
cell := 0;
readln (control_file,trans_title);
readln (control_file,language);
readln (control_file,language_key);

REPEAT (until end of control file)

readln (control_file,ascii_pass);
   readln (control_file,sourcefile_name);
   readln (control_file,indexfile_name);
   readln (control_file,title);

( create destination filename from source filename and language key )

tempfile_name := sourcefile_name;
   tempfile_name[3] := language_key;
   destfile_name := tempfile_name;

P_PutField (comarea,(cell+1),1,ads(ascii_pass),
                       Default_Ptr,ads(h_b_i));

check_status;
   P_PutField (comarea,(cell+2),8,ads(destfile_name),
                       Default_Ptr,ads(h_b_i));

check_status;
P_PutField (comarea,(cell+3),40,ads(title),
                    Default_Ptr,ads(h_b_i));

check_status;

cell := cell + 3;

assign (source_file,sourcefile_name);
source_file.MODE := DIRECT;
source_file.TRAP := TRUE;
reset (source_file);
IF (source_file.ERRS <> 0 ) THEN BEGIN
   message := 'ERROR - Last File Not Found   ';
   P_PutField (comarea,255,40,ads(message),Default_Ptr,ads(b_i));
   clean_up;
   EndXqq;
END;
sourcefile_open := TRUE;

assign (dest_file,destfile_name);
dest_file.MODE := SEQUENTIAL;
dest_file.TRAP := TRUE;
discard (dest_file);
rewrite (dest_file);
destfile_open := TRUE;

assign (index_file,indexfile_name);
index_file.MODE := DIRECT;
index_file.TRAP := TRUE;
reset (index_file);
indexfile_open := TRUE;

source_line := 0;
edit_num := 0;

WHILE NOT eof(index_file) DO BEGIN ( Text edit procedures go here )

( Get edit record )

edit_num := edit_num + 1;
   seek(index_file,edit_num);
   get (index_file);
   edit_rec := index_file^;

REPEAT (until source line equals edit record )

FOR i:= 1 TO 81 DO temp_line[i] := white_space;
```

```
            source_line := source_line + 1;
            readln_file (source_file,temp_line,source_line);

IF (source_line = edit_rec.source_rec) THEN BEGIN
                len    := edit_rec.trans_num;
                q_len  := edit_rec.quote_len;
                q_start := edit_rec.quote_pos;
                q_stop := q_start + q_len;

clear_buffer(str_1);
                clear_buffer(str_2);
                clear_buffer(str_3);

FOR i:= 1 TO len DO str_2[i] := edit_rec.tran_text[i];
                FOR i:= 1 TO (q_start-1) DO str_1[i] := temp_line[i];

IF (edit_rec.token_type <> 0) THEN
                        last_type := edit_rec.token_type;

IF (last_type = 2) THEN
                    t_len := len
                ELSE
                    t_len := line_length(str_2);

j := 1;
                FOR i:= q_stop TO 80 DO BEGIN
                    str_3[j] := temp_line[i];
                    j := j + 1;
                END;

FOR i:= 1 TO t_len DO BEGIN
                    str_1[q_start] := str_2[i];
                    q_start := q_start + 1;
                END;

j := 1;
                FOR i:= q_start TO 80 DO BEGIN
                    str_1[i] := str_3[j];
                    j := j + 1;
                END;

temp_line := str_1;

END;

IF (source_line = 6) THEN temp_line[23] := language_key;

writeln_file (dest_file,temp_line);

UNTIL (source_line = edit_rec.source_rec) OR eof(source_file);

END;

close (source_file);
    close (dest_file);
    close (index_file);

UNTIL eof(control_file);

close (control_file);
blank_labels;
clean_up;

END.
```

```
(*
**  PDECLS.INC
**
**  This is the first of 4 include files provided for calling the
**  Forms Master library from MS-Pascal.
**
**    - PDECLS.INC    - type declarations and constant declarations
**                      used with Forms Master.
**    - PEXTRNS1.INC  - declarations of Forms Master procedures not
**                      concerned directly with forms file editing.
**    - PEXTRNS2.INC  - declarations of Forms Master procedures
**                      concerned directly with forms file editing.
**    - PEXTRNS3.INC  - declarations of Forms Master primitives.
**
**  Use the $INCLUDE metacommand to include this file into your program.
*)

TYPE

{ The communication area. } forms_comarea = RECORD
        status      : integer;
        fileid      : integer;
        cfnumlines  : integer;
        startfield  : integer;
        startoffset : integer;
        options     : word;
        lastact     : integer;
        lastkey     : integer;
        lastkey2    : integer;
        lastquals   : word;
        endfield    : integer;
        endoffset   : integer;
        endrow      : integer;
        endcol      : integer;
        errorenh    : integer;
        decimal     : integer;
        separator   : integer;
        errmsgfield : integer;
        fc_reserve  : ARRAY [0..11] OF word;
        END;

CONST

{ Constants defining the bits in comarea.options. }

Quick_Read   =  1;
    Error_Read   =  2;
    Quiet        =  4;
    RowCol_Read  =  8;

{ Constants defining bits in comarea.lastquals. }

Repeated  = #0001;
    R_Shift   = #0002;
    L_Shift   = #0004;
    Control   = #0008;
    R_Extend  = #0010;
    L_Extend  = #0020;
    Special   = #0080;
    Source_Id = #FF00;

{ Constants of type adsmem for specifying "default" or "no change". }

Default_Ptr   = adsmem ( 0,  0);
    No_Change_Ptr = adsmem (-1, -1);

TYPE

{ Types for form names and list of form names. } form_name      = PACKED ARRAY [1..16] OF char;
    form_name_list = ARRAY [1..500] OF form_name;
```

{ Types defining form and screen. }

```
   form_record = RECORD
      num_rows    : integer;
      num_fields  : integer;
      num_wakeups : integer;
      num_touches : integer;
      break_keys  : SET OF 0..255;
      END;

screen_row   = ARRAY [0..79] OF word;
   screen_array = ARRAY [0..23] OF screen_row;
```

{ Constants defining bits in screen array elements. }

CONST

```
   Is_Text_Flag    = #0080;   ( bit 7 )

Character_Code  = #FF00;   ( bits 15:8 )
   Font_Code       = #0007;   ( bits 2:0 )
   Enhance_Code    = #0078;   ( bits 6:3 )

Field_Handle    = #FF00;   ( bits 15:8 )
```

TYPE

{ Types defining field information and field list. }

```
   field_record = PACKED RECORD
      fld_number  : byte;
      fld_row     : byte;
      fld_col     : byte;
      fld_length  : byte;
      fld_order   : byte;
      fld_enh     : char;
      fld_font    : char;
      fld_wakeup  : byte;
      fld_flags   : word;
      END;

field_list = ARRAY [1..255] OF field_record;
```

CONST
{ Constants defining bits in fld_flags of field_record. }

```
   Fld_Justification = #00C0;   ( bits 7:6 )
   Fld_Trigger       = #0020;   ( bit 5 )
   Fld_Protect       = #0010;   ( bit 4 )
   Fld_Changed       = #0008;   ( bit 3 )
```

TYPE

{ Type defining list of wakeup sets. }

```
   wakeup_list = ARRAY [1..255] OF SET OF char;
```

{ Types defining touch fields and list of touch fields. }

```
   touch_info = PACKED RECORD
      ul_row   : byte;
      ul_col   : byte;
      lr_row   : byte;
      lr_col   : byte;
      touch_id : integer;
      reports  : byte;
      reserved : byte;
      END;

touch_list = ARRAY [1..255] OF touch_info;
```

{ Type defining record returned by P_GetFileInfo. }

```
file_info = RECORD
   open_req    : word;
   load_1_req  : word;
   load_all_req : word;
   END;

Type defining format of data returned by P_ReadKey. } keystroke_record = RECORD
   qualifiers : word;
   data_word  : integer;
   END;

Type defining function key labels
   for P_ReadLabel and P_WriteLabel. } label_record = RECORD
   top_enh : char;
   bot_enh : char;
   top_txt : PACKED ARRAY [1..8] OF char;
   bot_txt : PACKED ARRAY [1..8] OF char;
   END;
(*
** PEXTRNS1.INC
**
** This is the second of 4 include files provided for calling the
** Forms Master library from MS-Pascal.
**
**   - PDECLS.INC    - type declarations and constant declarations
**                     used with Forms Master.
**   - PEXTRNS1.INC  - declarations of Forms Master procedures not
**                     concerned directly with forms file editing.
**   - PEXTRNS2.INC  - declarations of Forms Master procedures
**                     concerned directly with forms file editing.
**   - PEXTRNS3.INC  - declarations of Forms Master primitives.
**
** This file assumes the that the types found In PDECLS.INC have
** been declared prior to its inclusion.
**
** Use the $INCLUDE metacommand to include this file into your program.
**
** The procedures declared here are in alphabetical order.
*)
PROCEDURE P_CloseFormsFile (
   VARS comarea : forms_comarea ); EXTERNAL;

PROCEDURE P_CloseKeyboard (
   VARS comarea : forms_comarea ); EXTERNAL;

PROCEDURE P_DisplayForm (
   VARS comarea  : forms_comarea;
   VARS old_name : form_name ); EXTERNAL;

PROCEDURE P_GetDint (
   VARS comarea     : forms_comarea;
        field_number : integer;
   VARS variable    : integer4 ); EXTERNAL;

PROCEDURE P_GetField (
   VARS comarea   : forms_comarea;
        field_number : integer;
        length     : integer;
        ascii_ptr  : adsmem;
        font_ptr   : adsmem;
        enh_ptr    : adsmem ); EXTERNAL;

PROCEDURE P_GetFieldInfo (
   VARS comarea     : forms_comarea;
        field_number : integer;
   VARS field_info  : field_record ); EXTERNAL;
```

```
PROCEDURE P_GetFileInfo (
   VARS comarea   : forms_comarea;
        file_name : adsmem;
        extras    : integer;
   VARS info      : file_info ); EXTERNAL;

PROCEDURE P_GetInt (
   VARS comarea      : forms_comarea;
        field_number : integer;
   VARS variable     : integer ); EXTERNAL;

PROCEDURE P_GetLong (
   VARS comarea      : forms_comarea;
        field_number : integer;
   VARS variable     : real8 ); EXTERNAL;

PROCEDURE P_GetNames (
   VARS comarea   : forms_comarea;
   VARS num_forms : integer;
   VARS name_list : form_name_list ); EXTERNAL;

PROCEDURE P_GetReal (
   VARS comarea      : forms_comarea;
        field_number : integer;
   VARS variable     : real4 ); EXTERNAL;

PROCEDURE P_LoadBinary (
   VARS comarea   : forms_comarea;
   VARS old_name  : form_name;
        memory_ptr  : adsmem;
        memory_size : integer;
   VARS form_size  : integer ); EXTERNAL;

PROCEDURE P_LoadForms (
   VARS comarea   : forms_comarea;
   VARS num_forms : integer;
   VARS name_list : form_name_list ); EXTERNAL;

PROCEDURE P_OpenFormsFile (
   VARS comarea    : forms_comarea;
        file_name  : adsmem;
        access     : integer;
        extras     : integer;
        memory_area : adsmem;
        memory_size : word ); EXTERNAL;

PROCEDURE P_OpenKeyboard (
   VARS comarea : forms_comarea ); EXTERNAL;

PROCEDURE P_PutDint (
   VARS comarea      : forms_comarea;
        field_number : integer;
        dint_value   : integer4;
        separate     : boolean ); EXTERNAL;

PROCEDURE P_PutField (
   VARS comarea      : forms_comarea;
        field_number : integer;
        length       : integer;
        ascii_ptr    : adsmem;
        font_ptr     : adsmem;
        enh_ptr      : adsmem ); EXTERNAL;

PROCEDURE P_PutInt (
   VARS comarea      : forms_comarea;
        field_number : integer;
        int_value    : integer;
        separate     : boolean ); EXTERNAL;

PROCEDURE P_PutLong (
   VARS comarea      : forms_comarea;
        field_number : integer;
        long_value   : real8;
        separate     : boolean;
```

```
            decimals     : integer ); EXTERNAL;

PROCEDURE P_PutReal (
   VARS comarea     : forms_comarea;
        field_number : integer;
        real_value   : real;
        separate     : boolean;
        decimals     : integer ); EXTERNAL;

PROCEDURE P_ReadInput (
   VARS comarea : forms_comarea ); EXTERNAL;

PROCEDURE P_SetFieldInfo (
   VARS comarea     : forms_comarea;
        field_number : integer;
   VARS field_info  : field_record ); EXTERNAL;

PROCEDURE P_SetMessage (
   VARS comarea : forms_comarea;
        msg_ptr : adsmem;
        msg_len : integer ); EXTERNAL;

PROCEDURE P_UnloadForm (
   VARS comarea  : forms_comarea;
   VARS old_name : form_name ); EXTERNAL;
(*
**  PEXTRNS3.INC
**
**  This is the last of 4 include files provided for calling the
**  Forms Master library from MS-Pascal.
**
**    - PDECLS.INC   - type declarations and constant declarations
**                     used with Forms Master.
**    - PEXTRNS1.INC - declarations of Forms Master procedures not
**                     concerned directly with forms file editing.
**    - PEXTRNS2.INC - declarations of Forms Master procedures
**                     concerned directly with forms file editing.
**    - PEXTRNS3.INC - declarations of Forms Master primitives.
**
**  This file assumes the that the types found In PDECLS.INC have
**  been declared prior to its inclusion.
**
**  Use the $INCLUDE metacommand to include this file into your program.
**
**  The primitives are declared in alphabetical order.
*)

PROCEDURE P_AsciiToNum (
        buf_ptr   : adsmem;
        buf_len   : integer;
        num_ptr   : adsmem;
        num_type  : integer;
        separator : char;
        decimal   : char;
   VARS status    : integer ); EXTERNAL;

PROCEDURE P_Beep; EXTERNAL;

PROCEDURE P_ClearArea (
        ul_row : integer;
        ul_col : integer;
        lr_row : integer;
        lr_col : integer ); EXTERNAL;

PROCEDURE P_CursorType (
        cursor_type : integer ); EXTERNAL;

PROCEDURE P_DefineKey (
        keycode : integer;
        action  : word ); EXTERNAL;

PROCEDURE P_DefineTouch (
        ul_row    : integer;
        ul_col    : integer;
```

```
        lr_row     : integer;
        lr_col     : integer;
        attribute  : integer;
        response   : adsmem;
        length     : integer;
        reporting  : integer;
        off_enh    : char;
        on_enh     : char;
        beep       : boolean;
        cursor     : boolean ); EXTERNAL;
PROCEDURE P_DeleteTouch (
        ul_row : integer;
        ul_col : integer ); EXTERNAL;

PROCEDURE P_DisplayLabels; EXTERNAL;

PROCEDURE P_EnhanceArea (
        ul_row  : integer;
        ul_col  : integer;
        lr_row  : integer;
        lr_col  : integer;
        enhchar : char ); EXTERNAL;

PROCEDURE P_Execute (
        op_char : char ); EXTERNAL;

PROCEDURE P_InputStatus (
   VARS ready : boolean ); EXTERNAL;

PROCEDURE P_KeycodeMode; EXTERNAL;

PROCEDURE P_MoveCursor (
        row : integer;
        col : integer ); EXTERNAL;

PROCEDURE P_NormalMode; EXTERNAL;

PROCEDURE P_NumToAscii (
        num_ptr   : adsmem;
        num_type  : integer;
        buf_ptr   : adsmem;
        buf_len   : integer;
        separator : char;
        decimal   : char;
        separate  : boolean;
        dplaces   : integer;
   VARS status    : integer ); EXTERNAL;

PROCEDURE P_ReadArea (
        ul_row    : integer;
        ul_col    : integer;
        lr_row    : integer;
        lr_col    : integer;
        length    : integer;
        ascii_ptr : adsmem;
        font_ptr  : adsmem;
        enh_ptr   : adsmem ); EXTERNAL;

PROCEDURE P_ReadCursor (
   VARS row : integer;
   VARS col : integer ); EXTERNAL;

PROCEDURE P_ReadKey (
   VARS keystroke : keystroke_record ); EXTERNAL;

PROCEDURE P_ReadLabel (
        labelnumber : integer;
   VARS labeldata   : label_record ); EXTERNAL;

PROCEDURE P_ReportingModes (
```

```
        model : integer;
        mode2 : integer ); EXTERNAL;

PROCEDURE P_ShiftArea (
        ul_row     : integer;
        ul_col     : integer;
        lr_row     : integer;
        lr_col     : integer;
        direction  : integer;
        distance   : integer;
        length     : integer;
        ascii_ptr  : adsmem;
        font_ptr   : adsmem;
        enh_ptr    : adsmem ); EXTERNAL;

PROCEDURE P_WriteArea (
        ul_row     : integer;
        ul_col     : integer;
        lr_row     : integer;
        lr_col     : integer;
        length     : integer;
        ascii_ptr  : adsmem;
        font_ptr   : adsmem;
        enh_ptr    : adsmem ); EXTERNAL;

PROCEDURE P_WriteLabel (
        labelnumber : integer;
  VARS  labeldata   : label_record ); EXTERNAL;

PROCEDURE P_WriteLine (
        row        : integer;
        col        : integer;
        length     : integer;
        ascii_ptr  : adsmem;
        font_ptr   : adsmem;
        enh_ptr    : adsmem ); EXTERNAL;
```

What is claimed is:

1. Apparatus for assisting in the translation of designated native text included in computer source code into corresponding foreign text, said foreign text replacing said native text in said source code comprising:
   (a) native language file means with memory allocated for:
      display native text within said source code to be replaced,
      comment native text within said source code, not to be replaced, in neighboring relationship to said display native text,
      format information for the display of said display native text and its associated comment native text, and
      single character pair text delimiter information for use in identifying said display native text and associated comment native text;
   (b) replacement means operating on said native language file means including:
      means for reading and displaying said display native text and its associated comment native text, using said text delimiter information, and further including means for indicating the shape and size of the display area spanned by said display native text in accordance with said format information,
      means coupled to said reading and display means, for enabling a user to enter display foreign text to replace its corresponding display native text, wherein only display foreign text that fits within the area spanned by said display native text can be entered,
      means for displaying said display foreign text including means for indicating shape and size restrictions in accordance with the shape and size of the display area spanned by said display native text, and
      means for storing said display foreign text in a foreign language text file; and
   (c) merge means for substituting said display foreign text in said foreign language text file for said display native text.

2. The apparatus of claim 1, wherein said means for displaying said display foreign text further comprises means for indicating shape and size restrictions in accordance with the shape and size of the display area spanned by said display native text.

3. The apparatus of claim 1 wherein said means for indicating the shape and size of the display area spanned by said display native text employs inverse video means.

4. The apparatus of claim 1 wherein said means for indicating shape and size restrictions of the display area spanned by said display foreign text employs inverse video means.

5. A process for assisting in the translation of one or more subgroups of native text found within a larger group of native text stored in a computer source code file comprising the steps of:
   (a) marking with a first delimiter all display native text within said source code file intended for output and subsequent translation on a first computer display and, ultimately, on a second computer display;
   (b) marking with a second delimiter all comment native text within said source code file intended for output on said first computer display, but not intended for translation nor ultimate output on said second computer display;

(c) scanning said larger group of native text stored in said computer source code file for marked display native text and marked comment native text, placing all so-marked native text in an indexed language file, wherein each marked display native text is associated with a corresponding marked comment native text to provide comment information, and determining and storing the position and spatial extent of each marked display native text in said indexed language file;

(d) reading said indexed language file, translating said marked display native text found therein, and storing the resulting display foreign text in a foreign language text file; and (e) merging said larger group of native text with said foreign language text file so as to replace each occurrence of marked display native text with its foreign language equivalent to form a final foreign language file.

6. The process of claim 5 wherein step (d) includes restricting the results of the translation of said marked display native text to a sub-class of display foreign text, the elements of which each have a spatial extent that does not exceed the spatial extent of its associated marked display native text.

7. The process of claim 5 wherein step (d) is executed by a human translator.

8. The process of claim 5 wherein step (d) is executed by a translation machine.

9. Apparatus for assisting in the translation of one or more subgroups of native text found within a larger group of native text stored in a computer source code file comprising:

(a) means for marking with a first delimiter all display native text within said source code file intended for output and subsequent translation on a first computer display and, ultimately, on a second computer display;

(b) means for marking with a second delimiter all comment native text within said source code file intended for output on said first computer display, but not intended for translation nor ultimate output on said second computer display;

(c) means for scanning said larger group of native text stored in said computer source code file for marked display native text and marked comment native text, placing all so-marked native text in an indexed language file, wherein each marked display native text is associated with a corresponding marked comment native text to provide comment information, and determining and storing the position and spatial extent of each marked display native text in said indexed language file;

(d) means for reading said indexed language file including means for determining and storing the position and extent of each marked display native text in said indexed language file, and means for translating said marked display native text found therein, including means for restricting the spatial extent of each foreign language equivalent, and storing the resulting display foreign text in a foreign language text file; and (e) means for merging said larger group of native text with said foreign language text file so as to replace each occurrence of marked display native text with its foreign language equivalent to form a final foreign language file.

10. The apparatus of claim 9, wherein each foreign language equivalent is restricted to the approximate spatial extent of the original native language equivalent.

* * * * *